US009569935B2

(12) United States Patent
Berman

(10) Patent No.: US 9,569,935 B2
(45) Date of Patent: Feb. 14, 2017

(54) METHOD AND APPARATUS FOR COMBINING SYMBOLS IN GAMING DEVICES

(71) Applicant: KING SHOW GAMES, INC., Minnetonka, MN (US)

(72) Inventor: Bradley Berman, Minnetonka, MN (US)

(*) Notice: Subject to any disclaimer, the term of this patent is extended or adjusted under 35 U.S.C. 154(b) by 186 days.

(21) Appl. No.: 14/193,297

(22) Filed: Feb. 28, 2014

(65) Prior Publication Data

US 2014/0248933 A1 Sep. 4, 2014

Related U.S. Application Data

(60) Provisional application No. 61/771,731, filed on Mar. 1, 2013.

(51) Int. Cl.

| | |
|---|---|
| ***A63F 9/24*** | (2006.01) |
| ***A63F 13/00*** | (2014.01) |
| ***G07F 17/32*** | (2006.01) |
| *A63F 1/00* | (2006.01) |

(52) U.S. Cl.

CPC ......... *G07F 17/3293* (2013.01); *G07F 17/326* (2013.01); *G07F 17/3265* (2013.01); *A63F 2001/005* (2013.01)

(58) Field of Classification Search

CPC .. A63F 1/00; A63F 2001/005; G07F 17/3265; G07F 17/326

USPC ........................................................... 463/13

See application file for complete search history.

(56) References Cited

U.S. PATENT DOCUMENTS

| | | | |
|---|---|---|---|
| 712,566 | A | 11/1902 | Moeller |
| 821,781 | A | 5/1906 | Cadwallader |
| 1,551,761 | A | 9/1925 | Mccarroll |
| 1,693,525 | A | 11/1928 | Niederlitz |
| 4,170,358 | A | 10/1979 | Hancock |
| 5,280,916 | A | 1/1994 | Gleason, Jr. |
| 5,611,535 | A | 3/1997 | Tiberio |
| 5,823,873 | A | 10/1998 | Moody |
| 5,890,962 | A | 4/1999 | Takemoto |
| 6,004,208 | A | 12/1999 | Takemoto et al. |
| 6,007,066 | A | 12/1999 | Moody |
| 6,093,102 | A | 7/2000 | Bennett |
| 6,098,985 | A | 8/2000 | Moody |

(Continued)

OTHER PUBLICATIONS

IGT, "2nd Chance Royal Poker Brochure", 2010, 2 pages.
Sigma Games, "Ten Seven Poker Brochure", 2002, 3 pages.

*Primary Examiner* — Jason Skaarup
*Assistant Examiner* — Ryan Hsu

(57) ABSTRACT

Embodiments of the present invention set forth systems, apparatuses and methods for combining symbols in gaming devices. Accordingly, a gaming device can be configured to display a plurality of game elements each including a game symbol on a game display in response to a game initiation signal. When one or more predefined game conditions are satisfied, the method further includes combining two or more of the game symbols in a single game element. In some instances, one or more of the symbols that left their respective game elements are replaced with additional game symbols. The resulting game grid may then be evaluated to determine prizes associated with winning symbol combinations, including using one or both of the symbols combined in the single game element in the winning symbol combinations.

20 Claims, 43 Drawing Sheets

(56) References Cited

U.S. PATENT DOCUMENTS

| | | | |
|---|---|---|---|
| 6,123,333 | A | 9/2000 | McGinnis et al. |
| 6,200,217 | B1 | 3/2001 | Osawa |
| 6,227,971 | B1 | 5/2001 | Weiss |
| 6,241,607 | B1 | 6/2001 | Payne et al. |
| 6,261,178 | B1 | 7/2001 | Bennett |
| 6,398,218 | B1 | 6/2002 | Vancura |
| 6,517,074 | B1 | 2/2003 | Moody et al. |
| 6,652,377 | B1 | 11/2003 | Moody |
| 6,896,615 | B2 | 5/2005 | Berman |
| 7,247,092 | B2 | 7/2007 | Jarvis et al. |
| 7,354,342 | B2 | 4/2008 | Paulsen et al. |
| 7,481,435 | B2 | 1/2009 | Shetterly |
| 8,147,310 | B2 | 4/2012 | Jarvis et al. |
| 8,323,085 | B2 * | 12/2012 | Berman .............. A63F 3/00157 463/13 |
| 8,419,518 | B2 | 4/2013 | Jarvis et al. |
| 8,439,737 | B1 | 5/2013 | Moody |
| 2002/0037761 | A1 * | 3/2002 | Bennett ...................... A63F 1/00 463/13 |
| 2004/0023706 | A1 * | 2/2004 | Hunter ...................... A63F 1/02 463/13 |
| 2004/0232616 | A1 | 11/2004 | English |
| 2005/0096130 | A1 | 5/2005 | Mullins |
| 2005/0173863 | A1 | 8/2005 | Walker et al. |
| 2005/0208994 | A1 | 9/2005 | Berman |
| 2005/0230917 | A1 | 10/2005 | Jackson |
| 2006/0270477 | A1 | 11/2006 | Snow |
| 2006/0287035 | A1 | 12/2006 | Walker et al. |
| 2008/0099987 | A1 | 5/2008 | Schultz |
| 2008/0146305 | A1 | 6/2008 | Moody |
| 2008/0254893 | A1 | 10/2008 | Patel et al. |
| 2009/0005154 | A1 | 1/2009 | Schultz |
| 2009/0111556 | A1 | 4/2009 | Moody |
| 2009/0186676 | A1 | 7/2009 | Amaitis et al. |
| 2010/0124967 | A1 | 5/2010 | Lutnick et al. |
| 2011/0275432 | A1 | 11/2011 | Lutnick et al. |
| 2012/0015703 | A1 * | 1/2012 | Berman .............. A63F 3/00157 463/13 |
| 2012/0077558 | A1 | 3/2012 | Alderucci et al. |
| 2013/0116038 | A1 | 5/2013 | Alderucci et al. |
| 2013/0178263 | A1 | 7/2013 | Alderucci et al. |
| 2013/0217457 | A1 | 8/2013 | Jarvis et al. |
| 2014/0011561 | A1 | 1/2014 | Lutnick et al. |
| 2014/0370958 | A1 | 12/2014 | Lutnick |
| 2015/0325082 | A1 | 11/2015 | Snow |

* cited by examiner

METHOD AND APPARATUS FOR COMBINING SYMBOLS IN GAMING DEVICES

RELATED APPLICATIONS

This application claims the benefit of Provisional Patent Application No. 61/771,731 filed on Mar. 1, 2013, to which priority is claimed pursuant to 35 U.S.C. §119(e) and which is incorporated herein by reference in its entirety.

FIELD OF THE INVENTION

This disclosure relates generally to wagering games, and more particularly to wagering games played on gaming apparatuses where the wagering games include methods for combining symbols during game play.

BACKGROUND

Casino games such as poker, slots, and craps have long been enjoyed as a means of entertainment. Almost any game of chance that can be played using traditional apparatus (e.g., cards, dice) can be simulated on a computer. The popularity of casino gambling with wagering continues to increase, as does recreational gambling such as non-wagering computer game gambling. It is also likely that most new games will be implemented, at least in part, using computerized apparatus.

One reason that casino games are widely implemented on computerized apparatus is that computerized games are highly adaptable, easily configurable and re-configurable, and require minimal supervision to operate. For example, the graphics and sounds included in such games can be easily modified to reflect popular subjects, such as movies and television shows.

Computer gaming devices can also be easily adapted to provide entirely new games of chance that might be difficult to implement using mechanical or discrete electronic circuits. Because of the ubiquity of computerized gaming machines, players have come to expect the availability of an ever wider selection of new games when visiting casinos and other gaming venues. Playing new games adds to the excitement of "gaming." As is well known in the art and as used herein, the term "gaming" and "gaming devices" generally involves some form of wagering, and that players make wagers of value, whether actual currency or something else of value, e.g., token or credit. Wagering-type games usually provide rewards based on random chance as opposed to skill. In some jurisdictions, the absence of skill when determining awards during game play is a requirement.

The present disclosure describes methods, systems, and apparatus that provide for new and interesting gaming experiences, and that provide other advantages over the prior art.

SUMMARY

To overcome limitations in the prior art described above, and to overcome other limitations that will become apparent upon reading and understanding the present specification, the present invention is directed to an apparatus, system, computer readable storage media, and/or method that involve or otherwise facilitate combining symbols (also referred to as indicia or markings) during game play. In one embodiment, a method of operating a gaming device includes displaying a plurality of game elements each including a game symbol on a game display in response to a game initiation signal. When one or more predefined game conditions are satisfied, the method further includes combining two or more of the game symbols, and in some embodiments replacing one or more of the symbols that vacated their respective game elements to make the combinations with additional game symbols.

DETAILED DESCRIPTION

Figure 1A:
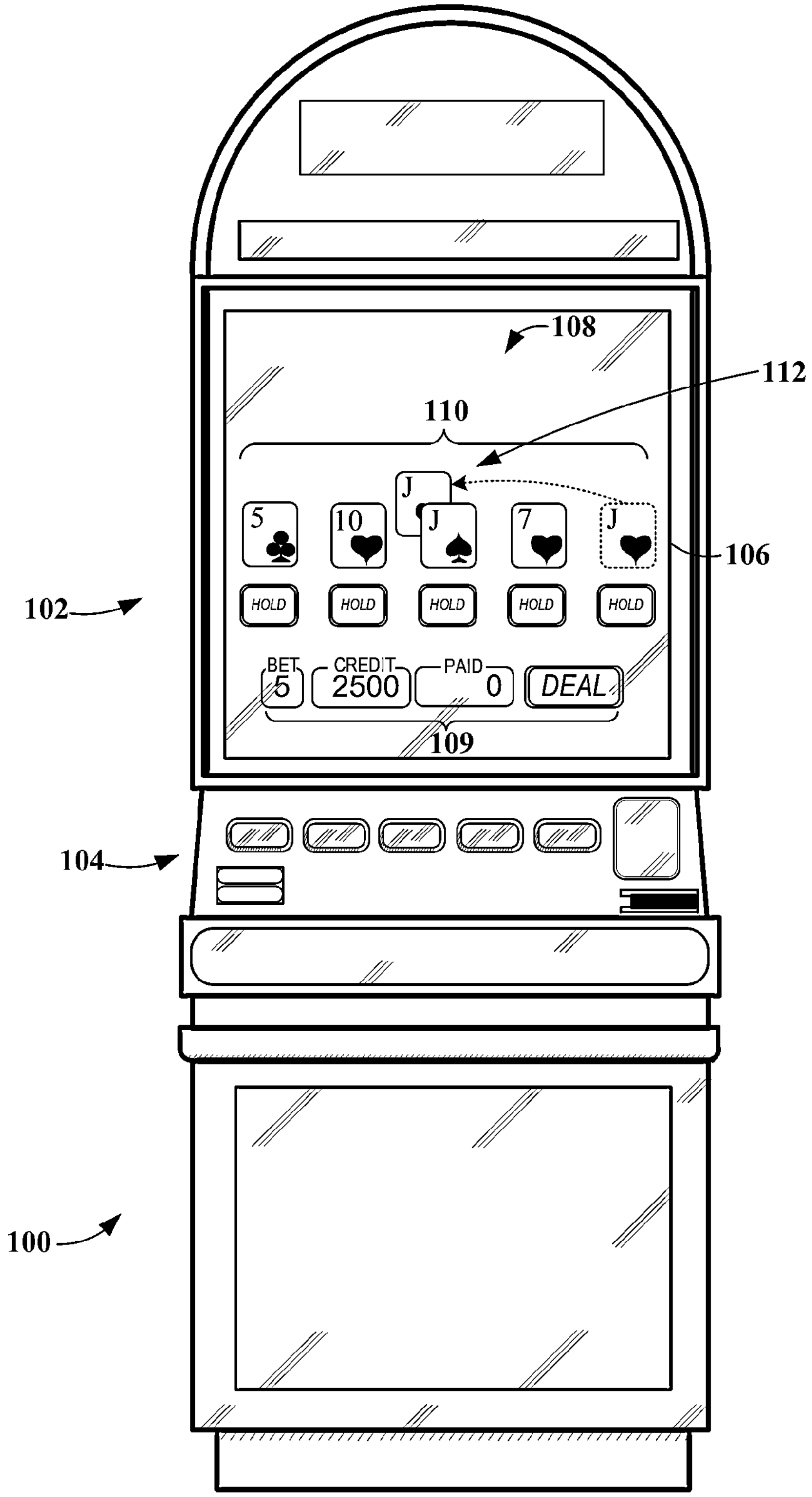
FIGS. 1A and 1B are diagrams of a gaming machine according to embodiments of the invention.

In the following description of various exemplary embodiments, reference is made to the accompanying drawings which form a part hereof, and in which is shown by way of illustration representative embodiments in which the features described herein may be practiced. It is to be understood that other embodiments may be utilized, as structural and operational changes may be made without departing from the scope of the disclosure.

In the description that follows, the term “reels,” “cards,” “decks,” and similar mechanically descriptive language may be used to describe various apparatus presentation features, as well as various actions occurring to those object (e.g., “spin,” “draw,” “hold,” “bet”). Although the present disclosure may be applicable to both to manual, mechanical, and computerized embodiments, and any combination therebetween, the use of mechanically descriptive terms is not meant to be only applicable to mechanical embodiments. Those skilled in the art will understand that, for purposes of providing gaming experiences to players, mechanical elements such as cards, reels, and the like may be simulated on a display in order to provide a familiar and satisfying experience that emulates the behavior of mechanical objects, as well as emulating actions that occur in the non-computerized games (e.g., spinning, holding, drawing, betting). Further, the computerized version may provide the look of mechanical equivalents but may be generally randomized in a different way. Thus, the terms “cards,” “decks,” “reels,” “hands,” etc., are intended to describe both physical objects and emulation or simulations of those objects and their behaviors using electronic apparatus.

In various embodiments of the invention, the gaming displays are described in conjunction with the use of data in the form of “symbols.” In the context of this disclosure, a “symbol” may generally refer at least to a collection of one or more arbitrary indicia or signs that have some conventional significance. In particular, a symbol can represent a value that can at least be used to determine whether to award a payout. A symbol may include numbers, letters, shapes, pictures, textures, colors, sounds, etc., and any combination therebetween. A win can be determined by comparing a symbol with one or more additional symbols. Generally, such comparisons can be performed via software by mapping numbers (or other data structures such as character strings) to the symbols and performing the comparisons on the numbers/data structures. Other conventions associated with known games (e.g., the numerical value/ordering of face cards and aces in card games) may also be programmatically analyzed to determine winning combinations.

Generally, systems, apparatuses and methods are described for enhancing winning result opportunities in gaming activities. The systems, apparatuses and methods described herein may be implemented as a single game, or part of a multi-part game. For example, the game features described herein may be implemented in primary gaming activities, bonus games, side bet games or other secondary games associated with a primary gaming activity. The game features may be implemented in stand-alone games, multi-player games, etc. Further, the disclosure may be applied to any games of chance, and descriptions provided in the context of any representative embodiment (e.g. video poker) are provided for purposes of facilitating an understanding of the features described herein. However, the principles described herein are equally applicable to any game of chance where an outcome(s) is determined for use in the player’s gaming activity. The game features described herein may be employed in stand-alone games, a primary/base games, bonus games, side bet games, etc.

Embodiments of the present concept include providing gaming devices (also referred to as gaming apparatuses or gaming machines), gaming systems, and methods of operating these devices or systems to provide game play that utilizes operations of combining game symbols (i.e., the markings or indicia on game elements) in response to predefined conditions. In one embodiment, a method of operating a gaming device includes displaying a plurality of game elements each including a game symbol on a game display in response to a game initiation signal. When one or more predefined game conditions are satisfied, the method further includes combining two or more of the game symbols, and in some embodiments replacing one or more of the symbols that left their respective game elements to make the combinations with additional game symbols. In some embodiments, the game symbols are combined by moving all the symbols indicated by the predefined condition to a single game element; thereby creating a multi-indicia game element for use in evaluating awards or other game play functions. In other embodiments, one or more symbols that are indicated by the satisfied predefined condition are moved from their respective game elements to elements in a secondary game play area for use in evaluating awards or other game play functions. In yet other embodiments, symbols indicated by the satisfied predefined condition are grouped together, evaluated for awards, and removed from the game display to allow the additional game symbols to fill the empty game element locations. In other embodiments, the game symbols may not be combined visually, but are combined mathematically. For example, in a mechanical spinning reel game, symbols appearing on the game reels may be combined mathematically, with one or more reels respinning for a new outcome, even though the physical symbols do not visually combine. In some example embodiments, a secondary screen may show the symbols combining, or an overlying transmissive portion of the display may be used to show the symbols combining even though the underlying symbols are not visually combined. In yet other embodiments, symbols may be arranged or categorized into layers where rules apply about combining elements assigned to certain symbol layers. For example, a slot symbol may be associated with a particular background where only symbols having similar back grounds are combined. In another example, playing cards may have sub-symbols or special card markings that at least partially dictate when card symbols are combined. The layer rules may also coincide with other combination rules. For example, certain symbols may only combine within a similar layer while other symbols may combine with either similar layer symbols or symbols in at least one other layer.

Numerous variations are possible using these and other embodiments of the inventive concept. Some of these embodiments and variations are discussed below with reference to the drawings. However, many other embodiments and variations exist that are covered by the principles and scope of this concept. For example, although some of the embodiments discussed below involve video poker or reel-based slot machine examples of this concept, other embodiments include application of symbol combination techniques in other types of poker games, slot games, keno games, bingo games, blackjack games, baccarat games, or other games of chance. Some of these other types of embodiments will be discussed below as variations to the examples illustrated. However, many other types of games can implement similar techniques and fall within the scope of this inventive concept.

Figure 1B:
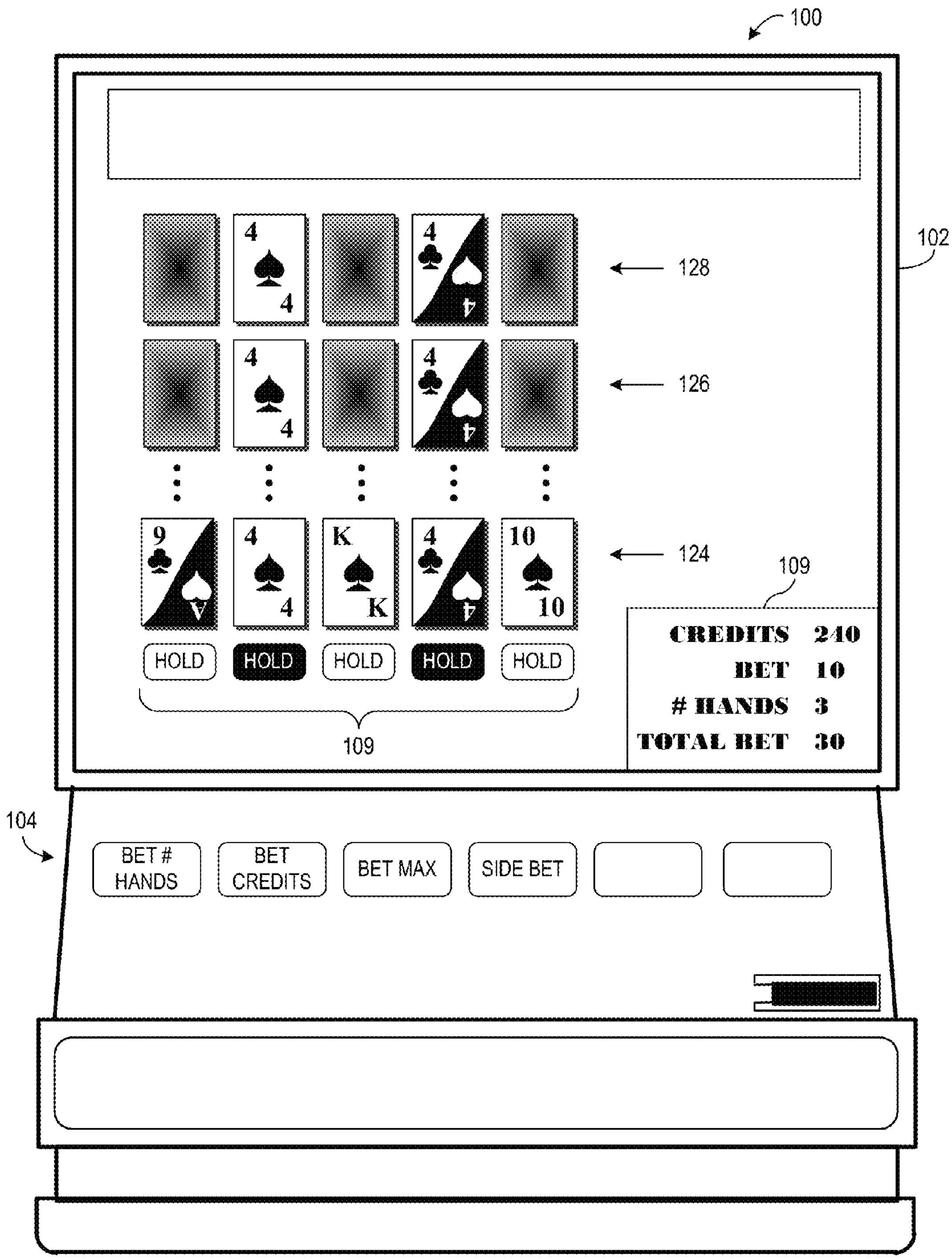

Referring to the example gaming apparatus 100 shown in FIGS. 1A and 1B, the gaming apparatus includes a display portion 102 (also referred to as a gaming display), and a player interface portion 104, although some or all of the user interface 104 may be provided via the display 102 in touch screen embodiments. The display portion 102 may include one or more display areas 106 that may be included in physically separate displays or as portions of a common large display. Here, the game display 106 includes a game play portion 108 that displays game elements and symbols 110, and an operations portion 109 that can include meters, various game buttons, or other game information for a player of the gaming device 100.

The user interface 104 allows the user to control and engage in play of the gaming machine 100. The particular user interface mechanisms included with user interface 104 may be dependent on the type of gaming device. For example, the user interface 104 may include one or more buttons, switches, joysticks, levers, pull-down handles, trackballs, voice-activated input, or any other user input system or mechanism that allows the user to play the particular gaming activity.

The user interface 104 may allow the user or player to enter coins, bills, or otherwise obtain credits through vouchers, tokens, credit cards, tickets, etc. Various mechanisms for entering such vouchers, tokens, credit cards, coins, tickets, etc. are known in the art. For example, coin/symbol input mechanisms, card readers, credit card readers, smart card readers, punch card readers, radio frequency identifier (RFID) readers, and other mechanisms may be used to enter wagers. It is through the user interface 104 that the player can initiate and engage in gaming activities. While the illustrated embodiment depicts various buttons for the user interface 104, it should be recognized that a wide variety of user interface options are available for use in connection with the present invention, including pressing buttons, touching a segment of a touch-screen, entering text, entering voice commands, or other known data entry methodology.

The display device 102 may include one or more of an electronic display, a mechanical display, and a fixed display information, such as paytable information associated with a glass/plastic panel on the gaming machine 100. The symbols or other indicia associated with the play of the game may be presented on an electronic display device or on mechanical devices associated with a mechanical display. Generally, the display 102 devotes the largest portion of viewable area to the primary gaming portion 106. The gaming portion 106 is generally where the visual feedback for any selected game is provided to the user. The gaming portion 106 may render graphical objects such as cards, slot reels, dice, animated characters, and any other gaming visual known in the art. The gaming portion 106 also typically informs players of the outcome of any particular event, including whether the event resulted in a win or loss.

In the embodiment shown in FIG. 1A, a video poker game is available for play on the gaming device. Hence, the game play portion 108 includes playing cards as game elements 110 with associated rank and suit markings on the cards making up the symbols that appear on the elements. Here, as illustrated by the dashed line 112, a poker hand that meets or satisfies a predefined condition may have one or more of the cards combine during game play. For example, in this embodiment, cards of the same rank combine into multi-indicia symbols on a single card element. Here, the Jack of Hearts (J-H) is combined with the Jack of Spades (J-S) to form a multi-indicia card at the third card position in the video poker hand. Another card may fill in the spot vacated by the J-H and the hand may be evaluated for awards. These and other symbol combining techniques may be used in various poker games, including draw and/or stud poker, as well as in slot machine games, black jack games, keno games, or any other wagering game of chance.

The gaming portion 106 may include other features known in the art that facilitate gaming, such as status and control portion 109. As is generally known in the art, this portion 109 provides information about current bets, current wins, remaining credits, etc. associated with gaming activities of the grid 108. The control portion 109 may also provide touchscreen controls for facilitating game play. The grid 108 may also include touchscreen features, such as facilitating selection of individual cards for holding prior to draw of new cards and/or advancing particular cards to move up to the next hand if conditions are satisfied. The gaming portion 106 of the display 102 may include other features that are not shown, such as paytables, navigation controls, etc.

FIG. 1B illustrates another embodiment on the display device 102. Here, a poker game may include multiple poker hands in the same poker game. These multiple hands include a first poker hand 124, a second poker hand 126, and a third poker hand 128, although more or fewer poker hands are possible in other multiple hand poker embodiments. As shown in FIG. 1B, these embodiments may have similar rules to conventional multi-hand poker games where cards are dealt to the first poker hand 124 while cards in the second and third poker hands 126, 128 are initially face down. Cards held in the first poker hand 124, including multi-indicia cards that have been combined (e.g., the 4-Clubs/4-Hearts), are replicated in the second, third and any other subsequent poker hand 126, 128. Replacement cards may then be drawn for the first poker hand 124, second poker hand 126, and third poker hand 128. These replacement cards may come from separate card decks or may come from a single card deck. Thus, in a three poker hand embodiment, three separate card decks may be used, or a single card deck may be used. Although one multiple hand poker game is shown in FIG. 1B, other types of multiple poker hand embodiments are possible, such as multiple hand poker games where each poker hand is independent of one another, or dependent in a different manner from the multi-hand poker embodiment shown in FIG. 1B.

FIGS. 2A-11 and 14A-18G illustrate several embodiments of examples of how this concept can be implemented into the game play of gaming devices. As discussed above, this is not an exhaustive list of possible embodiments. Rather, these figures and the accompanying text are discussed to provide some of the ways this inventive concept can be implemented in gaming devices.

Figure 2A:
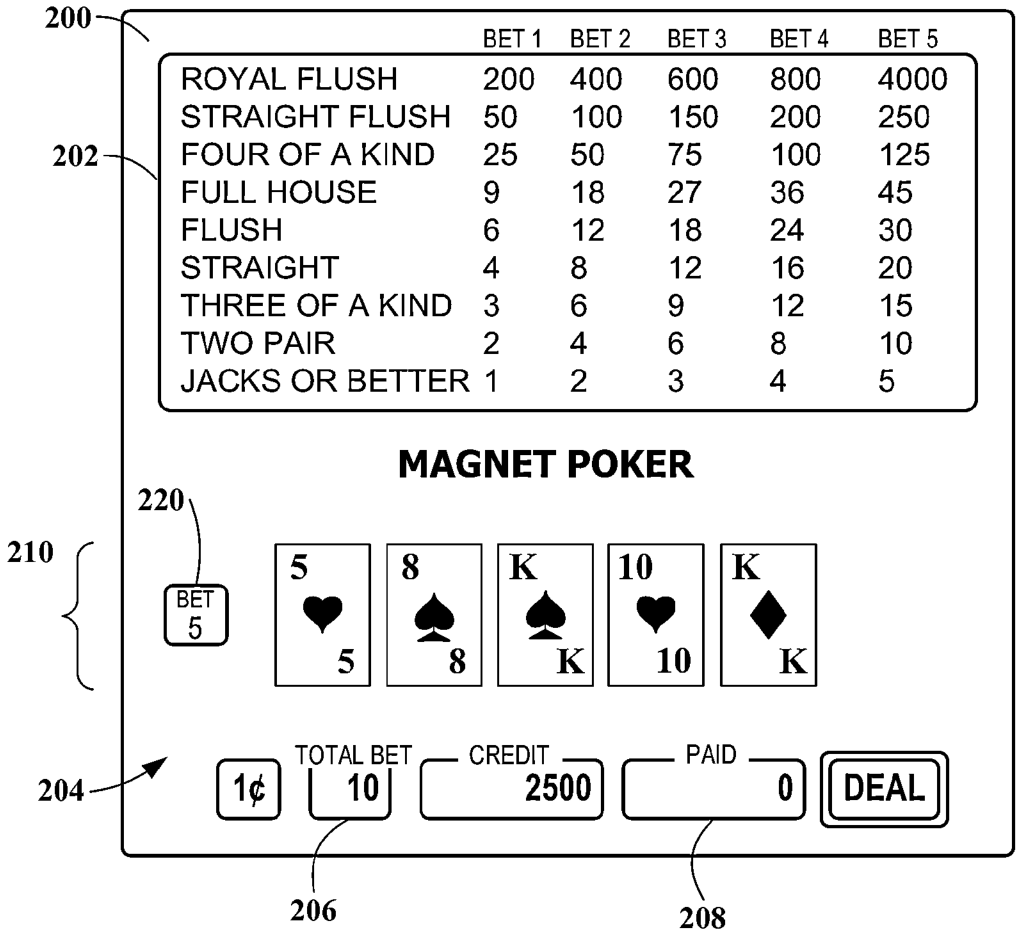
FIGS. 2A and 2B are diagrams of a gaming display illustrating example game play according to embodiments of the invention.
Figure 2B:
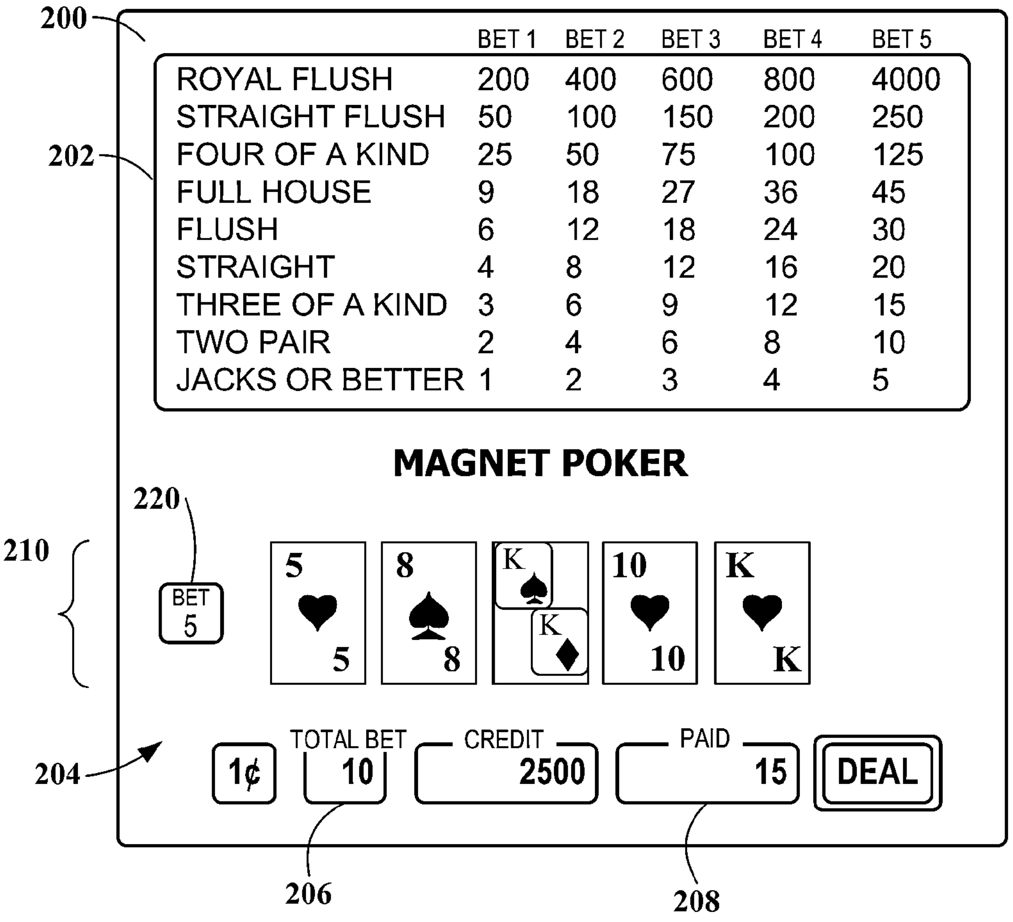

Referring to FIGS. 2A and 2B a gaming display 200 includes a video poker game utilizing some of the symbol combining techniques included in this concept. Here a five-card stud poker hand 210 is provided in the game play portion of the display 200, along with a game paytable 202 and an operations potion 204 that includes various meters and buttons, such as a "Total Bet" meter or indicator 206 and a "Paid" indicator 208. As discussed above, when various predefined conditions are satisfied or met during game play, one or more game symbols are combined to provide various hand combinations during award evaluations. That is, cards or card symbols can move to other card locations or other game areas based on predetermined move criteria or conditions. For poker hands, there are numerous types of predefined conditions or move criteria that can be implemented to determine if or when card symbols are moved and combined. For example, the predefined conditions may include any or a combination of the following: 1) Cards of the same rank being combined; 2) Only pairs of cards being combined; 3) Four cards to a royal flush are combined; 4) Any cards to a Royal Flush are Combined; 4) Suited cards one rank apart are combined (such as the 8 of Hearts combining with the 9 of Hearts); 5) Any suited cards are combined; 6) Any cards one rank apart are combined; 7) Cards being dealt or drawn to certain card positions in the hand; or 8) any other of the multitude of possible rules or multi-step rules that could be applied as a predefined or predetermined condition for combining cards or card symbols.

Returning to FIGS. 2A and 2B, the predefined conditions in this embodiment include any number of cards of the same rank are combined. Thus, the two Kings shown in FIG. 2A are combined as shown in FIG. 2B, and another card is automatically drawn into the location occupied by the K-D which moved to combine with the K-S. Here, the additional drawn card was the K-H. The stud poker hand 210 is now evaluated against the paytable 202 (i.e., the coded or saved version of the displayed paytable that is stored in memory). There are various methods to evaluating the final poker hand, many of which are discussed below with respect to some of the other illustrated embodiments. These methods include providing a pay for the best five card hand using all of the cards displayed in the stud poker hand 210 where each symbol on the multi-indicia card (i.e., the combined K-S, K-D card element) is evaluated as a separate card, enumerating all of the possible five card hands using the combined multi-indicia cards and paying for each winning hand, or various other methods. In this example embodiment, only the highest paying five card hand is paid. Thus, the 5 of Hearts (5-H) is not used and each King from the multi-indicia card is used to provide a three-of-a-kind hand of Kings with an associated award of 15 credits as shown in the paid meter 208. Note that a bet of 10 credits included 5 credits wagered on the stud poker hand 210 and five credits for the feature of using combined cards in the game play, although various other betting methods are possible.

Figure 3A:
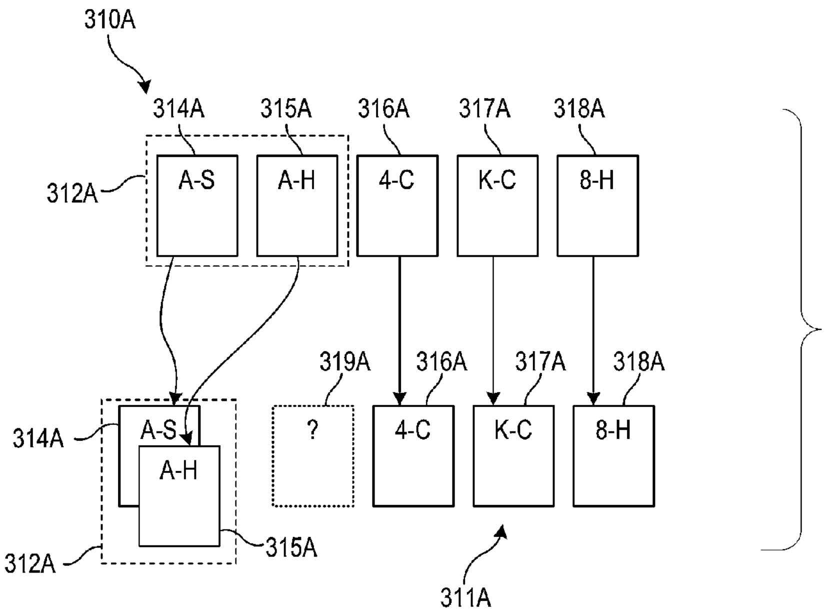
FIGS. 3A and 3B are schematic diagrams illustrating example combination operations according to embodiments of the invention.
Figure 3B:
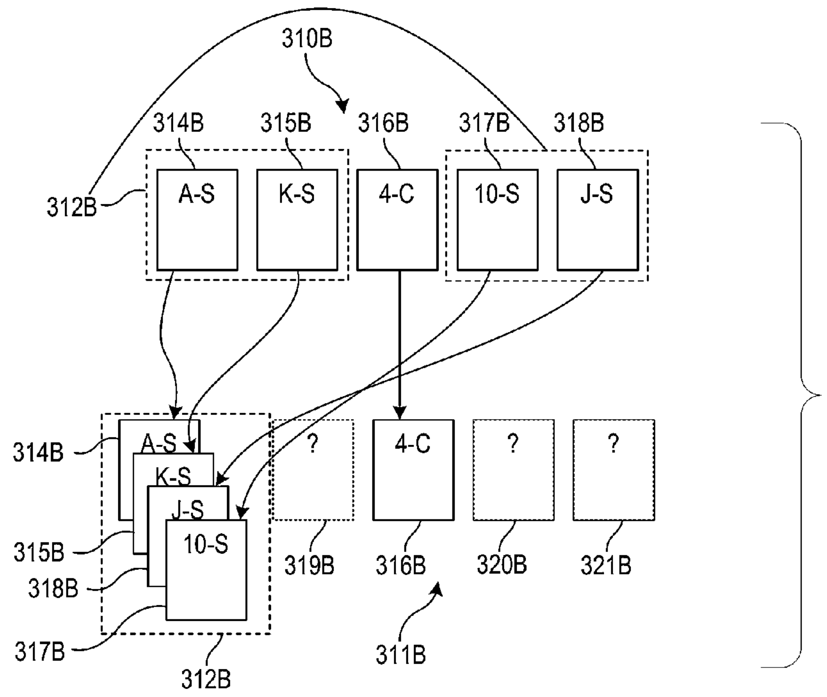

FIGS. 3A and 3B are schematic diagrams illustrating example combination operations according to embodiments of the invention. Referring to FIG. 3A, an initial hand 310A includes five playing cards 314A-318A. According to a predefined condition, if two or more cards of the same rank are displayed in the hand 310A, they are combined. Here, the A-S and A-H are both included in the hand and are identified 312A and combined to form a resulting hand 311A where the A-S and A-H are formed into a multi-indicia card or are otherwise combined. An additional card may then be selected to fill the vacant card slot 319A that resulted from the movement and combination of the A-S and A-H. In other embodiments, however, no additional cards may be selected or otherwise used to fill the vacant card slot 319A.

Referring to FIG. 3B, another initial five card poker hand 310B is provided that includes five cards 314B-318B. Here, a predefined condition includes the rule that four cards to a Royal Flush are combined. Since four cards are provided in the initial hand 310B that form part of a Royal Flush, they are identified 312B and combined to form the resulting hand 311B. The combined card at 312B now has the indicia or symbols of four playing cards (A-S, K-S, J-S, and 10-S) while three other card locations (319B, 320B, and 321B) are now open and can be filled with additional cards, or not filled at all in other embodiments. Here, the player is likely hoping that one of the new cards that fill these vacant locations is the Q-S, which would complete the Royal Flush.

A five-card draw poker embodiment is shown in FIGS. 4A-4D where the combining of cards is done prior to the draw and the best five card hand is paid. As discussed in other embodiments below, the movement and combination of cards or other symbols (such as in a slot game) can be done at various times or stages of the game and the evaluation techniques of the resulting hand or outcome can use one or more of various evaluation techniques. Referring to FIGS. 4A, 4B, 4C, and 4D, a gaming display 400 includes a poker hand 410 in the game play portion of the display, along with various meters and buttons, such as a "Total Bet" meter 406, a "Paid" meter 408, multiple "Hold" game buttons 460 associated with card positions in the poker hand 410, and a "Deal/Draw" game button 450.

Figure 4A:
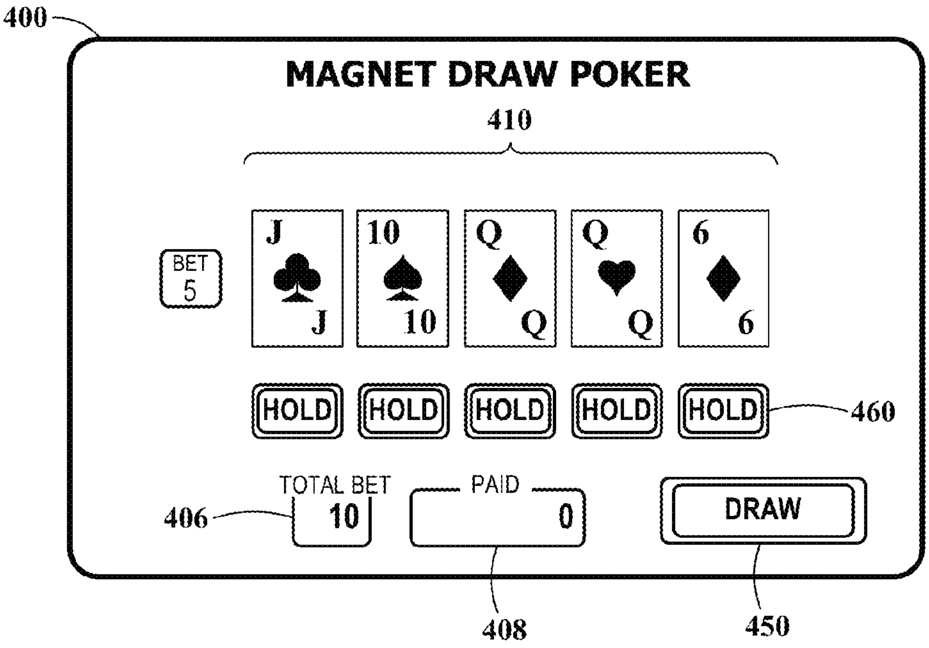
FIGS. 4A, 4B, 4C, and 4D are diagrams of a gaming display illustrating example game play according to embodiments of the invention.
Figure 4B:
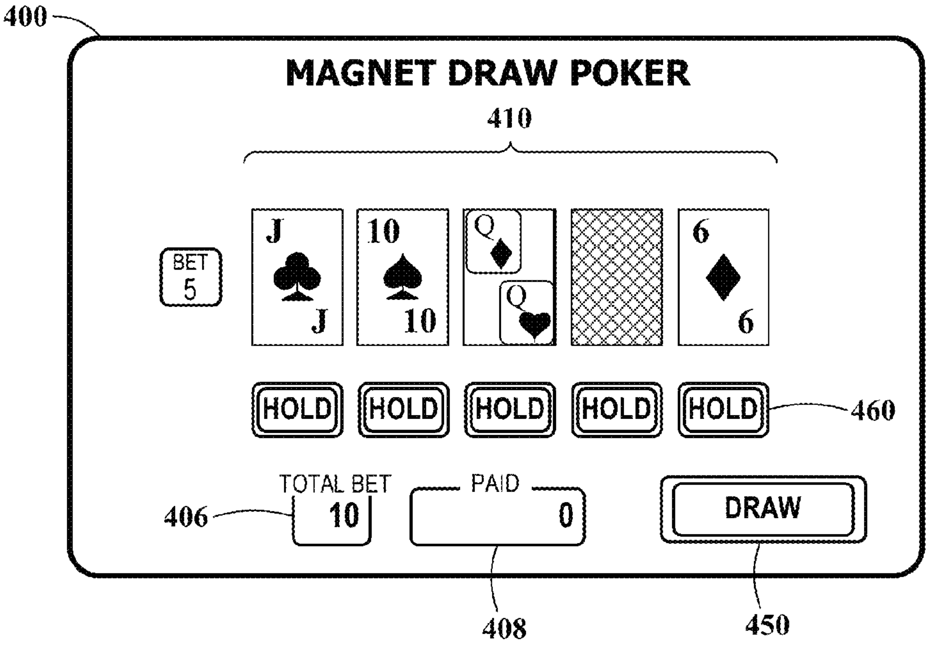

In FIG. 4A, a hand 410 is dealt on a gaming display 400 that includes two Queens. In this embodiment, one of the predefined combination conditions is that cards of a similar rank are combined to form a multi-indicia card symbol. Here, since there are two Queens, the Q-H is moved to the location occupied by the Q-D (although movement in the opposite direction is also possible) to form a multi-indicia card showing both Queen symbols.

Figure 4C:
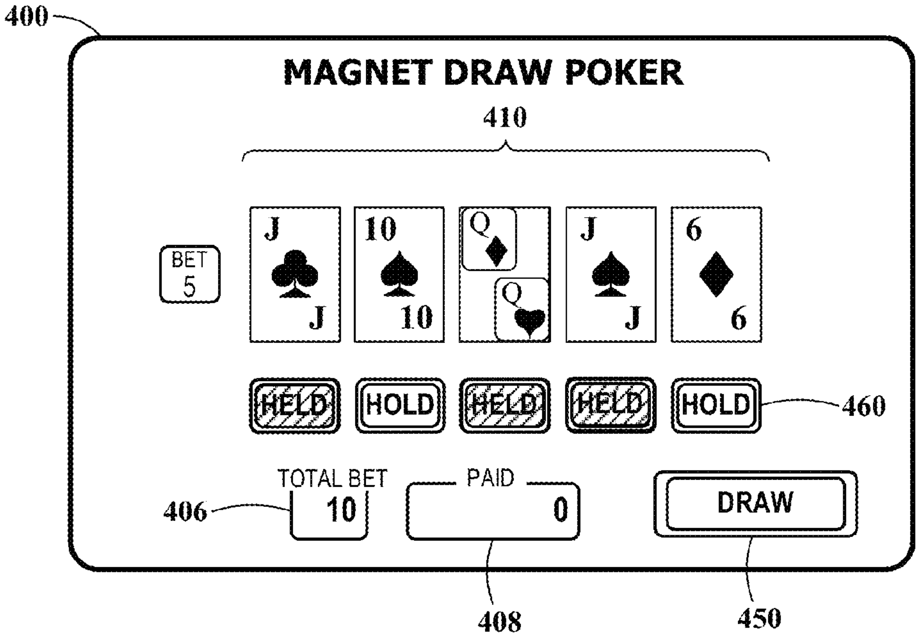
Figure 4D:
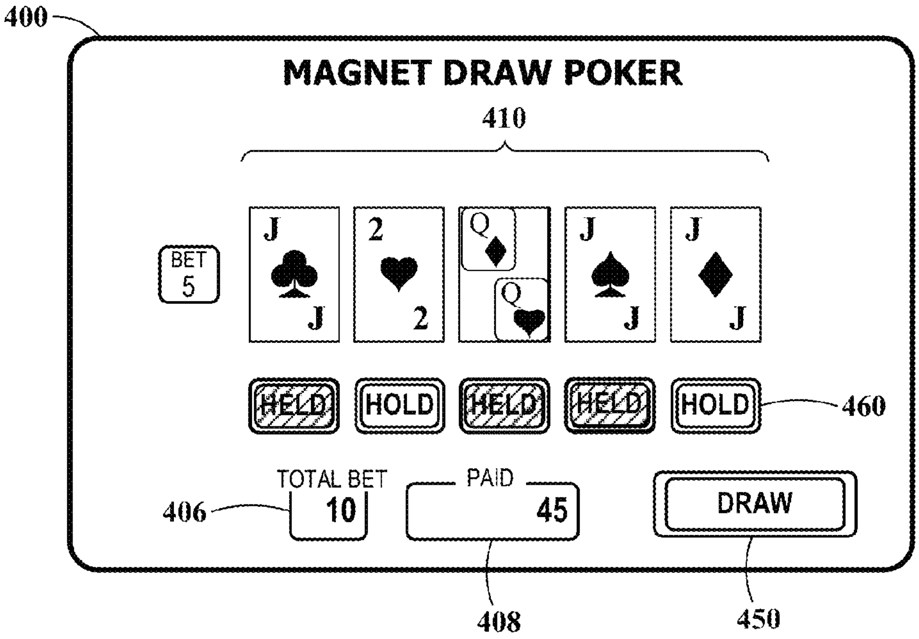

As shown in FIG. 4C, another card has been used to replace the card location vacated by the Q-H. In this instance, the new card is the J-S. In some embodiments, this J-S may be combined with the J-C prior and a new replacement card drawn for the vacated card position, but in the currently illustrated embodiment, only a single combination is allowed from the originally dealt hand. The player has held the J-C, the multi-indicia Q-D/Q-H and the J-S using the provided buttons 460 (or by using buttons on the player interface portion of the game, by touching the cards themselves, or using any other known techniques to hold the cards). After holding the desired cards, the gaming device discards the cards not held, and draws new cards to replace the discarded cards as shown in FIG. 4D. Here, the player has received the 2-H and J-D on the draw. Although in some embodiments, another condition may trigger additional card movement or combinations (such as combining the Jacks), this illustrated embodiment simply evaluates the resulting hand for awards by determining the best five-card hand. Here, the 2-H is not used and a Full House of Jacks over Queens is determined to be the best five-card hand. The player is accordingly paid 45 credits as shown in the Paid meter 408.

Figure 5A:
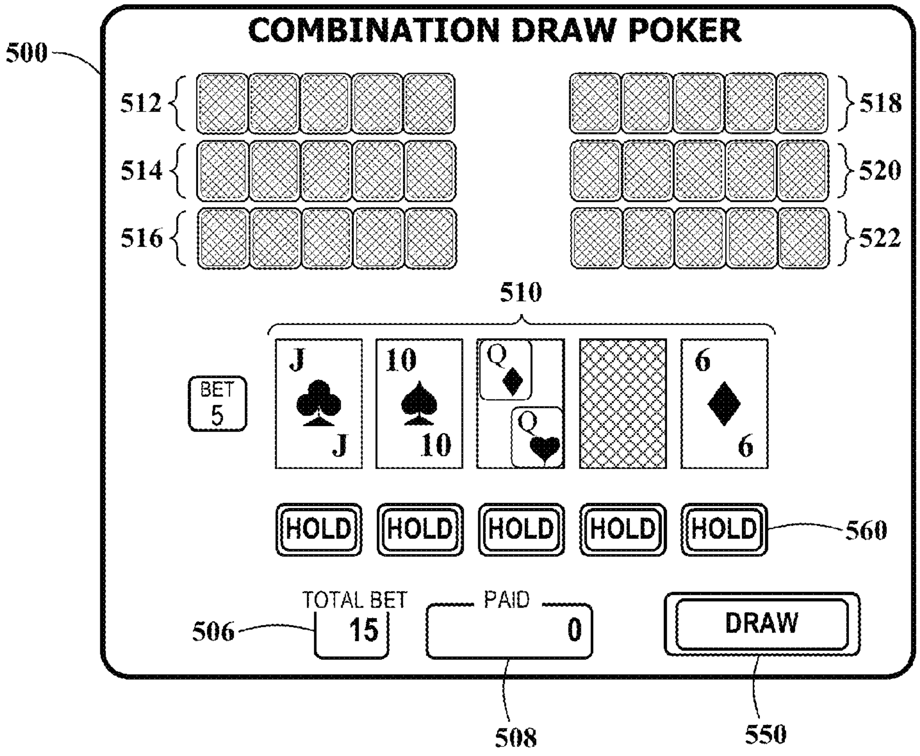
FIGS. 5A, 5B, and 5C are diagrams of a gaming display illustrating example game play according to embodiments of the invention.
Figure 5B:
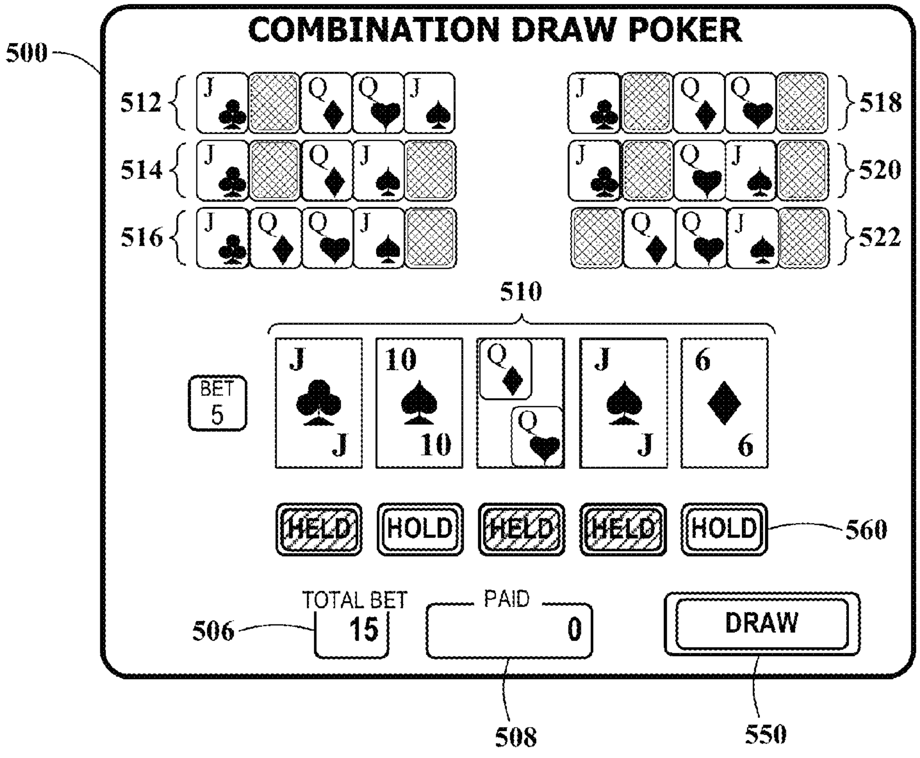
Figure 5C:
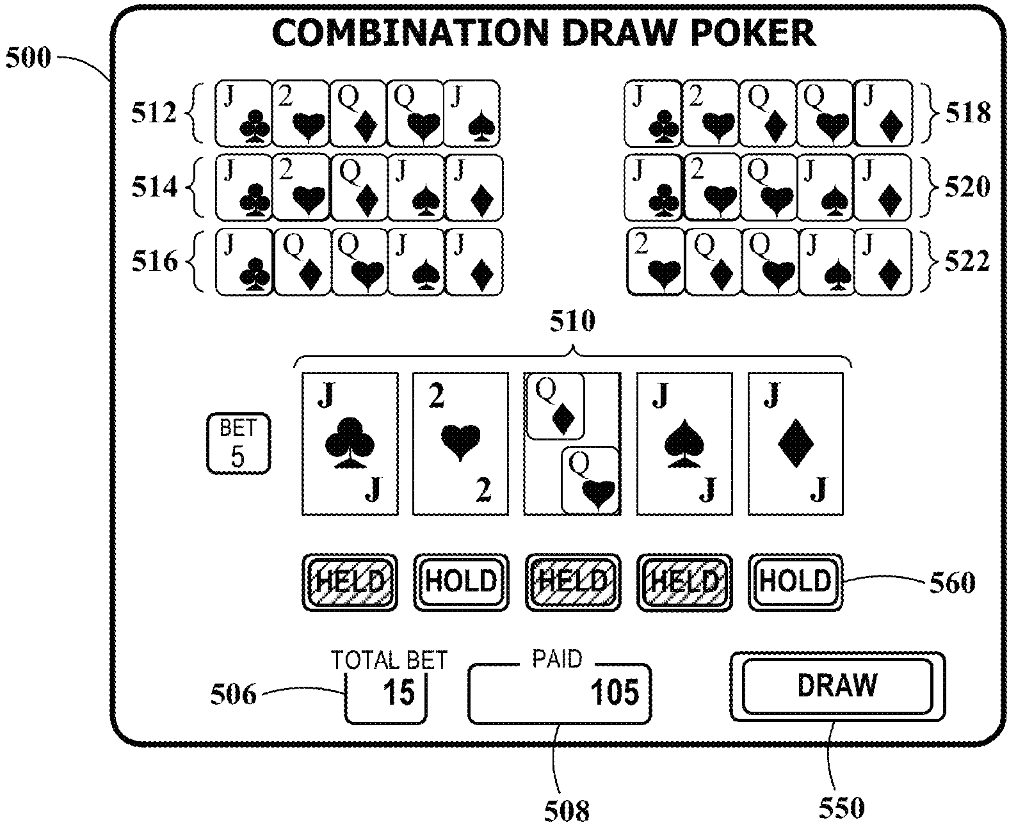

The embodiments shown in FIGS. 5A-5C are very similar to those shown above in FIGS. 4A-4D, except that instead of simply paying the best five-card hand, each of the possible resulting five card hands are enumerated and evaluated. Referring to FIGS. 5A-5C, a gaming display 500 includes a poker hand 510 in the game play portion of the display, along with various meters and buttons, such as a "Total Bet" meter 506, a "Paid" meter 508, multiple "Hold" game buttons 560 associated with card positions in the poker hand 510, and a "Deal/Draw" game button 550. These embodiments also have a secondary card display that shows possible enumerated poker hands 512, 514, 516, 518, 520, 522 that are used to show enumerated poker hands when a two cards are combined in the main poker hand 510 to form a multi-indicia poker card.

Here, as shown in FIG. 5C, the player is paid for a two-pair win in hands 512, 518, and 522, as well as being paid for three-of-a-kind wins for hands 514 and 520 and a full house win in hand 516. The sum of these awards is displayed in the Paid meter 508. In some embodiments, the rules associated with the predefined condition may specify that only one set of two cards can be combined with any hand. Such embodiments may include combining pairs of cards, or suited cards one rank apart, or combinations according to other rules. These embodiments may be used when all hands are enumerated above and main hand area, although not necessarily as the number of hands shown enumerated can be done in various manners.

Figure 6A:
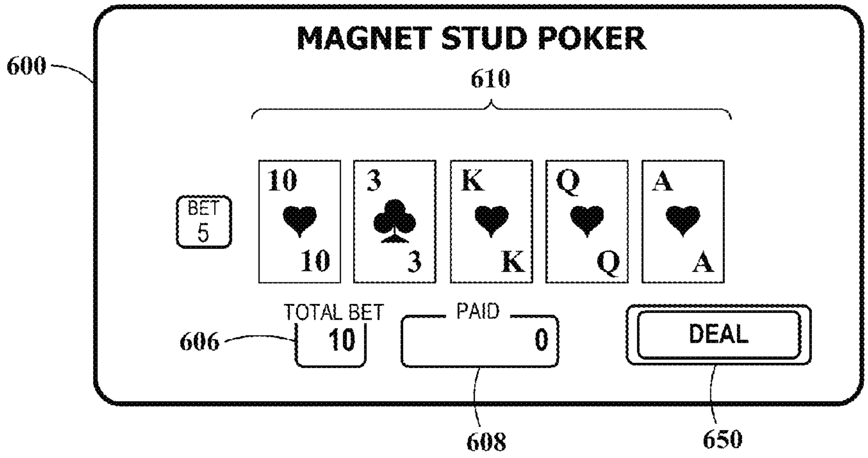
FIGS. 6A, 6B, and 6C are diagrams of a gaming display illustrating example game play according to embodiments of the invention.
Figure 6B:
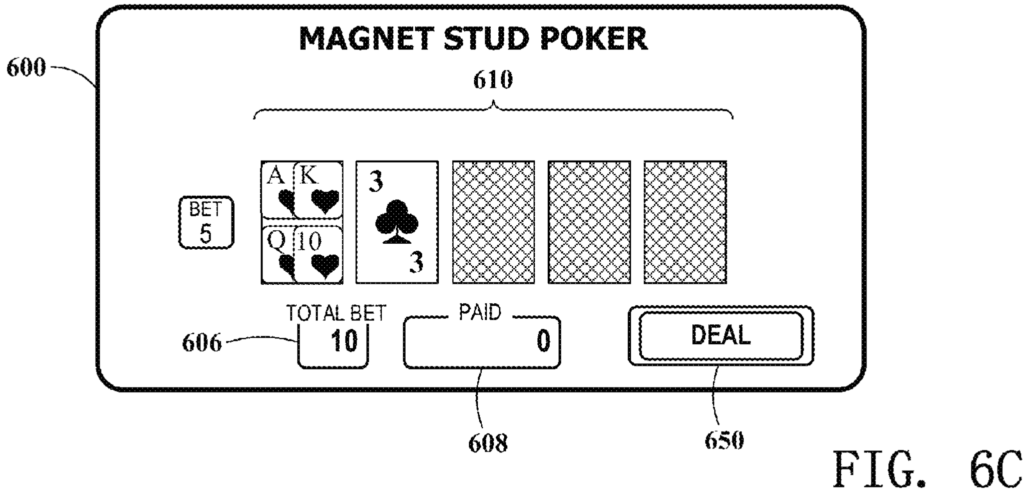
Figure 6C:
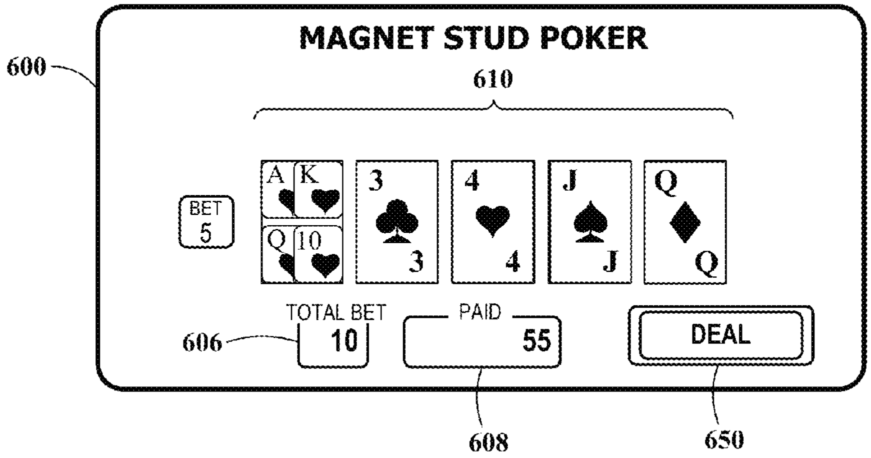

The embodiments shown in FIGS. 6A-6C illustrate a stud poker example where the predefined conditions include combining four cards to a Royal Flush. Referring to FIGS. 6A-6C, a gaming display 600 includes a poker hand 610 in the game play portion of the display, along with various meters and buttons, such as a "Total Bet" meter 606, a "Paid" meter 608, and a "Deal" game button 650.

As shown in FIG. 6B the A-H, K-H, Q-H, and 10-H are all combined to a multi-indicia card. In FIG. 6C, replacement cards are provided in the card locations that were vacated by the moved cards, and all five card hands that could be created using the resulting poker hand are paid. Here, the player missed out on the Royal Flush (i.e., did not receive the J-H in the replacement cards), but did manage to get a flush pay (Hearts with the 4-H), a straight pay (with the J-S) and a jacks-or-better pair pay (with the Q-D). Since this embodiment pays all of the possible five card pays (enumeration can be done in various visual/auditory ways to show the different pays, or no enumeration may be shown), the Paid meter reflects the sum of the awards associated with the paying poker hands.

The embodiment shown in FIGS. 7A, 7B, 7C, 7D, and 7E have a slightly different rule set then the embodiments discussed above. Referring to FIGS. 7A-7E, a gaming display 700 includes a poker hand 710 in the game play portion of the display, along with various meters and buttons, such as a "Total Bet" meter 706, a "Paid" meter 708, multiple "Hold" game buttons 760 associated with card positions in the poker hand 710, and a "Deal/Draw" game button 750.

Figure 7A:
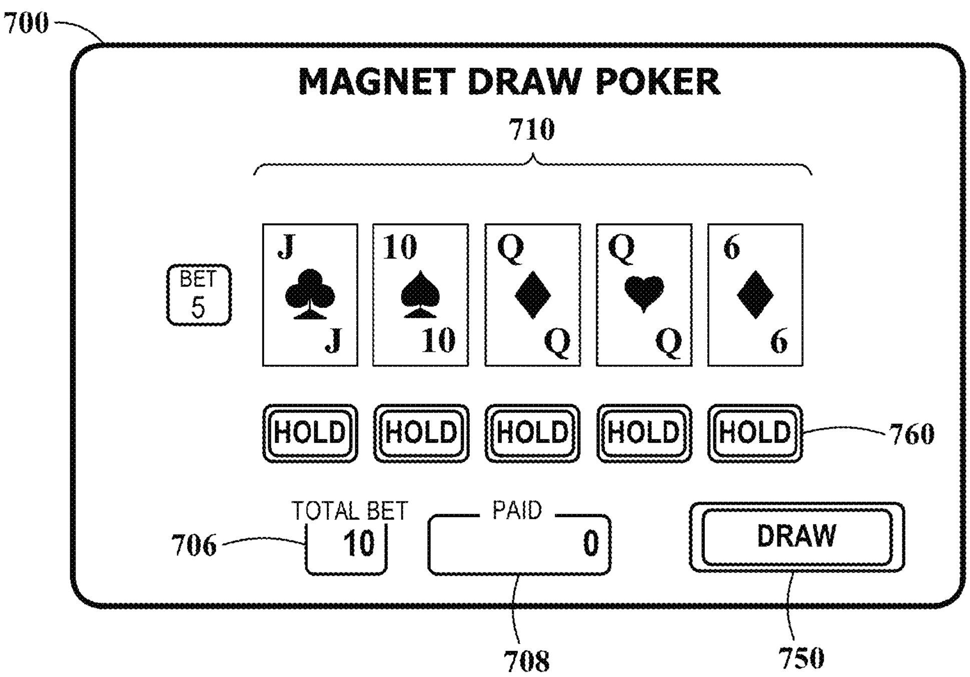
FIGS. 7A, 7B, 7C, 7D, and 7E are diagrams of a gaming display illustrating example game play according to embodiments of the invention.
Figure 7B:
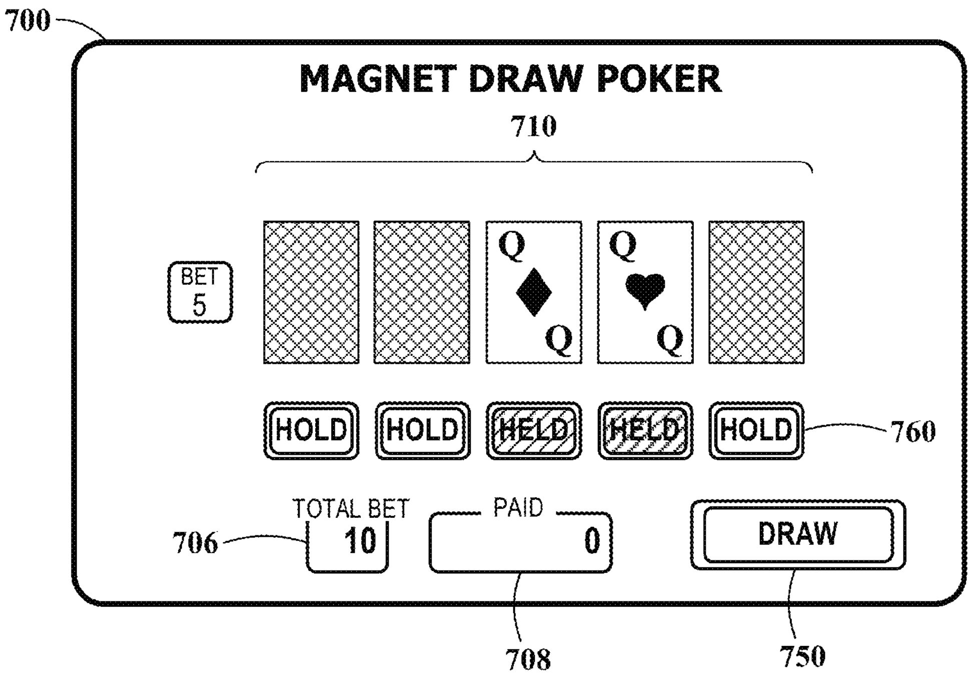
Figure 7C:
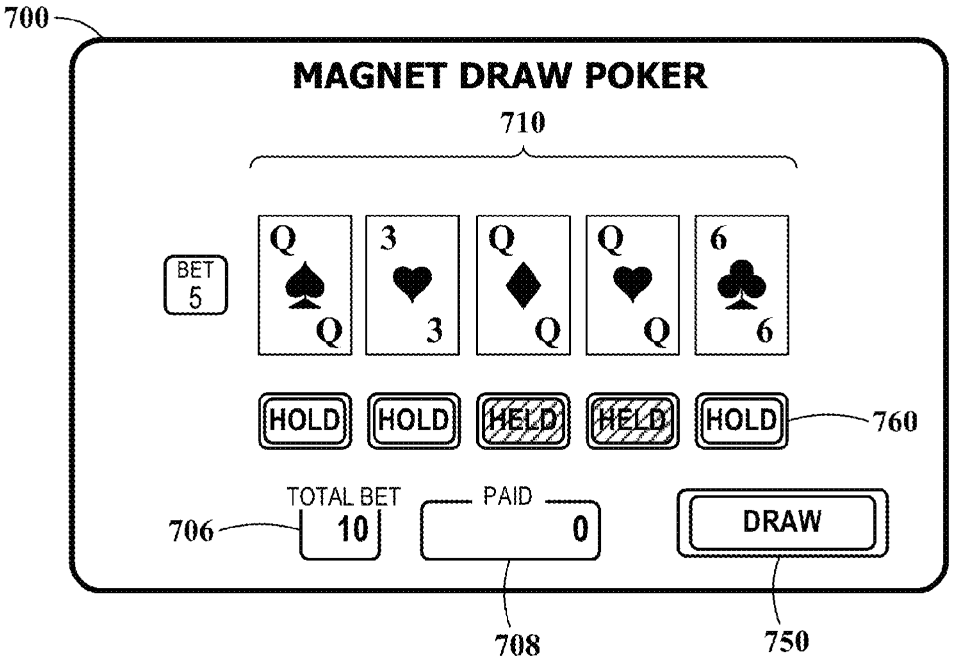
Figure 7D:
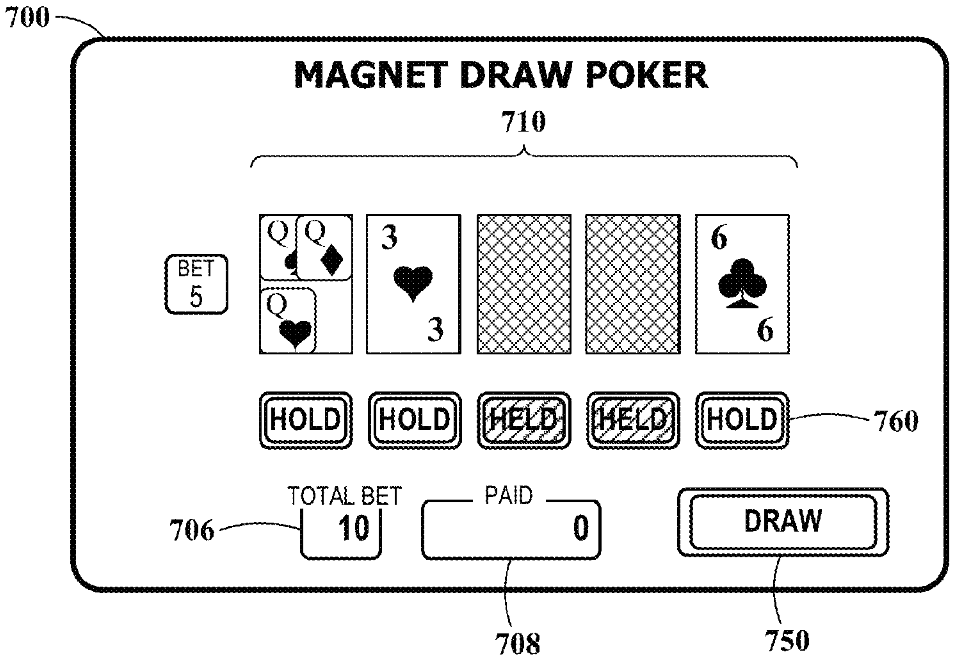
Figure 7E:
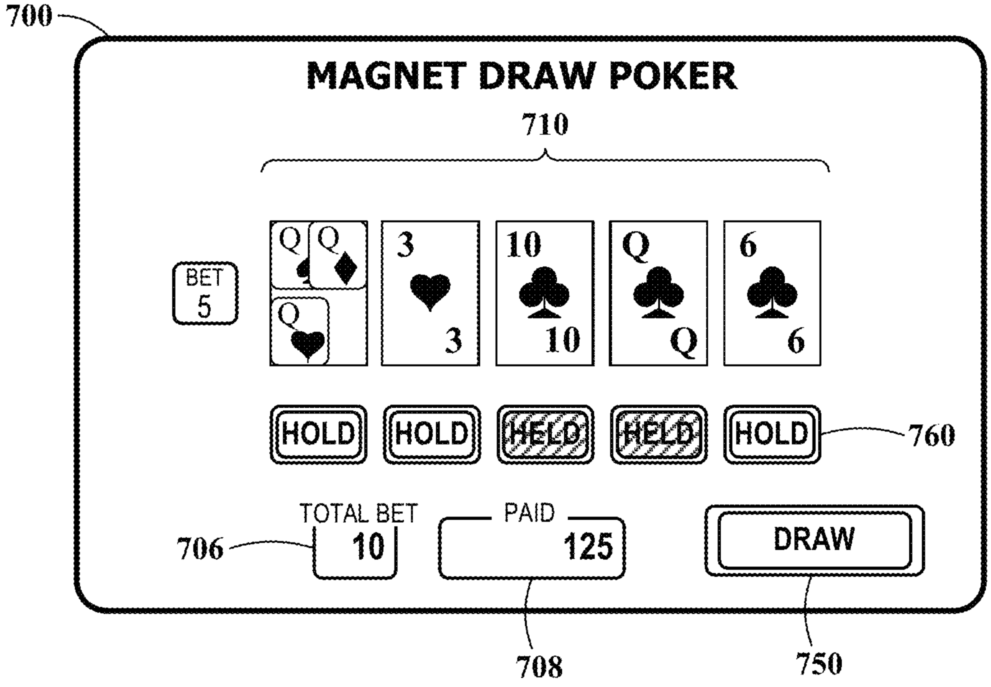

Here, the predefined conditions specify that any card movement/combinations are made after the draw in the draw poker game. Thus, as shown in FIGS. 7A and 7B, the player holds the best dealt cards and draws to replace the three discarded cards. In FIG. 7C, the player has received her draw cards and the resulting hand is compared against the rules specified in the predefined conditions or criteria to determine if any cards should be moved or combined. In this embodiment, the rules of the condition include all cards of a particular rank are combined together. Here, the player has received three Queens in the resulting hand, which are then moved to a single card location and combined into a multi-indicia game element, as shown in FIG. 7D. Additional replacement cards are used to fill in the vacated card locations as shown in FIG. 7E. The final hand with the replacement card is then evaluated for awards. Here, the player received the fourth Queen with the additional replacement cards and is paid for the best five-card hand, which in this case is a four-of-a-kind associated with 125 credits as shown on the Paid meter 708.

The embodiment shown in FIGS. 8A, 8B, 8C, 8D, 8E, and 8F includes predefined conditions that allow card movement/combinations both before and after the draw. Referring to FIGS. 8A-8F, a gaming display 800 includes a poker hand 810 in the game play portion of the display, along with various meters and buttons, such as a "Total Bet" meter 806, a "Paid" meter 808, multiple "Hold" game buttons 860 associated with card positions in the poker hand 810, and a "Deal/Draw" game button 850.

Figure 8A:
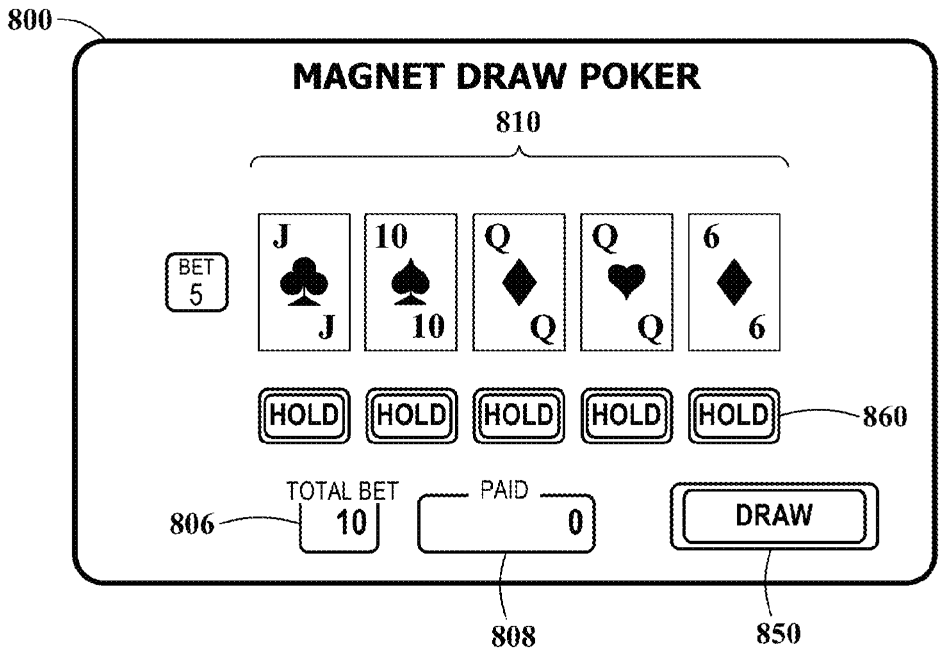
FIGS. 8A, 8B, 8C, 8D, 8E, and 8F are diagrams of a gaming display illustrating example game play according to embodiments of the invention.
Figure 8B:
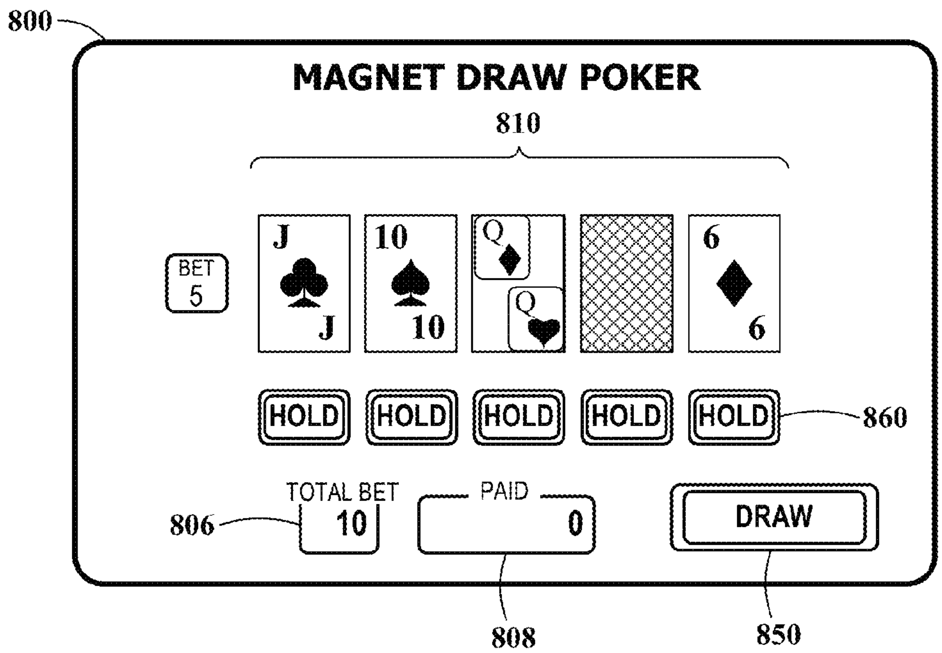
Figure 8C:
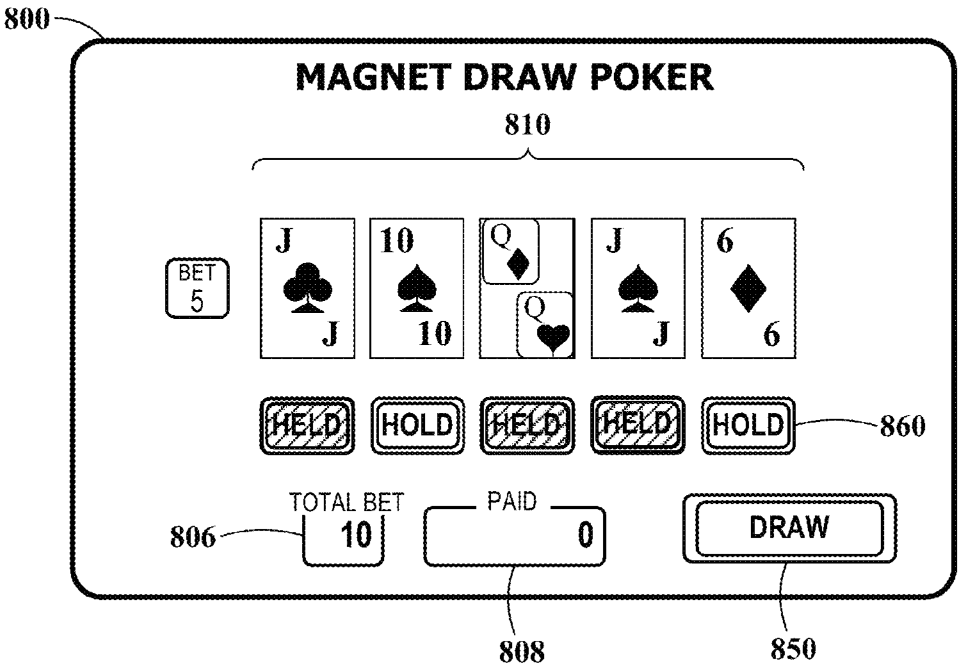
Figure 8D:
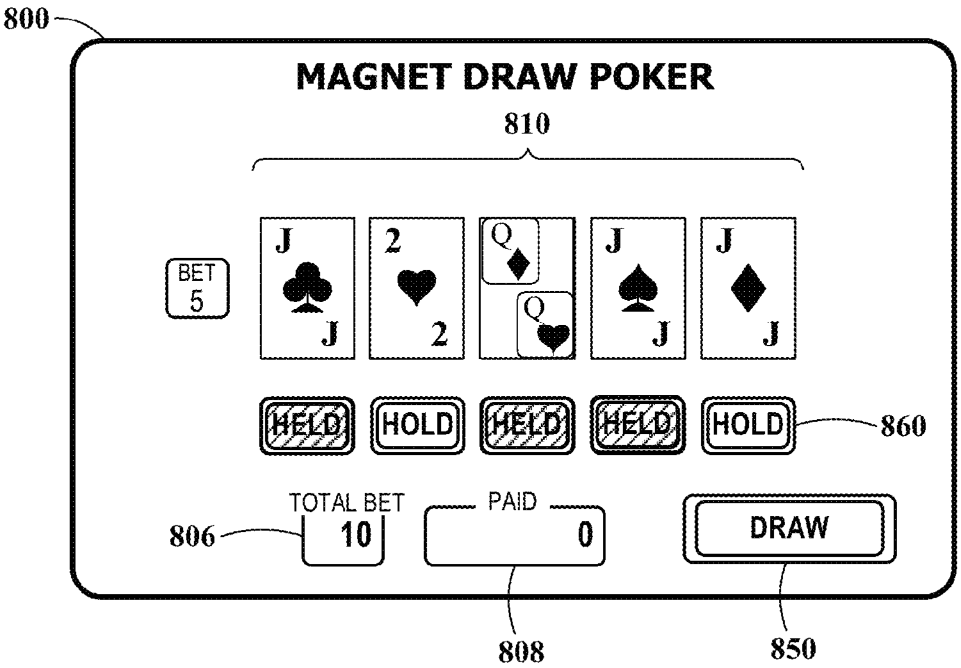
Figure 8E:
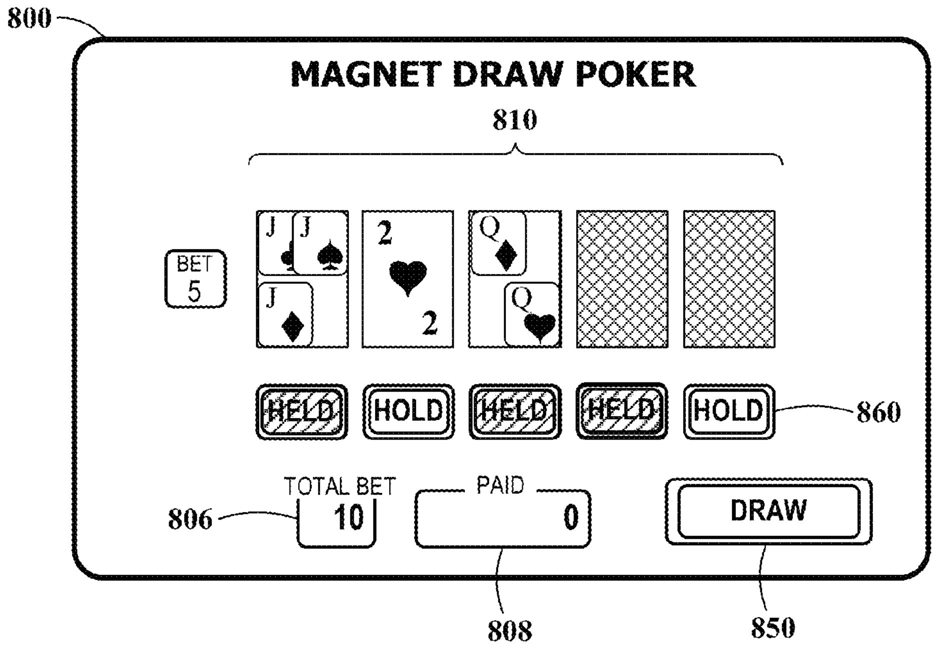
Figure 8F:
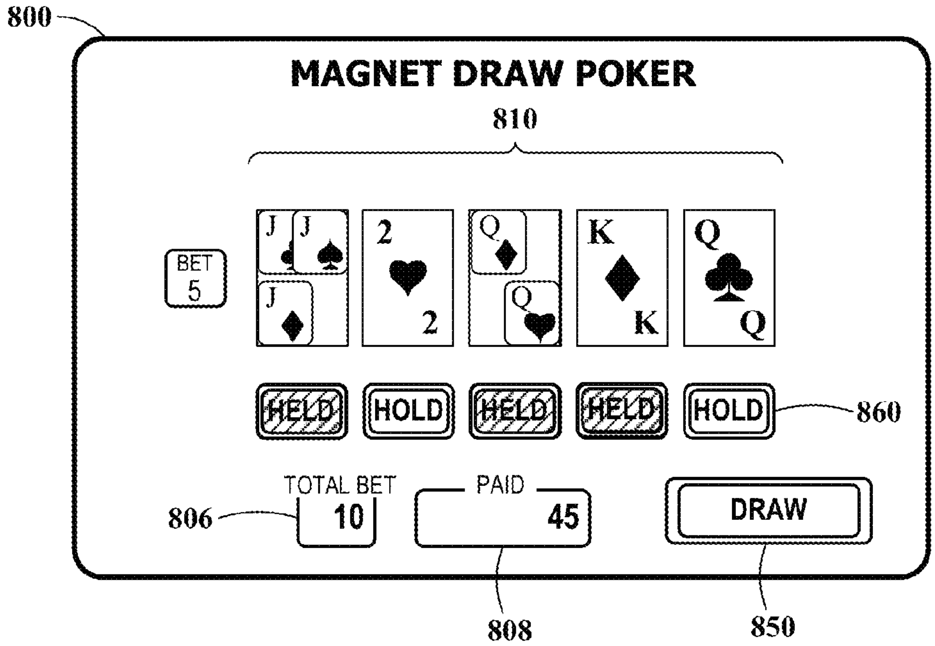

As shown in FIGS. 8A and 8B, the initially dealt Queens are combined into a multi indicia card prior to the player holding and drawing cards. After a replacement card is dealt in FIG. 8C, the player has the chance to hold cards. In other embodiments, the Jacks may have also moved and combined to form another multi-indicia card. However, in the embodiment illustrated here, only one card combination movement is done before the draw. Here, the player has held the Jacks and the multi-indicia Queens card. FIG. 8D shows the result of the discard and draw. The player has received another Jack on the draw. Although some embodiments may pay for the best five-card hand at various stages in the game (such as prior to the draw and after the draw), the embodiments shown in conjunction with these figures pays for the best five card hand after the draw and all other combinations have been made. Here, since the rules associated with the predefined condition include combining any cards of the same rank, the three Jacks are now combined as shown in FIG. 8E, and additional replacement cards are provided in the vacated card element locations as shown in FIG. 8F. The final hand is then evaluated to determine the best five-card poker hand. In this instance the best five-card hand is a Full House of Queens over Jacks, which is associated with a 45 credit pay as shown in the Paid meter 808.

The embodiments associated with FIGS. 9A, 9B, 9C, 9D, 9E, 9F, 9G, and 9H have a different method of handling and displaying combination cards.

Referring to FIGS. 9A-9H, a gaming display 900 includes a main poker hand 910 in the game play portion of the display and a separate or secondary combination area 912 of the display, along with various meters and buttons, such as a "Total Bet" meter 906, a "Paid" meter 908, multiple "Hold" game buttons 960 associated with card positions in the poker hand 910, a "Win" meter 930 associated with the combination area of the display, and a "Deal/Draw" game button 950.

These embodiments move the cards to be combined out of the displayed hand 910, evaluate them for awards and then replace then in the displayed hand. The combined cards that are moved out of the main hand 910 may be continued to be displayed or may be removed after any pays are awarded so that other cards can be combined and evaluated. After all possible cards combinations are removed and evaluated, the final poker hand may be evaluated to determine if any other awards are associated with the final hand.

Figure 9A:
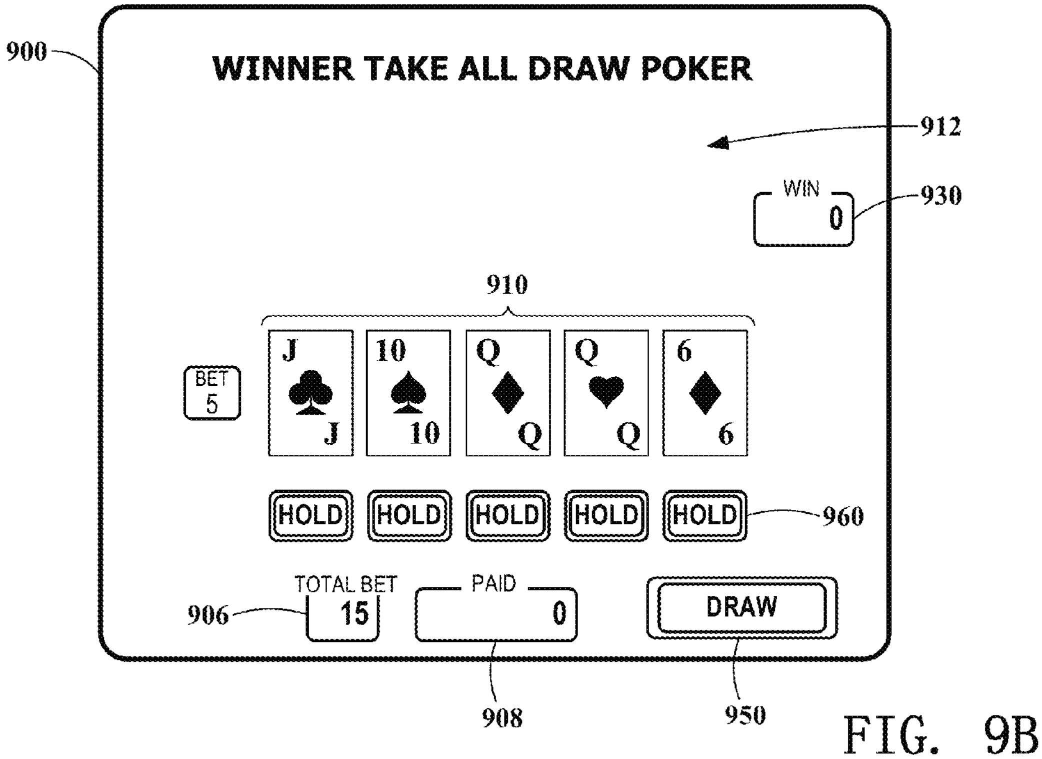
FIGS. 9A, 9B, 9C, 9D, 9E, 9F, 9G, and 9H are diagrams of a gaming display illustrating example game play according to embodiments of the invention.
Figure 9B:
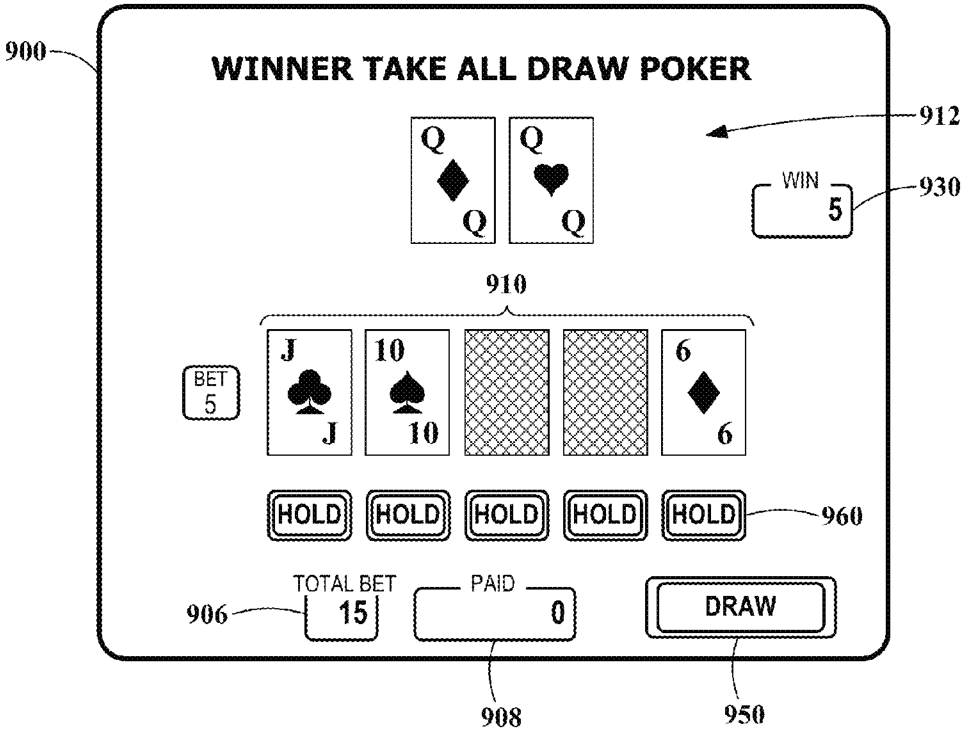
Figure 9C:
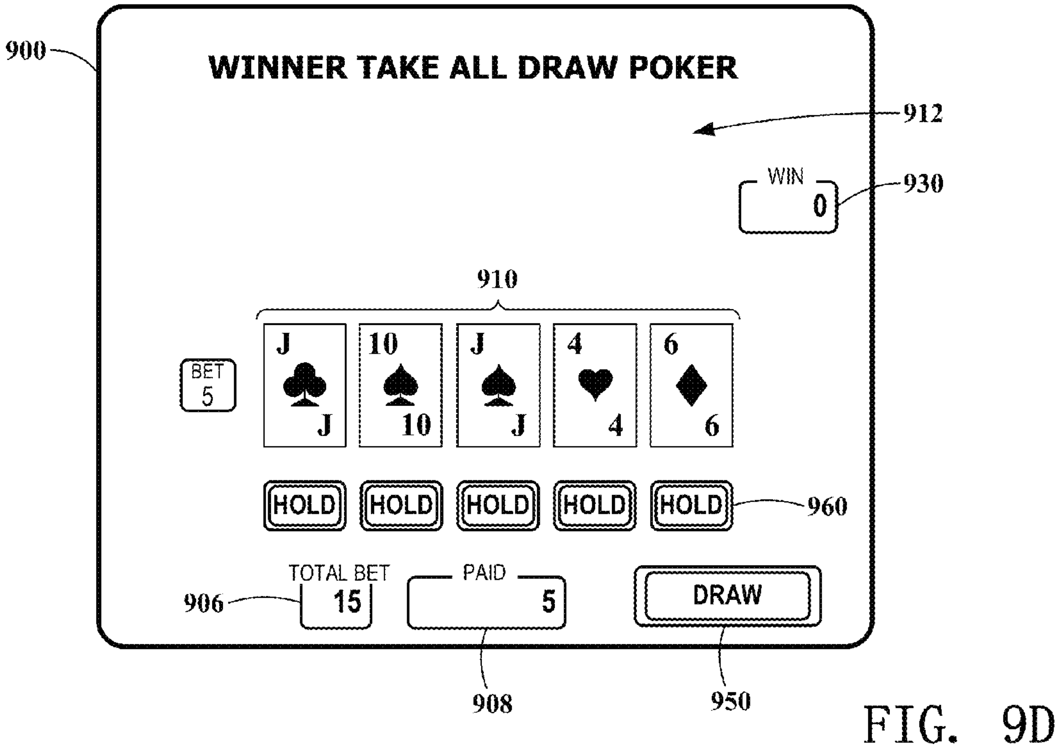
Figure 9D:
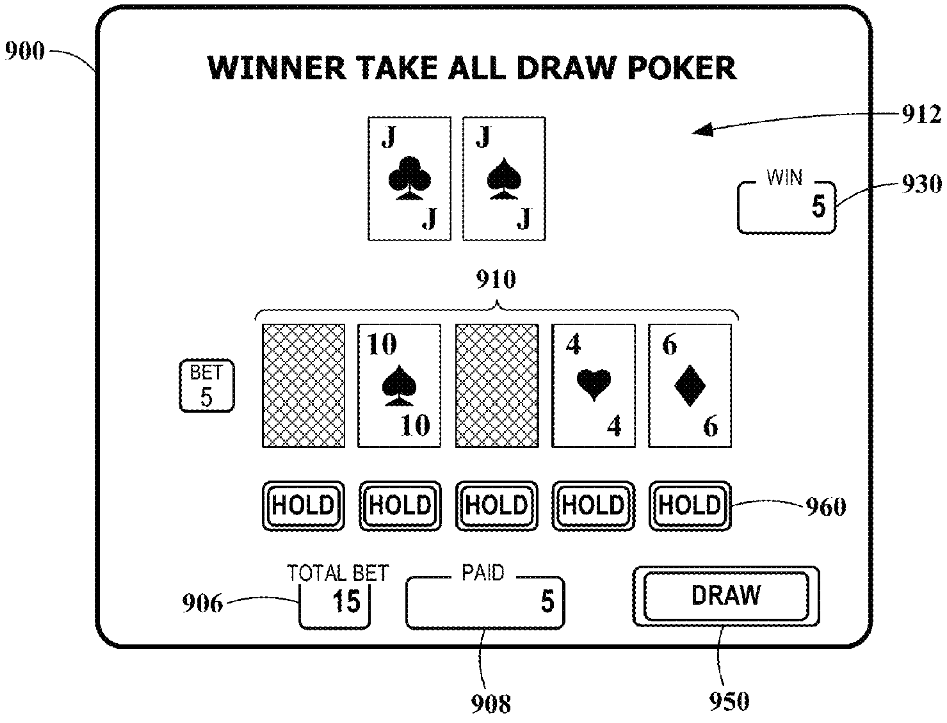

Referring to FIGS. 9A and 9B, the rules associated with the predefined conditions in this embodiment specify that cards of the same rank are combined and evaluated. Hence, the Queens that are provided in the hand 910 shown in FIG. 9A are moved to a separate combination area of the game display 912 and are evaluated for awards, which appear on a related "Win" meter 930, as shown in FIG. 9B. Here, the Queens for a pair that are higher than jacks-or-better, so they are paid 5 credits as shown on the Win meter 930 in FIG. 9B. In FIG. 9C, the win from the Win meter 930 is moved to the Paid meter 908 and the Queens in the combination area are removed. Additional replacement cards are then provided in the card element locations vacated by the two Queens. As shown in FIGS. 9C and 9D, these replacement cards include a J-S, which is then pulled out and combined with the earlier dealt J-C in the combination area 912. The pair of Jacks is evaluated and awarded 5 credits as shown on the Win meter 930.

Figure 9E:
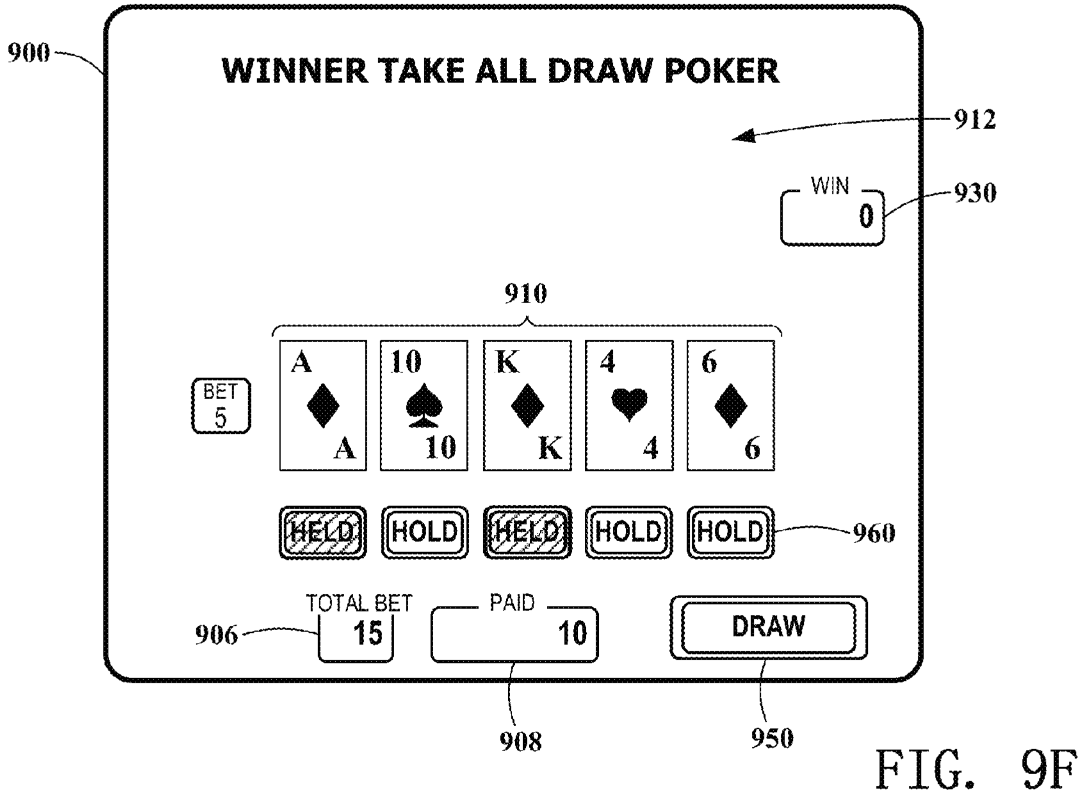
Figure 9F:
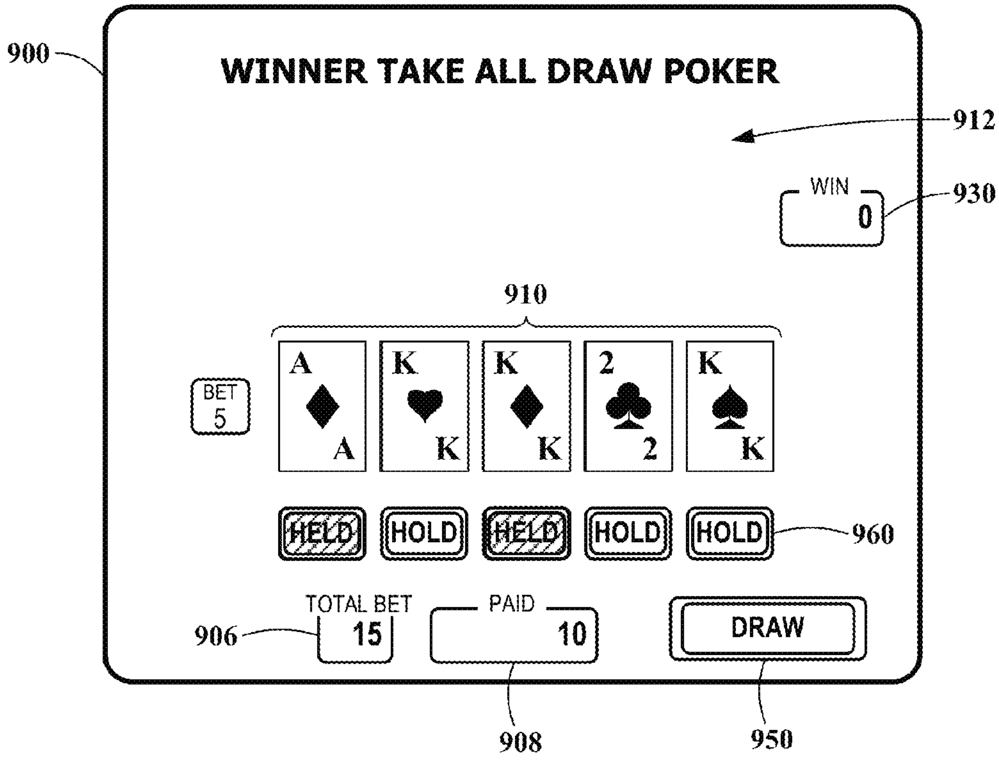
Figure 9G:
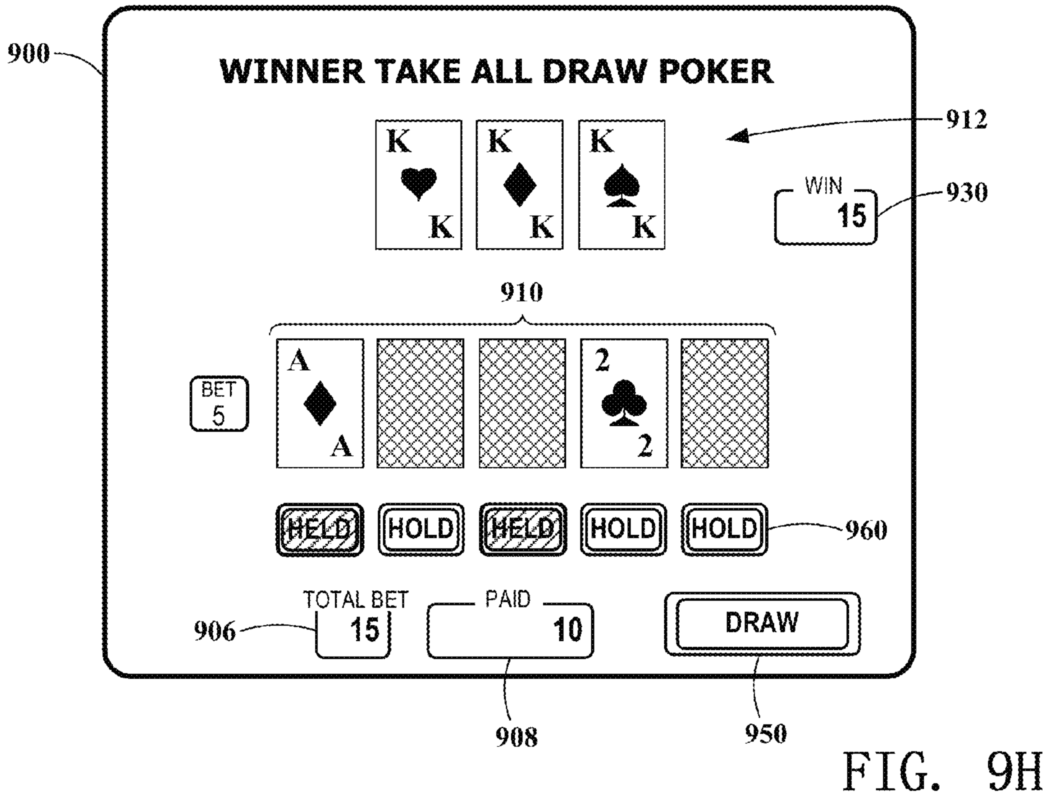
Figure 9H:
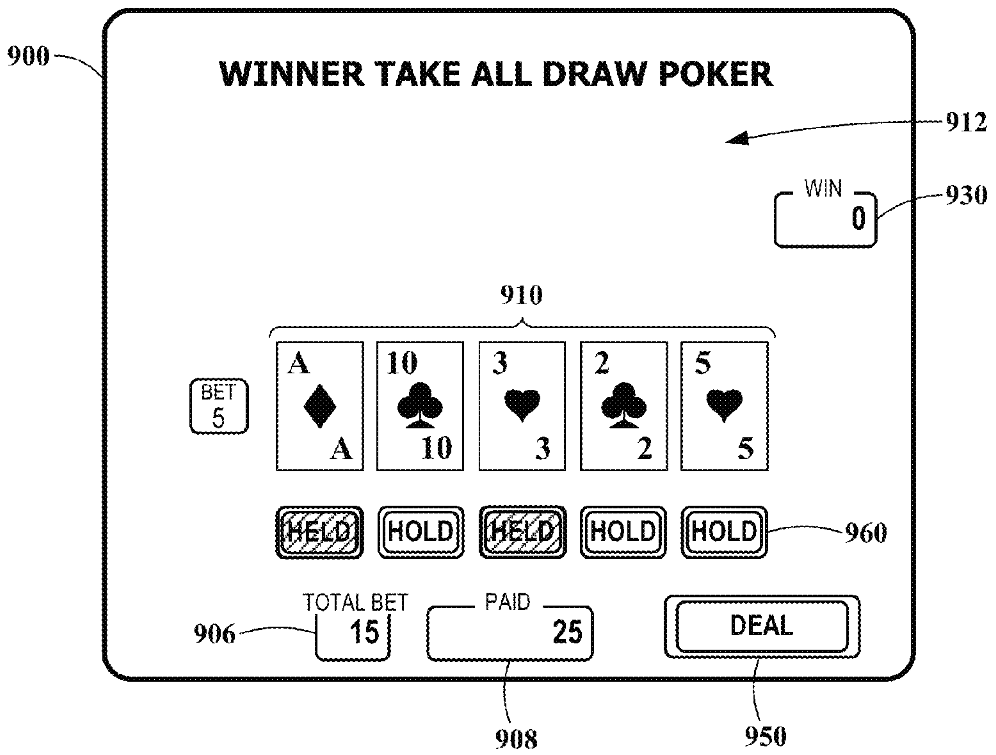

The card elements vacated by the combined Jacks is then provided with replacement cards as shown in FIG. 9E. As no further pairs exist to be combined, the player is allowed to hold and draw for another hand. Note that the award associated with the Jacks is added from the Win meter 930 to the paid meter 908 as well in FIG. 9E. Here, the player has held the A-D and K-D and has discarded the other three cards in the poker hand 910. As shown in FIG. 9F, the draw replacement cards include two additional Kings. These Kings are then combined with the previously held K-D and moved to the combination area 912 to be evaluated, as shown in FIG. 9G. The three-of-a-kind is associated with a 15 credit award, which is shown in the Win meter 930. Replacement cards are provided for the Kings in the main hand 910 as shown in FIG. 9H. Here, none of the remaining cards satisfies the condition of cards having the same rank. Thus, the game ends and the player is paid the sum of the previously indicated wins.

In the embodiments shown in FIGS. 10A, 10B, 10C, 10D, and 10E, cards that satisfy a predefined condition or criterion are combined and moved to a new hand. Replacement cards are provided in the first hand to replace the moved combination cards, and additional cards are provided in the new hand to complete the new hand.

Referring to FIGS. 10A-10E a gaming display 1000 includes a first poker hand 1010 with associated first "Win" meter 1030, a second poker hand 1012 with associated second "Win" meter 1032, and third poker hand 1014 with associated third "Win" meter 1034. In addition, the game display 1000 includes various other meters and buttons, such as a "Total Bet" meter 1006, a "Paid" meter 1008, and a "Deal" game button 1050.

Figure 10A:
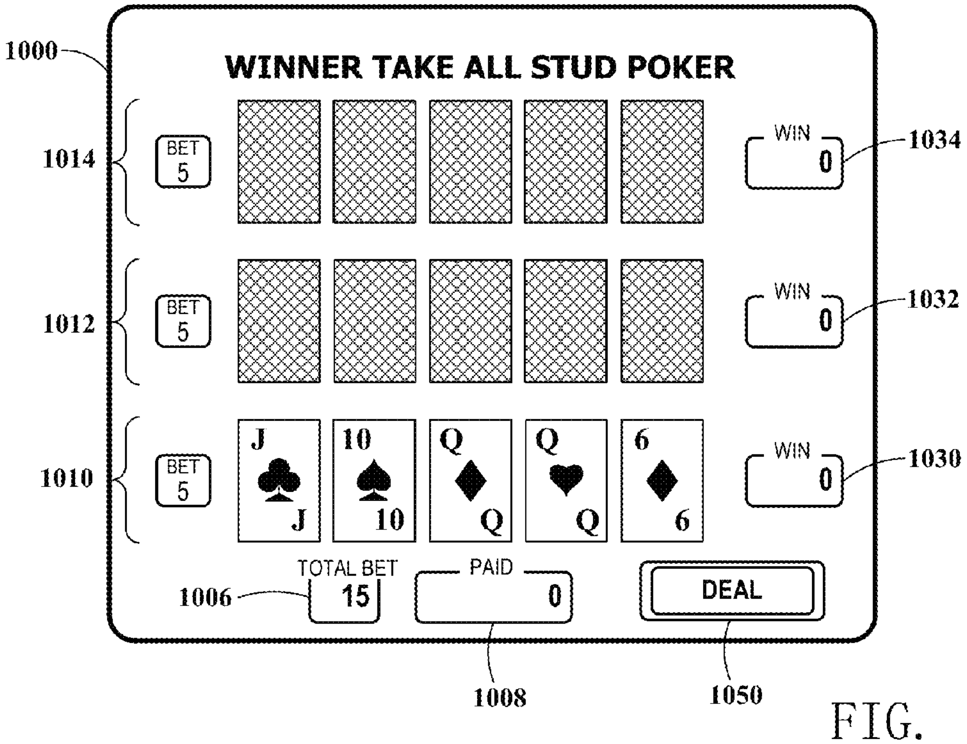
FIGS. 10A, 10B, 10C, 10D, and 10E are diagrams of a gaming display illustrating example game play according to embodiments of the invention.
Figure 10B:
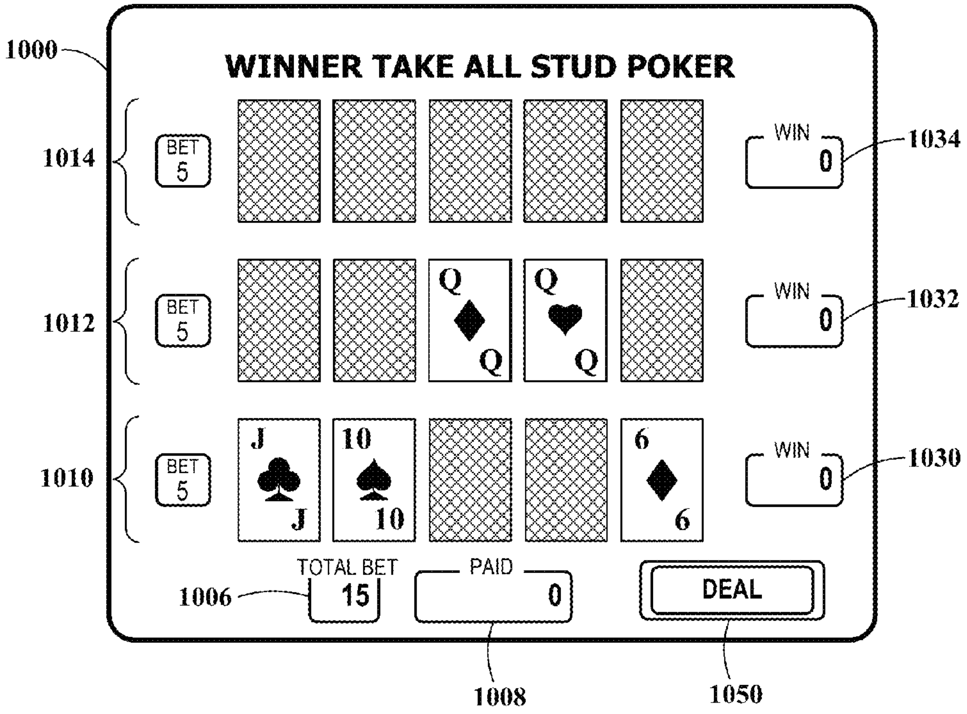
Figure 10C:
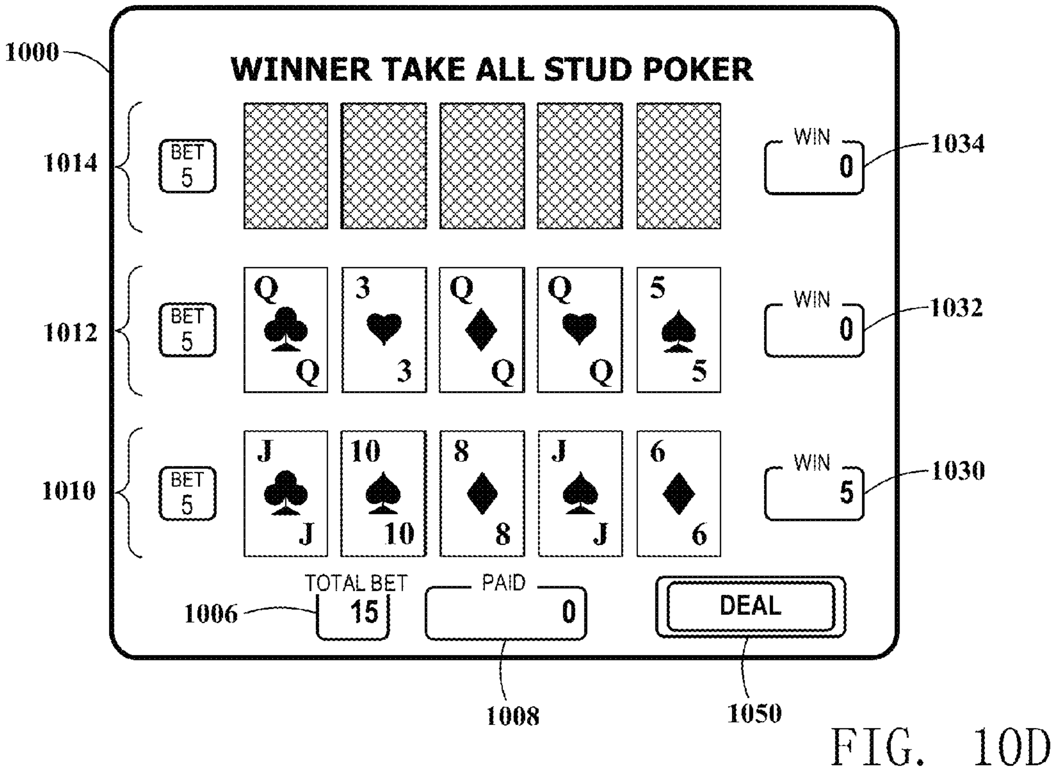

Referring to FIGS. 10A and 10B, the initially dealt Queens in the first hand 1010 are combined and moved to a second hand 1012. If no cards met the combination rules associated with the predefined condition, then in these embodiments, the first hand would be evaluated and the game would end. Other embodiments may, however, include other game steps in these situations. Returning to the illustrated embodiment, replacement cards are provided in the first and 1010 to replace the combined Queens and new cards are provided in the second hand 1012 to complete a five-card hand, as shown in FIG. 10C. In this embodiment, the first hand 1010 is now completed and is evaluated for any awards, which appear on the first Win meter 1030. Here, the pair of Jacks is associated with an award of 5 credits. In other embodiments, the pair of Jacks may be combined such as shown in FIGS. 2A and 2B, or may be moved up to another open hand and additional replacement cards would be used until no cards in the hand satisfied the predefined conditions.

Figure 10D:
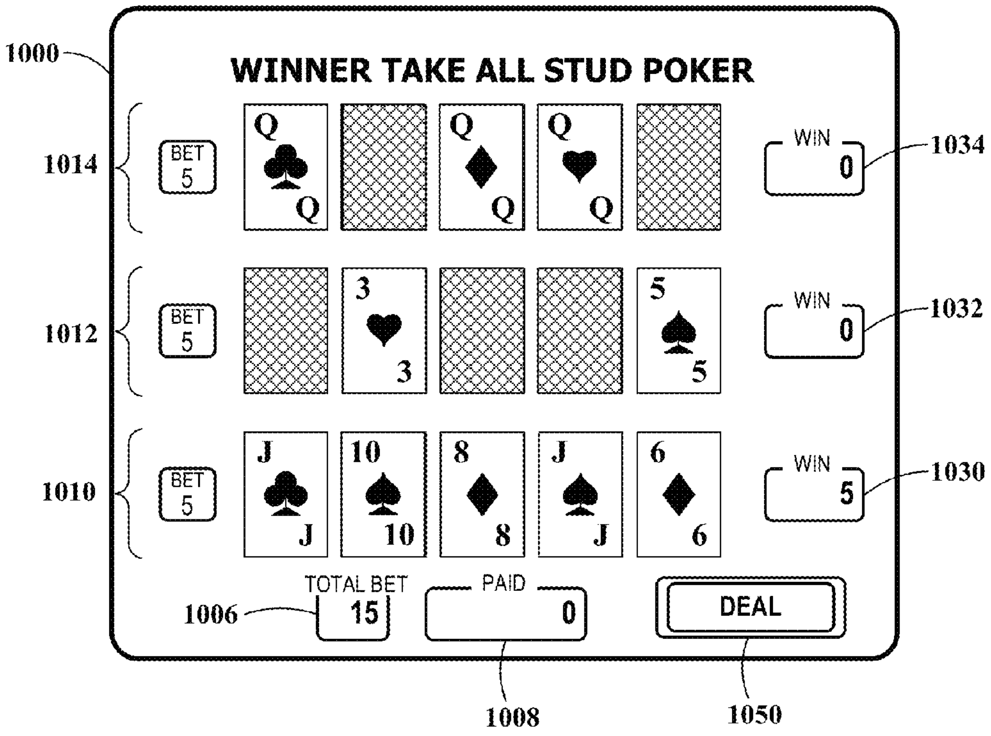
Figure 10E:
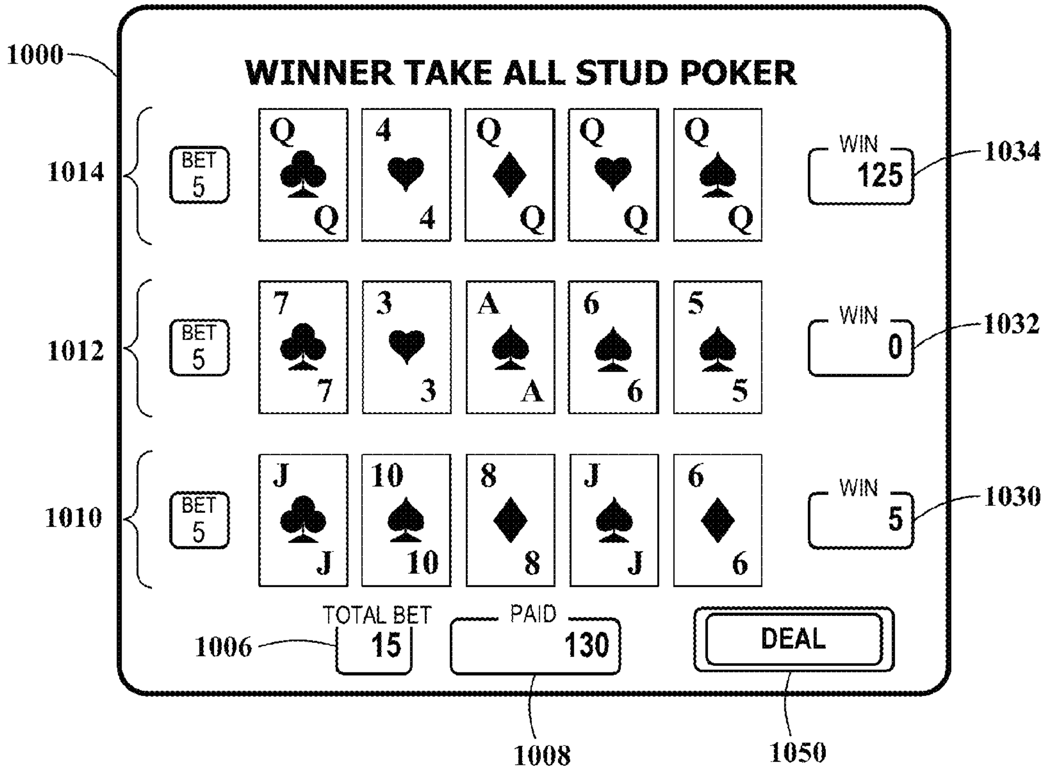

Returning to this illustrated embodiment, the second hand 1012 is compared against the predefined conditions and since there are three Queens that meet the condition of cards being of the same rank, they are combined and moved up to a third hand 1014, as shown in FIG. 10D. Replacement cards are then provided in the second hand 1012 and it is evaluated to see if the hand is associated with any awards, which would appear on the second Win meter 1032. Additionally, new cards are used to complete the third hand 1014. In this embodiment, the third hand 1014 is evaluated for awards after it has been completed and no further card combinations are used. However, in other embodiments, additional hands may be present to move card combinations that meet the predefined conditions or the cards may be combined into multi-indicia cards as shown in FIGS. 2A and 2B. Here, the new cards used to fill out the third hand 1014 include the fourth Queen resulting in a hand evaluation of a four-of-a-kind, which has a corresponding award of 125 credits as shown in the third Win meter 1034. The totals from all of the Win meters (1030, 1032, and 1034) are summed up and shown in the Paid meter 1008.

In another similar embodiment, the combined cards may be combined into a multi-indicia card and then moved up (e.g., the Queens in FIG. 10A may be combined to a multi-indicia card and pushed into the second hand 1012). If replacement cards also satisfy a combination rule, they may push up the combined cards from the previous hand to a third hand. In the example above, the replacement cards may be revealed for the first hand 1010 before any other cards are shown in the second hand 1012. When the two jacks appear in the first hand due to the replacement cards, they are combined and pushed to the second hand 1012. This push, however, moves the multi-indicia queens from the second hand 1012 to the third hand 1014. Replacement cards are again drawn for the first hand 1010. When no more combination cards exist for the first hand, the first hand is evaluated for wins, and the replacement cards are drawn for the second hand. The process of combining and pushing cards meeting a combination criterion is carried out until no cards in any hand that was activated by having cards pushed to it has cards meeting a combination criteria. In this embodiment, players can get a string of hands to play based on a good cards received in an initially dealt hands, and timely replacement cards being drawn.

Figure 11A:
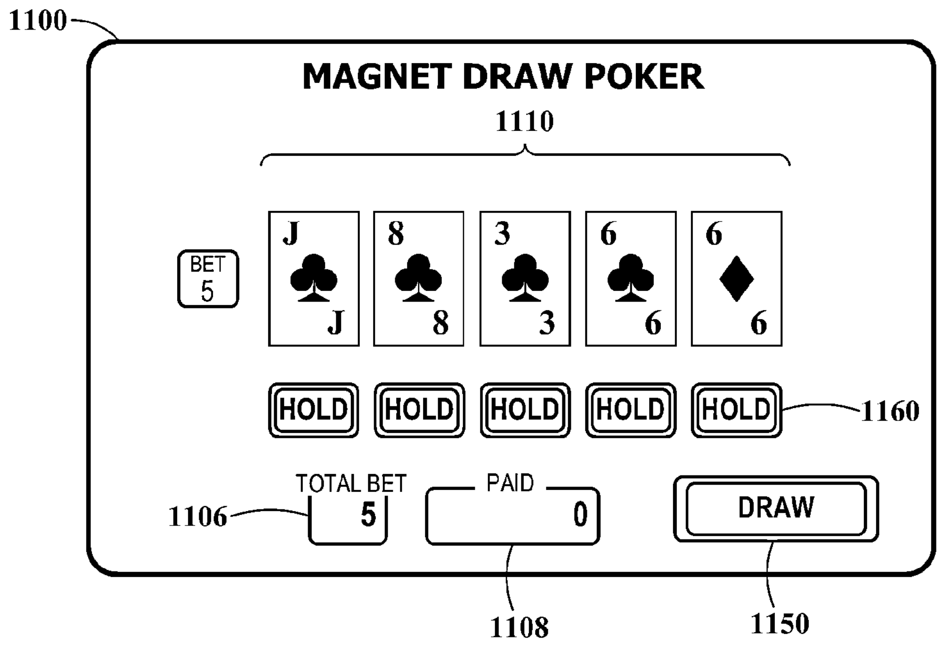
FIGS. 11A and 11B are diagrams of a gaming display illustrating example game play according to embodiments of the invention.
Figure 11B:
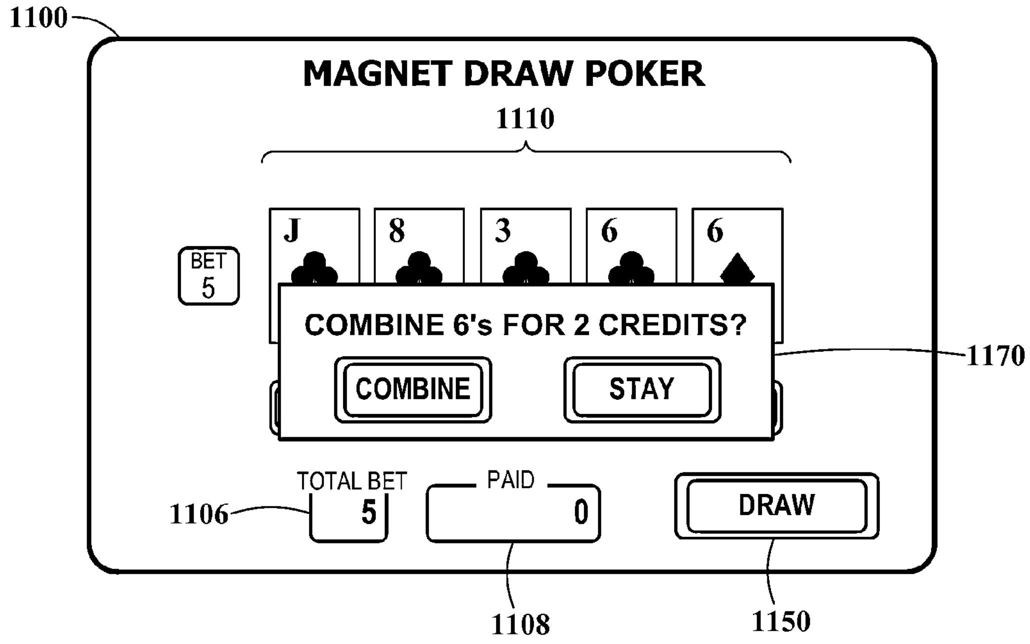

The embodiment shown in FIGS. 11A and 11B illustrate examples of games where the player is asked whether they want to make the combination. Referring to FIGS. 11A and 11B, a gaming display 1100 includes a poker hand 1110 in the game play portion of the display, along with various meters and buttons, such as a "Total Bet" meter 1106, a "Paid" meter 1108, multiple "Hold" game buttons 1160 associated with card positions in the poker hand 1110, and a "Deal/Draw" game button 1150.

As shown in FIG. 11A, the player is dealt a hand with four club cards. The rules associated with the predefined condition look to move and combine cards of the same rank, but for an additional wager. Thus, the player has the option of combining the 6s for an additional side bet or playing the hand as is without the combination or additional bet. In some embodiments, it may be advantageous to not combine cards, even when no extra wager is required. If this possibility exists in certain games, these embodiments may also ask the player if they want to combine cards or not. Here, for example, as shown in FIG. 11B, a dialog box 1170 is presented asking whether the player would like to combine two or more of the cards. In some embodiments, this combination action may require an additional wager or side bet, while in other embodiments, the choice to combine cards may not require any additional wager.

In other embodiments, different conditions surrounding the combination may dictate the amount required as an additional wager to receive the combination. For example, if a player receives a pair of 2s in a dealt hand, a dialog box 1170 may require an additional wager of one credit to combine the 2s. On the other hand, if four-to-a-royal-flush are initially dealt, a dialog box 1170 (or other request mechanism) may require an additional wager of 25 credits to combine the four cards and draw four new cards. This additional wager may be structured so that it is always beneficial from a mathematical standpoint to combine the cards for the additional wager.

Figure 12:
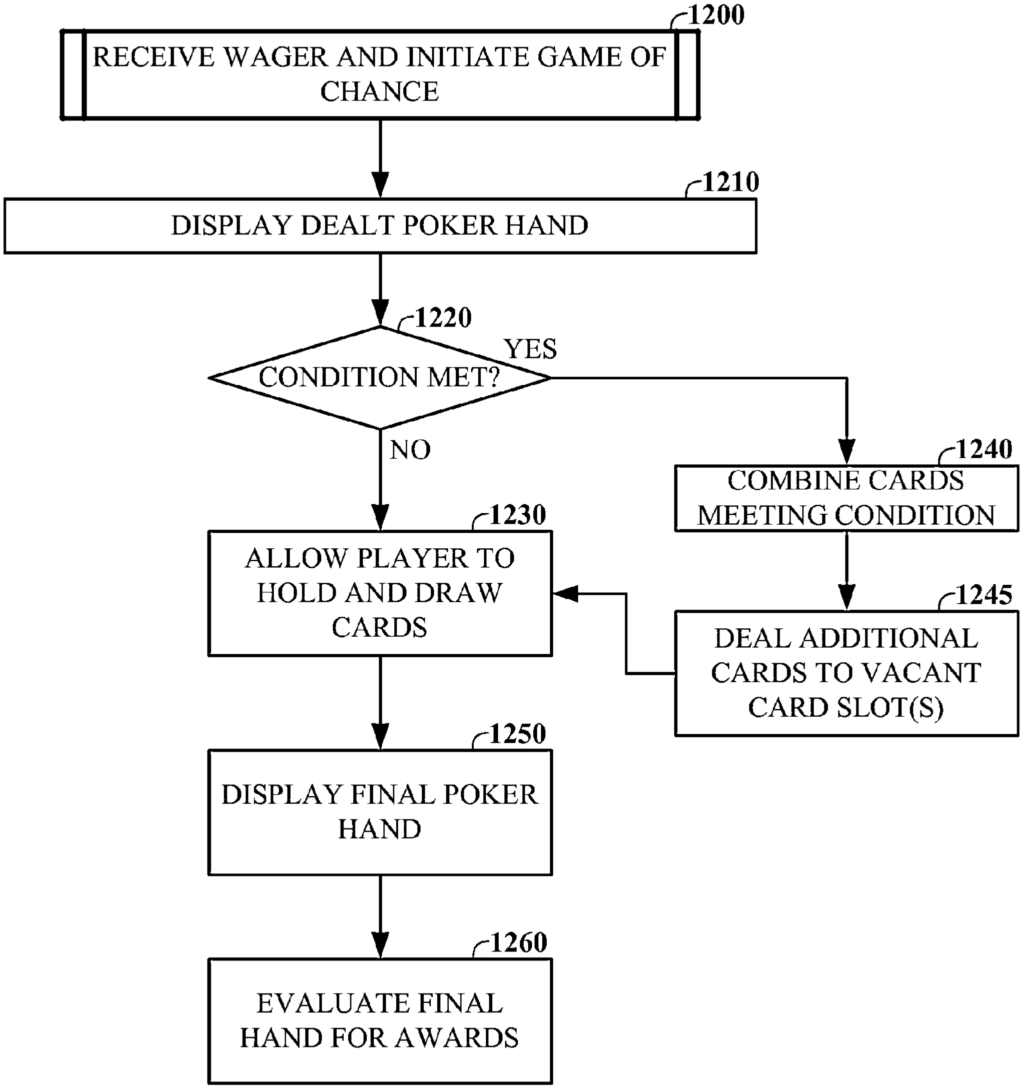
FIG. 12 is a flow diagram illustrating a method of operating a gaming device according to embodiments of the invention.

FIG. 12 is a flow diagram illustrating a method of operating a gaming device according to embodiments of the invention. Although various processes are shown in a particular order in this flow diagram, the order of these processes can be changed in other embodiments without deviating from the scope or spirit of this concept. Hence, the order of the processes shown is for illustrative purposes only and is not meant to be restrictive. Additional game processes may also be included between various processes even though they are not shown in these flow diagrams for clarity purposes. Further each of the processes may be performed by components in a single game device, such as by a game processor, or may be performed in part or whole by a remote server or processor connected to the gaming device via a network. Each process may be encoded in instructions that are stored in a memory, a computer-readable medium, or another type of storage device.

Referring to FIG. 12, the flow begins at process 1200 where a wager is received and a game is initiated. In process 1210 an initial poker hand is dealt to a player. In process 1220 it is determined if a predefined condition is satisfied. If the condition is satisfied, the flow proceeds to process 1240 where cards meeting the condition are combined. After combining the cards in process 1240, additional cards are dealt to complete the vacant card slots or locations in process 1245. The flow then returns to process 1230 where the player is allowed to hold and draw cards. If the predefined condition is not met as determined in process 1220, the flow would proceed directly to process 1230 without combining any cards. After the player is allowed to hold and draw cards, the flow proceeds to process 1250 where the final poker hand is displayed, and then to process 1260 where the final hand is evaluated for awards.

Note that this example method is just one embodiment of how a game operation can be implemented. As discussed and shown above, many variations exist which may require additional, less, or different processes to complete.

The embodiments discussed above are primarily related to video poker games. However, this concept can be applied to a variety of games of chance played on gaming devices. For example, in a slot machine embodiment, symbols meeting predefined conditions may be combined to form multi-indicia symbols, such as symbols having subsections to display and use each of the combined symbols. The vacant symbol locations may be filled with other symbols, the reels associated with those vacant symbols may rotate or nudge to complete the game screen, or the reels associated with the vacant symbols may be re-spun. Some these possible embodiments are discussed below in association with FIGS. 14A-18G.

Figure 13:
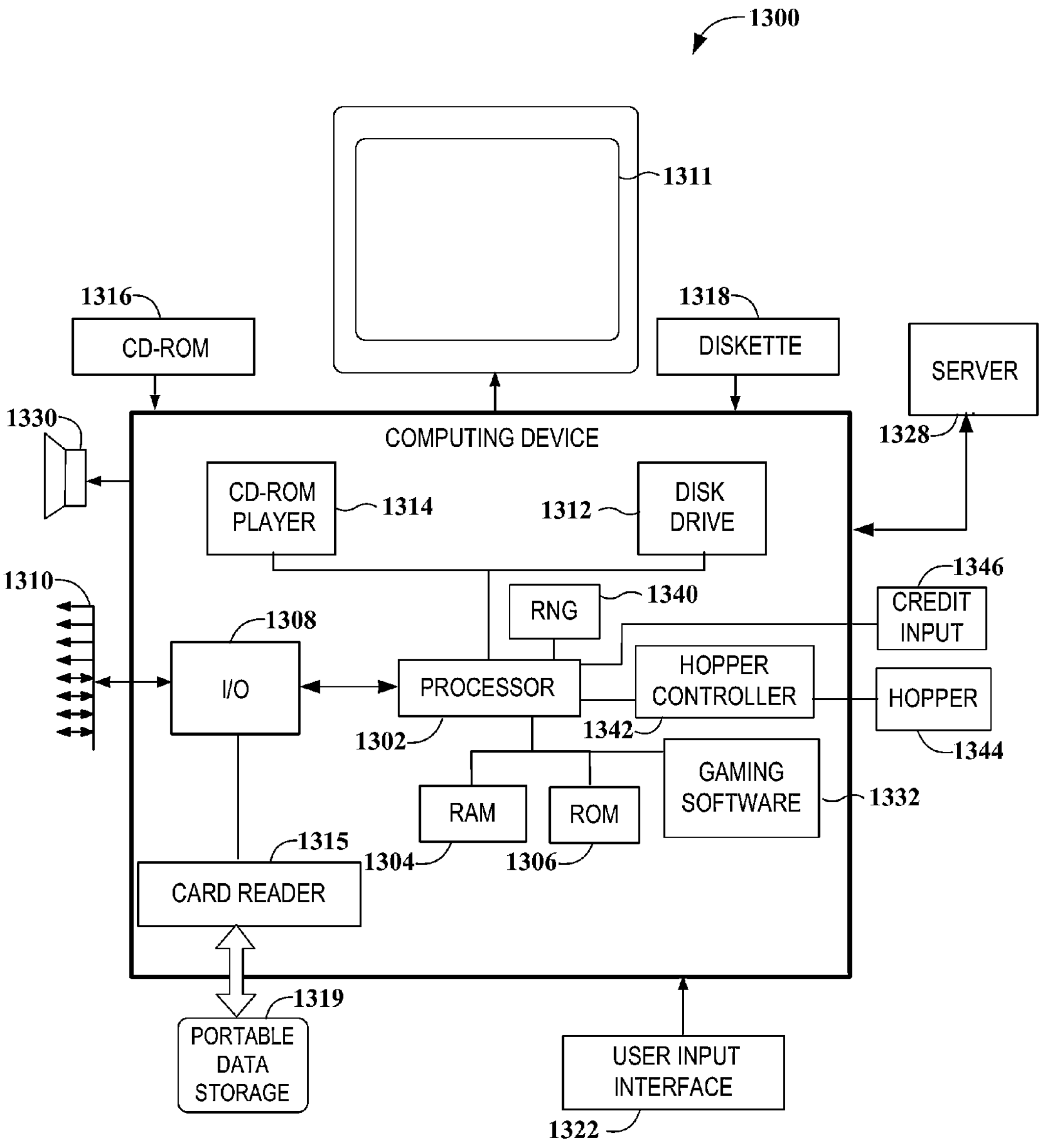
FIG. 13 is a block diagram illustrating a computing arrangement according to embodiments of the invention.

As may now be readily understood, one or more devices may be programmed to play various embodiments of the invention. The present invention may be implemented as a casino gaming machine or other special purpose gaming kiosk as described hereinabove, or may be implemented via computing systems operating under the direction of local gaming software, and/or remotely-provided software such as provided by an application service provider (ASP). The casino gaming machines utilize computing systems to control and manage the gaming activity. An example of a representative computing system capable of carrying out operations in accordance with the invention is illustrated in FIG. 13.

Hardware, firmware, software or a combination thereof may be used to perform the various gaming functions, display presentations and operations described herein. The functional modules used in connection with the invention may reside in a gaming machine as described, or may alternatively reside on a stand-alone or networked computer. The computing structure 1300 of FIG. 13 is an example computing structure that can be used in connection with such electronic gaming machines, computers, or other computer-implemented devices to carry out operations of the present invention.

The example computing arrangement 1300 suitable for performing the gaming functions in accordance with the present invention typically includes a central processor (CPU) 1302 coupled to random access memory (RAM) 1304 and some variation of read-only memory (ROM) 1306. The ROM 1306 may also represent other types of storage media to store programs, such as programmable ROM (PROM), erasable PROM (EPROM), etc. The processor 1302 may communicate with other internal and external components through input/output (I/O) circuitry 1308 and bussing 1310, to provide control signals, communication signals, and the like.

The computing arrangement 1300 may also include one or more data storage devices, including hard and floppy disk drives 1312, CD-ROM drives 1314, card reader 1315, and other hardware capable of reading and/or storing information such as DVD, etc. In one embodiment, software for carrying out the operations in accordance with the present invention may be stored and distributed on a CD-ROM 1316, diskette 1318, access card 1319, or other form of computer readable media capable of portably storing information. These storage media may be inserted into, and read by, devices such as the CD-ROM drive 1314, the disk drive 1312, card reader 1315, etc. The software may also be transmitted to the computing arrangement 1300 via data signals, such as being downloaded electronically via a network, such as the Internet. Further, as previously described, the software for carrying out the functions associated with the present invention may alternatively be stored in internal memory/storage of the computing device 1300, such as in the ROM 1306.

The computing arrangement 1300 is coupled to the display 1311, which represents a display on which the gaming activities in accordance with the invention are presented. The display 1311 represents the "presentation" of the video information in accordance with the invention, and may be any type of known display or presentation screen, such as liquid crystal displays, plasma displays, cathode ray tubes (CRT), digital light processing (DLP) displays, liquid crystal on silicon (LCOS) displays, etc.

Where the computing device 1300 represents a stand-alone or networked computer, the display 1311 may represent a standard computer terminal or display capable of displaying multiple windows, frames, etc. Where the computing device is embedded within an electronic gaming machine, the display 1311 corresponds to the display screen of the gaming machine/kiosk. A user input interface 1322 such as a mouse, keyboard/keypad, microphone, touch pad, trackball, joystick, touch screen, voice-recognition system, etc. may be provided. The display 1311 may also act as a user input device, e.g., where the display 1311 is a touch-screen device.

Chance-based gaming systems such as slot machines, in which the present invention is applicable, are governed by random numbers and processors, as facilitated by a random number generator (RNG). The fixed and dynamic symbols generated as part of a gaming activity may be produced using one or more RNGs. RNGs as known in the art may be implemented using hardware, software operable in connection with the processor 1302, or some combination of hardware and software. The present invention is operable using any known RNG, and may be integrally programmed as part of the processor 1302 operation, or alternatively may be a separate RNG controller 1340.

The computing arrangement 1300 may be connected to other computing devices or gaming machines, such as via a network. The computing arrangement 1300 may be connected to a network server 1328 in an intranet or local network configuration. The computer may further be part of a larger network configuration as in a global area network (GAN) such as the Internet. In such a case, the computer may have access to one or more web servers via the Internet. In other arrangements, the computing arrangement 1300 may be configured as an Internet server and software for carrying out the operations in accordance with the present invention may interact with the player via one or more networks.

Other components directed to gaming machine implementations include manners of gaming participant payment, and gaming machine payout. For example, a gaming machine including the computing arrangement 1300 may also include a hopper controller 1342 to determine the amount of payout to be provided to the participant. The hopper controller may be integrally implemented with the processor 1302, or alternatively as a separate hopper controller 1342. A hopper 1344 may also be provided in gaming machine embodiments, where the hopper serves as the mechanism holding the coins/tokens of the machine. The wager input module 1346 represents any mechanism for accepting coins, tokens, coupons, bills, electronic fund transfer (EFT), tickets, credit cards, smart cards, membership cards, etc., for which a participant inputs a wager amount. It will be appreciated that the primary gaming software 1332 may be able to control payouts via the hopper 1344 and controller 1342 for independently determined payout events.

Among other functions, the computing arrangement 1300 provides an interactive experience to players via input interface 1322 and output devices, such as the display 1311, speaker 1330, etc. These experiences are generally controlled by gaming software 1332 that controls a primary gaming activity of the computing arrangement 1300. The gaming software 1332 may be temporarily loaded into RAM 1304, and may be stored locally using any combination of ROM 1306, drives 1312, media player 1314, or other computer-readable storage media known in the art. The primary gaming software 1332 may also be accessed remotely, such as via the server 1328 or the Internet.

The primary gaming software 1332 in the computing arrangement 1300 is shown here as an application software module. According to embodiments of the present invention, this software 1332 provides a slot game or similar game of chance as described hereinabove. For example, the software 1332 may present, by way of the display 1311, representations of symbols to map or otherwise display as part of a slot based game having reels. However, in other embodiments, the principles of this concept may be applied to poker games or other types of games of chance. One or more aligned positions of these game elements may be evaluated to determine awards based on a paytable. The software 1332 may include instructions to provide other functionality as known in the art and described herein, such as shown and described above regarding FIGS. 1A-12 and below regarding FIGS. 14A-19D.

FIGS. 14A-19D illustrate embodiments of slot games utilizing symbol combination/movement techniques included in the present concept. Each of the figure families (FIGS. 14A-14D, 15A-15D, 16A-16E, 17A-G, 18A-G, and 19A-D) show some of the possible combination/movement technique variations. However, many other implementations and embodiments are possible. For example, while the following embodiments illustrate a video slot game with five reels and three reel-stop locations associated with a main game display, other embodiments may include physical reels, transmissive-screen overlays, more or less reels, more or less reel stop locations associated with one or more of the reels, different paylines or pay structures, etc.

Figure 14A:
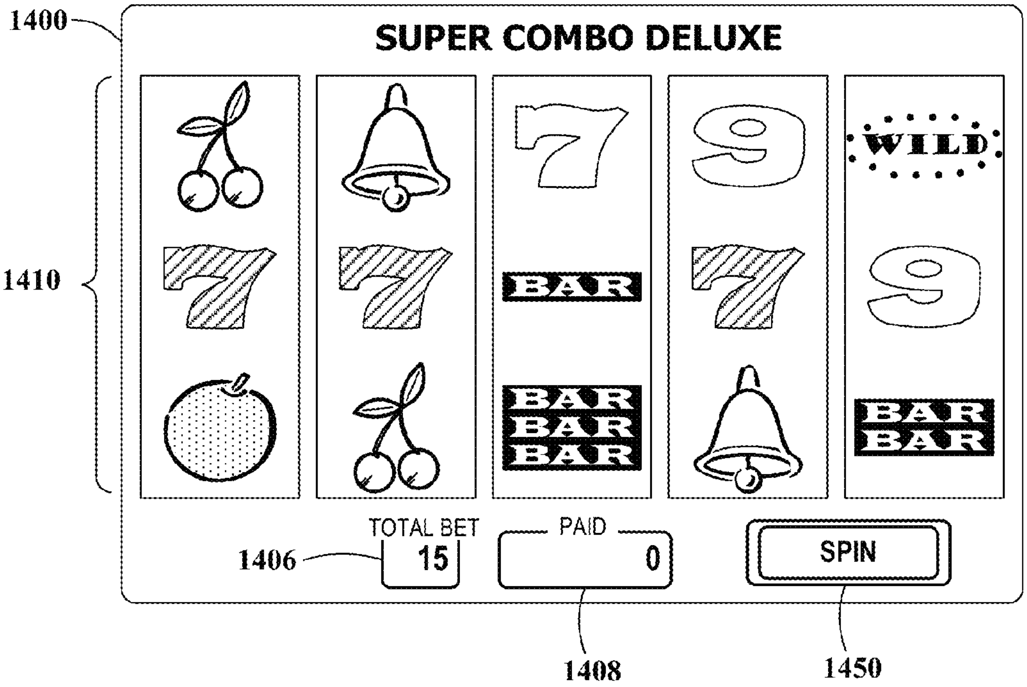
FIGS. 14A, 14B, 14C, and 14D are diagrams of a gaming display illustrating example game play according to embodiments of the invention.
Figure 14B:
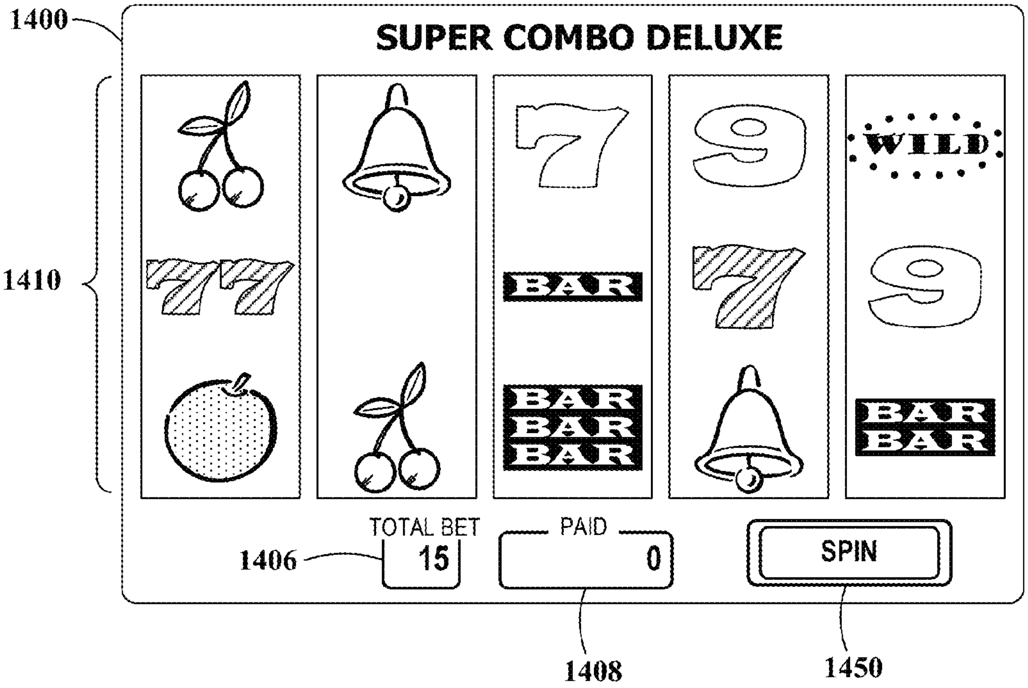
Figure 14C:
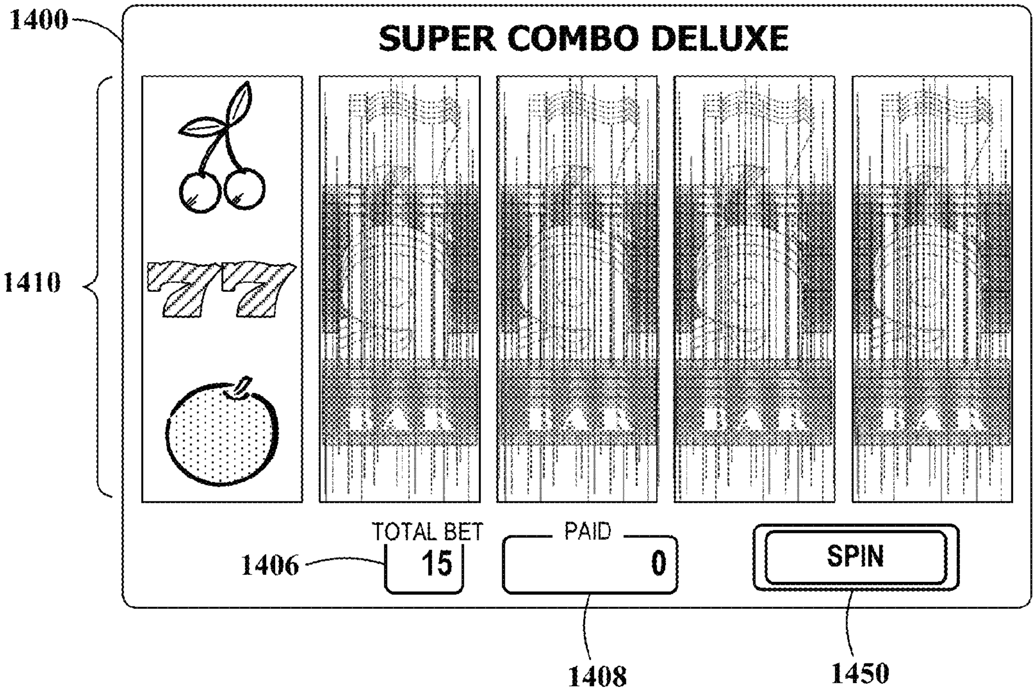
Figure 14D:
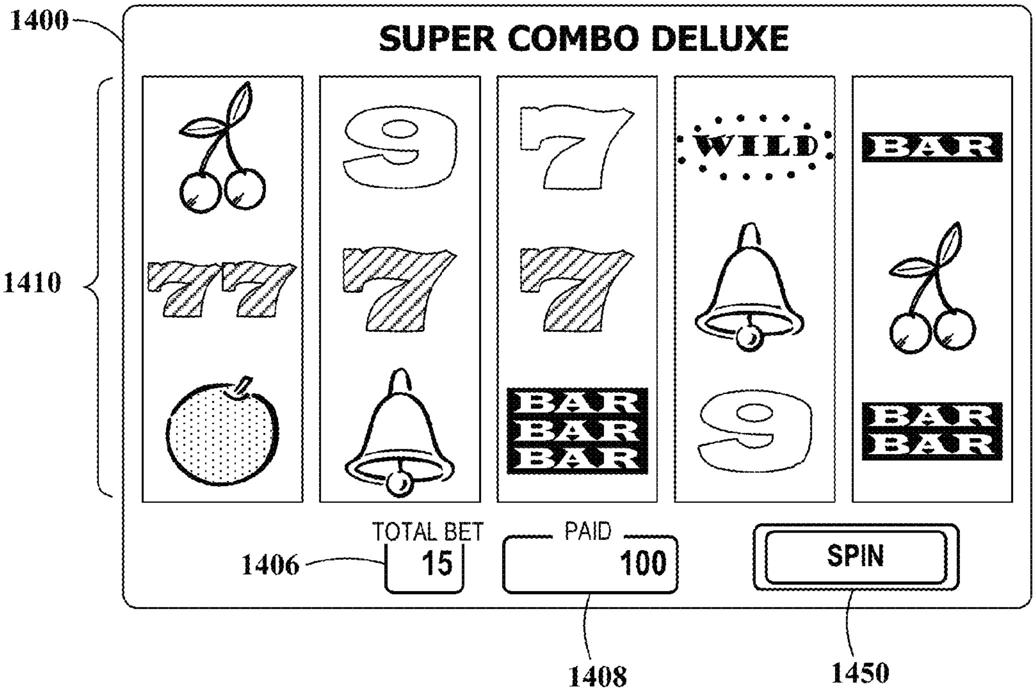

Referring to FIGS. 14A-14D, a video slot display 1400 includes a main game play area 1410, which has five game reels, and a secondary area the includes various meters and buttons, such as a "Bet" meter 1406, a "Paid" meter 1408, and a "SPIN" button 1450. In this embodiment a player places a 15 credit wager and initiates the game by pressing the SPIN button 1450 or another physical or soft button, or other means, to spin the reels. As shown in FIG. 14A, the reel have come to rest with 15 symbols appearing on the main game display 1410. A predefined rule for this embodiment is defined to combine similar horizontally-adjacent symbols into multi-indicia symbols for any symbol appearing on Reel 1 (the leftmost reel in this example). As shown in FIG. 14B, the two shaded-sevens, which appear next to each other on Reels 1 and 2 are combined into a multi-indicia symbol. Reel 1, the reel with the multi-indicia symbol is then held and the remaining four reels are re-spun as shown in FIG. 14C. Here, the location vacated by the shaded-seven that moved from Reel 2 may be left vacant, may be replaced by another shaded-seven, may be replaced by another symbol, or the reel strip may contract to eliminate the vacant space. In other embodiments, a copy of the shaded-seven could move and combine with the shaded-seven on Reel 1 while the original shaded-seven remained in the original reel location. In other embodiments, after the shaded-seven moved to Reel 1, the individual reel location vacated by the moved shaded-seven symbol may have a reel strip associated with that location that is spun to select a new symbol that appears in the vacant symbol location. In FIG. 14D, the re-spun reels (Reels 2-5) come to rest and the result of the game is evaluated. As shown in FIG. 14D, two more shaded-sevens have now landed on the middle payline for Reels 2 and 3. In this embodiment, the evaluation for awards results in a four-symbol pay for the shaded-sevens (each subsection of the multi-indicia symbol is counted independently as one symbol, and each of the shaded-sevens on Reels 2 and 3 are counted as a symbol). In other embodiments, other evaluation techniques may be used, such as the payline resulting in two three symbol pays. Although in this embodiment, an award evaluation is made after the re-spinning of the reels not having a multi-indicia symbol, in other embodiments the shaded-sevens on Reels 2 and 3 may be combined with the existing two-symbol shaded-seven or Reel 1 to form a 4-symbol multi-indicia symbol and re-spinning Reels 2-5 again (i.e., symbols are combined after each time at least one reel is spun until no more symbol combinations can be formed). Again, numerous other variations and embodiments exist using these or similar symbol-combination techniques.

Figure 15A:
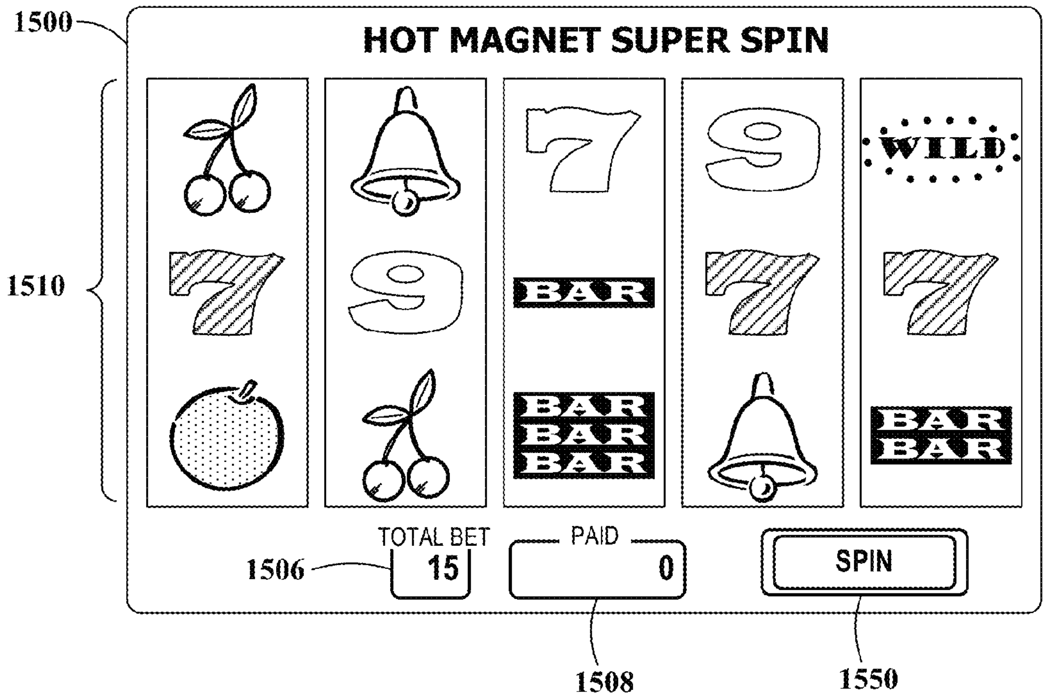
FIGS. 15A, 15B, 15C, and 15D are diagrams of a gaming display illustrating example game play according to embodiments of the invention.

Referring to the embodiment shown in FIGS. 15A-15D, a video slot display 1500 includes a main game play area 1510, which has five game reels, and a secondary area the includes various meters and buttons, such as a "Bet" meter 1506, a "Paid" meter 1508, and a "SPIN" button 1550. Here, a predefined rule indicates that a special symbol triggers a "magnet" bonus effect when it appears on Reel 1 (the leftmost reel). The special symbol may be constant-defined special symbol, or one of the game symbols may be randomly or otherwise designated as the "special" symbol prior to the reels being spun. In some embodiments, this special symbol may be a mystery to the player; while in other embodiments, a selected special symbol may be displayed to the player prior to the reels stopping so that the player is rooting for the symbol to appear on the main game display area 1510. In the current embodiment, the shaded-seven symbol is indicated as the "special" symbol. As shown in FIG. 15A, a shaded-seven appears in the middle position of Reel 1 after the initial game spin.

Figure 15B:
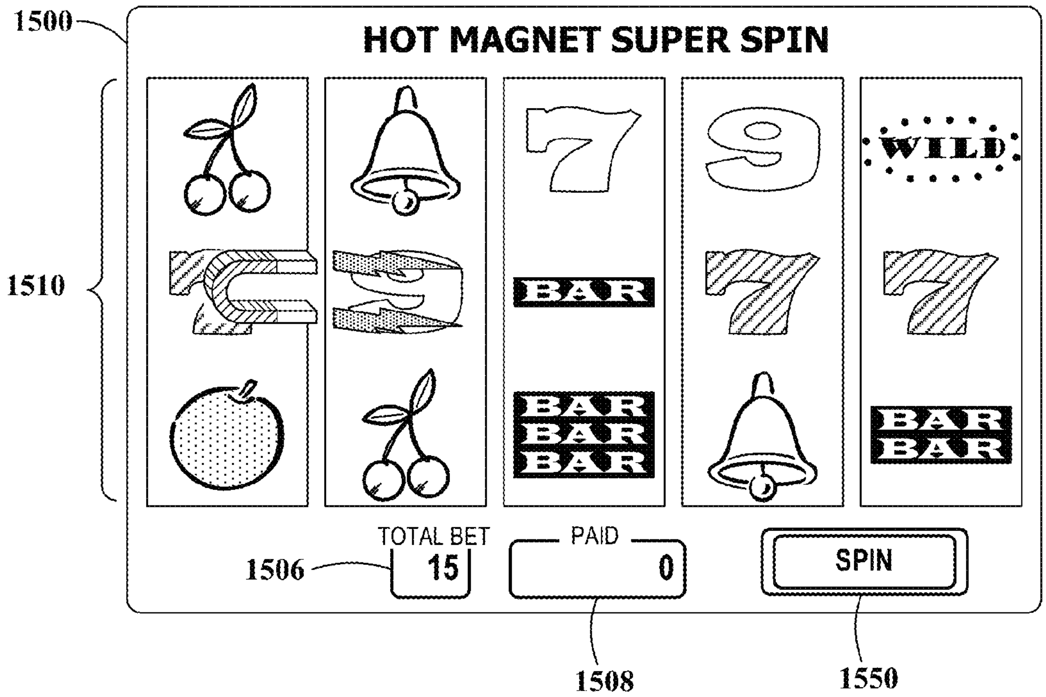

In FIG. 15B, and bonus magnet animation is triggered where similar symbols are attracted to the special symbol. In this embodiment, only symbols on the same horizontal level are attracted by the "magnet effect." However, in other embodiments, symbols from any position on the main game display 1510 or another display may be "attracted" to the special symbol.

Figure 15C:
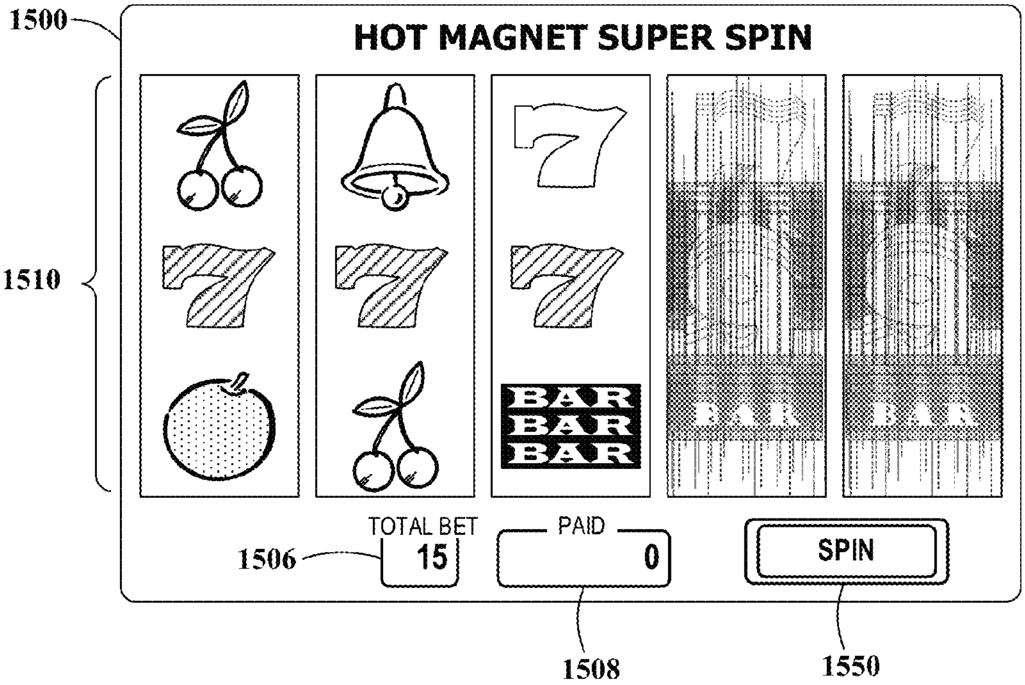
Figure 15D:
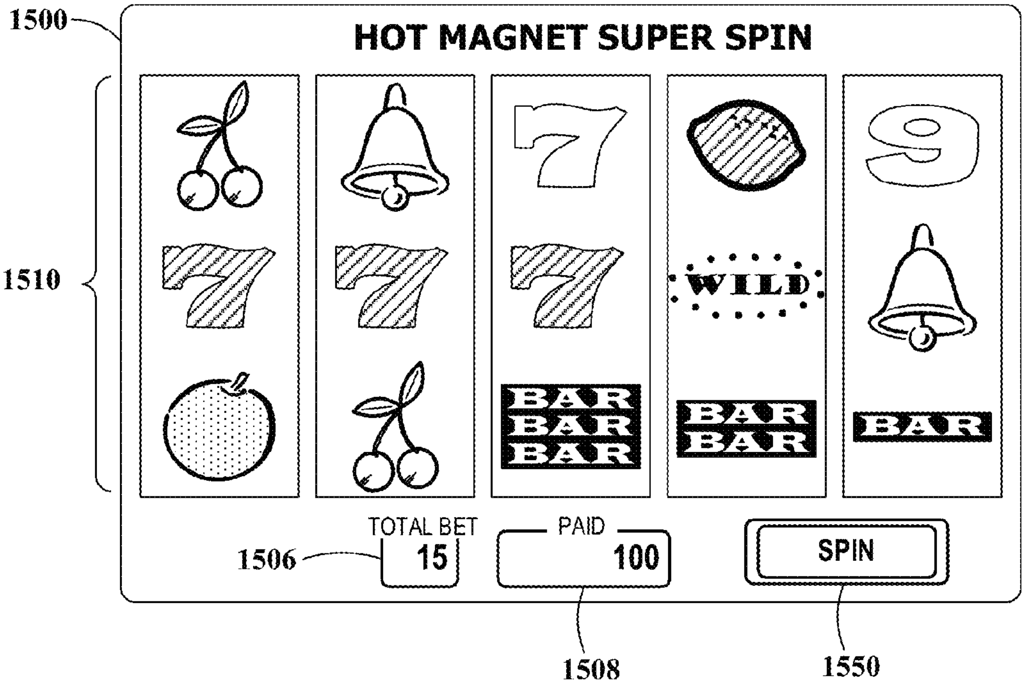

As shown in FIG. 15C, the attracted shaded-sevens from Reels 4 and 5 are moved to Reels 2 and 3 where they replace the original symbols in the middle positions of Reels 2 and 3 to form a symbol combination of shaded-sevens. The reels with vacated symbol positions are then re-spun (Reels 4 and 5) as shown. In other embodiments (such as shown in FIG. 16C), the magnetic bonus may combine the "attracted" symbols with the special symbol to form a multi-indicia symbol. In FIG. 15D, Reels 4 and 5 have stopped spinning and the main game display 1510 is evaluated for awards. Here, a four symbol pay of shaded-sevens is awarded to the player, since a "Wild" symbol has appeared in the middle position of Reel 4 and is hence evaluated as another shaded-seven.

Figure 16A:
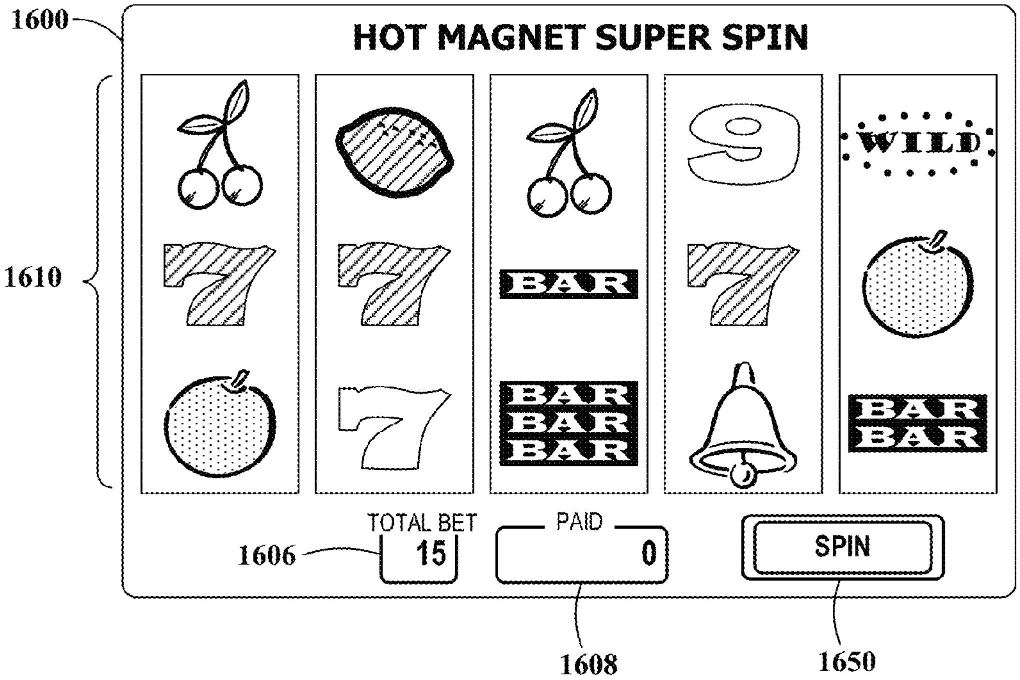
FIGS. 16A, 16B, 16C, 16D, and 16E are diagrams of a gaming display illustrating example game play according to embodiments of the invention.
Figure 16B:
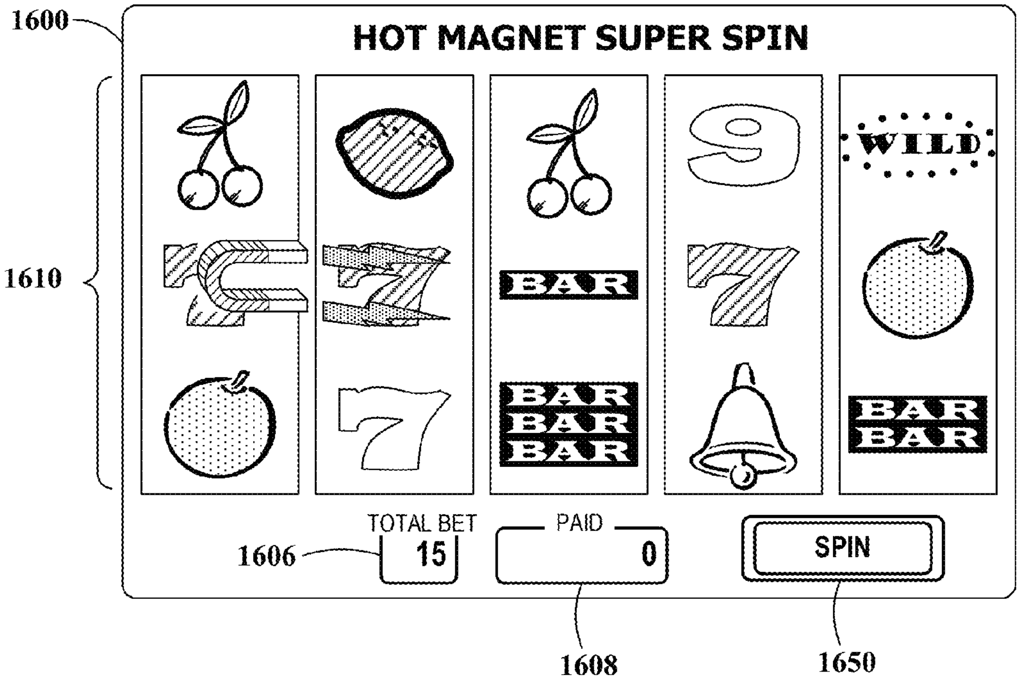
Figure 16C:
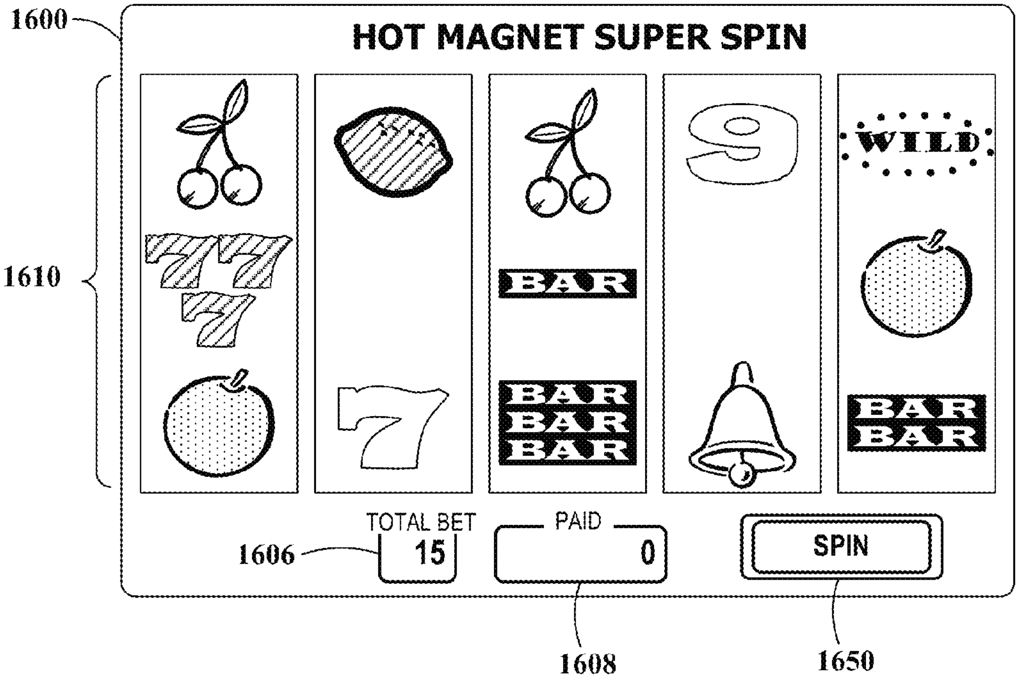

In FIGS. 16A-16E, another embodiment is shown that uses a magnet effect in response to a predefined rule to create symbol movement and a symbol combination. Referring to FIGS. 16A-16E, a video slot display 1600 includes a main game play area 1610, which has five game reels, and a secondary area the includes various meters and buttons, such as a "Bet" meter 1606, a "Paid" meter 1608, and a "SPIN" button 1650. In this embodiment, the predefined rule designates any symbol that appears in the middle position of Reel 1 (the leftmost reel) as the special symbol where any similar symbols appearing on the same horizontal line (i.e., middle position of any of the other reels) are combined to form a multi-indicia symbol. As shown in FIG. 16B, a shaded-seven symbol appears in the middle position of Reel 1 and is thus indicated as the special symbol. Therefore, any other shaded-seven symbols that appear in the middle positions of the other reels are moved and combined with the special shaded-seven on Reel 1 to form a multi-indicia symbol. The result of this symbol movement and combination is shown in FIG. 16C.

Figure 16D:
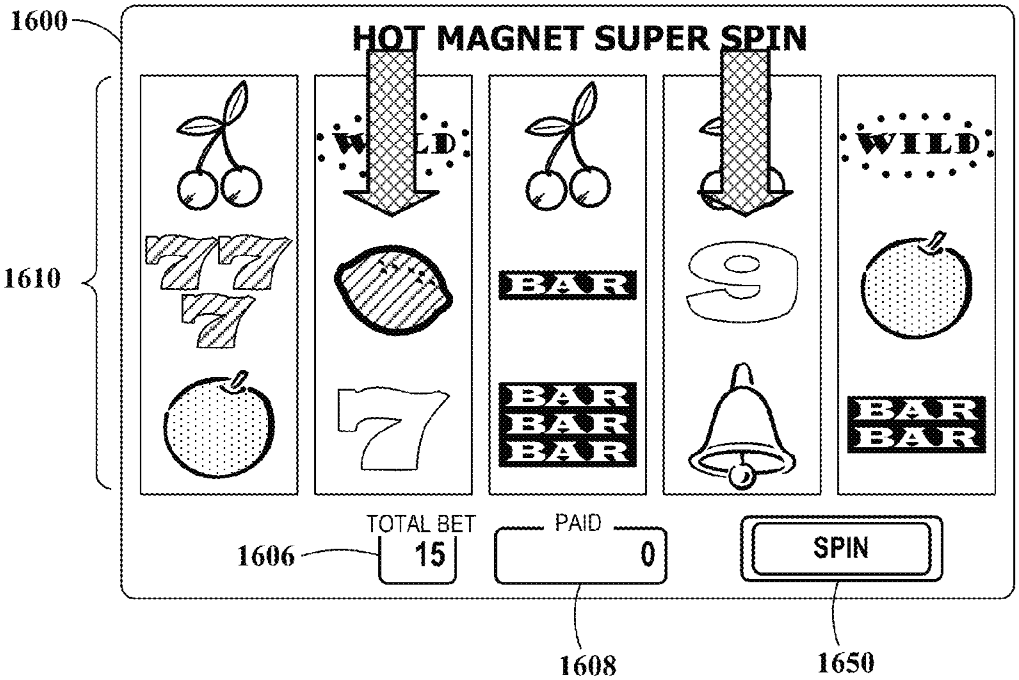

In this embodiment, the reels that have vacated symbol positions from the symbol movement and combinations have the symbols above the vacated symbol positions cascade down. Thus, as shown in FIG. 16D, the symbols above the vacated symbol positions cascade down to fill the vacated locations. This results in new symbols appearing on the main game display 1610 from the cascade-effect. In other embodiments, the reels with vacant symbol locations may be nudged (automatically, or by player-interaction) up one or two or more positions. In other embodiments, Wild symbols may replace the vacated symbol positions or random symbols may be selected to fill the vacated symbol positions.

Figure 16E:
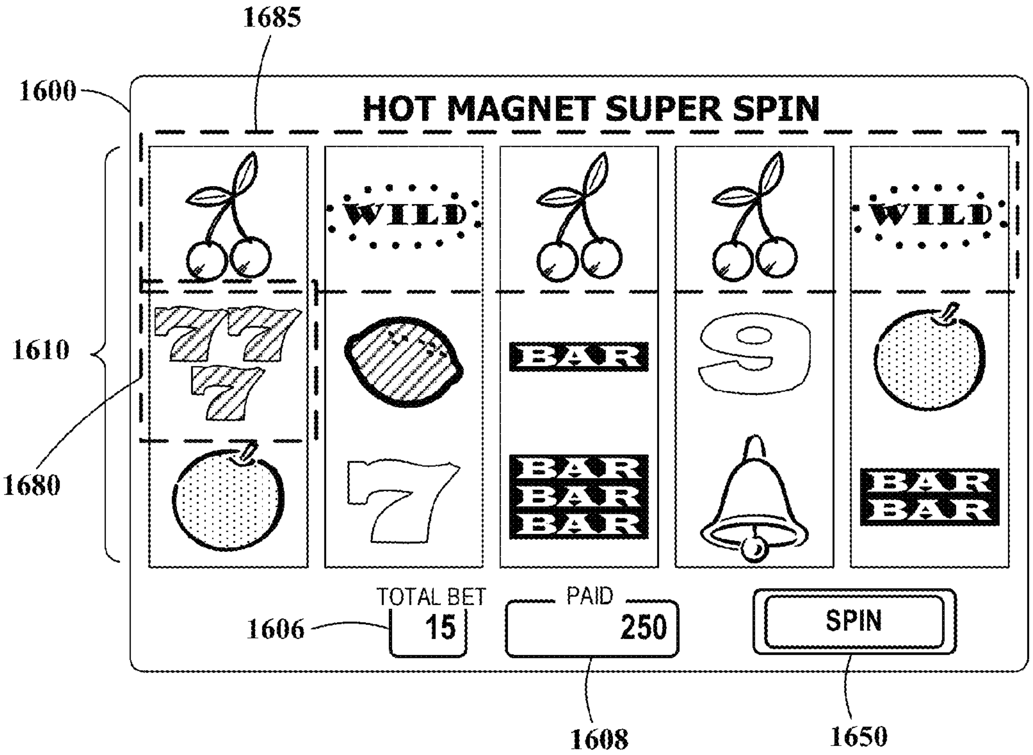

After the symbols have cascaded down, the resulting main game display 1610 is evaluated for pays as shown in FIG. 16E. Here, a three-symbol shaded-seven pay is indicated by box 1680, which includes only the multi-indicia shaded seven symbol (each subsection of the multi-indicia symbol is again counted independently as a separate symbol), and a five-symbol cherry pay is indicated by box 1685 for a played-payline including all of the top symbol locations in each reel.

FIGS. 17A-17G illustrate another game play progression embodiment of a slot gaming device display. Referring to FIGS. 17A-17G, a video slot display 1700 includes a main game play area 1710, which has five game reels, and a secondary area the includes various meters and buttons, such as a "Bet" meter 1706, a "Paid" meter 1708, and a "SPIN" button 1750. Here, a predefined condition includes a rule that each symbol that appears on Reel 1 can be combined with any other similar symbol that appears on the main game display 1710. In other embodiments, predefined conditions may include the possibility of different symbols being combined into one symbol location or together on a payline according to various sets of rules. These dissimilar combined symbols can be used in a variety of manners to facilitate game awards or bonuses. For example, each symbol of the combined symbols may be used in generating pays along paylines that include that reel stop location.

Figure 17A:
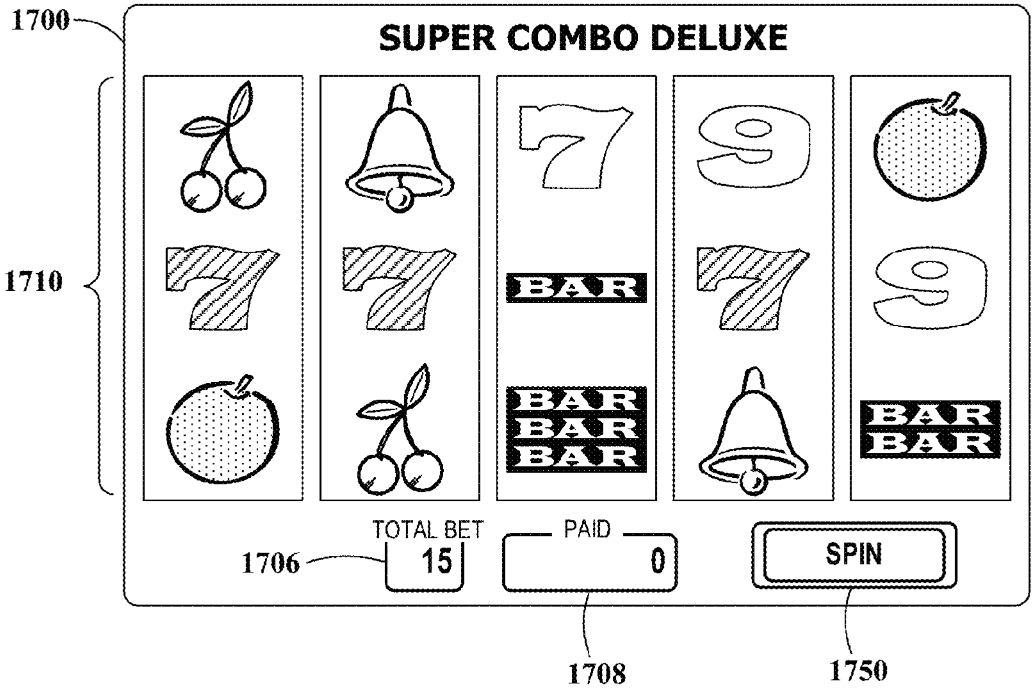
FIGS. 17A, 17B, 17C, 17D, 17E, 17F, and 17G are diagrams of a gaming display illustrating example game play according to embodiments of the invention.
Figure 17B:
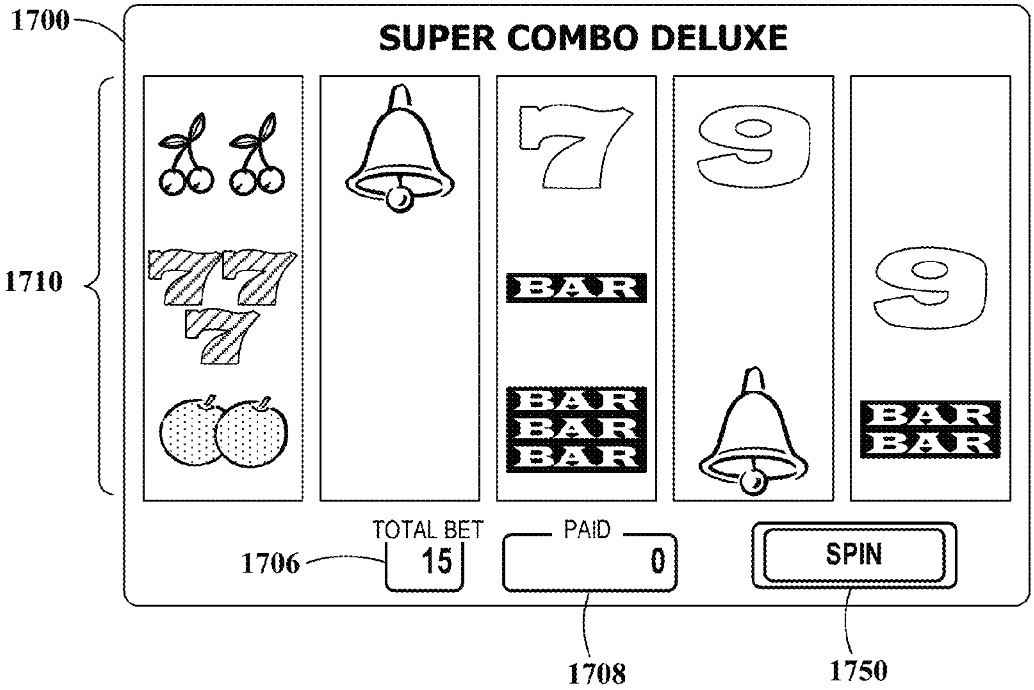

Returning now to the present embodiment, FIG. 17A illustrates the result of an initiated gaming event where the reels have been spun. As shown in FIG. 17B, symbols that are similar to the ones appearing on Reel 1 (i.e., the cherry symbols, shaded-seven symbols, and orange symbols) have been moved and combined with the symbols on Reel 1 (the leftmost reel).

Figure 17C:
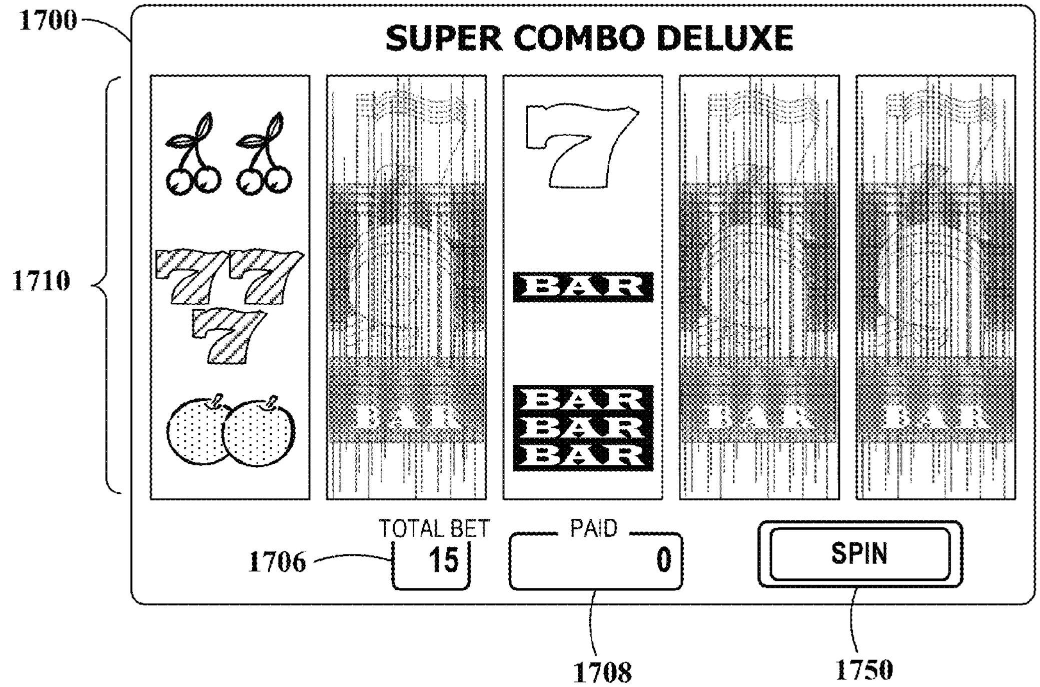
Figure 17D:
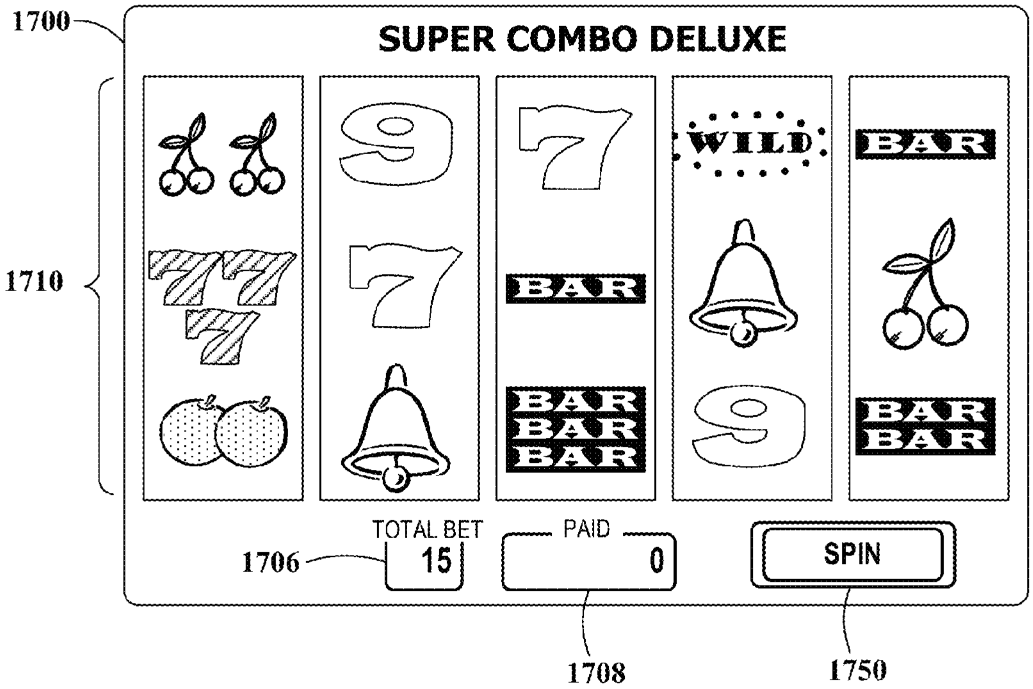
Figure 17E:
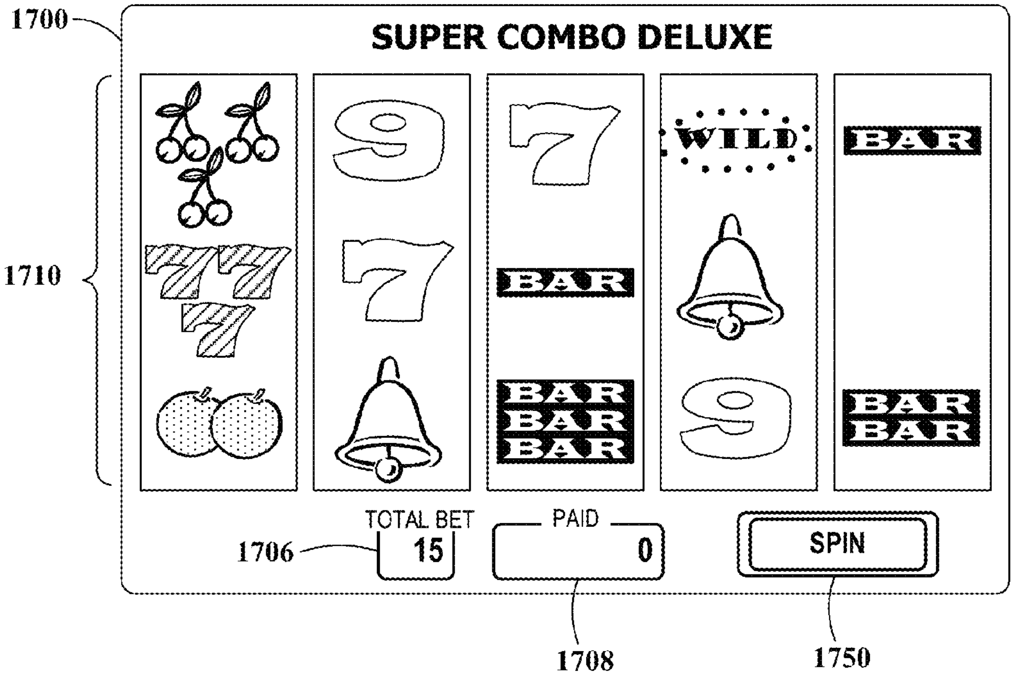
Figure 17F:
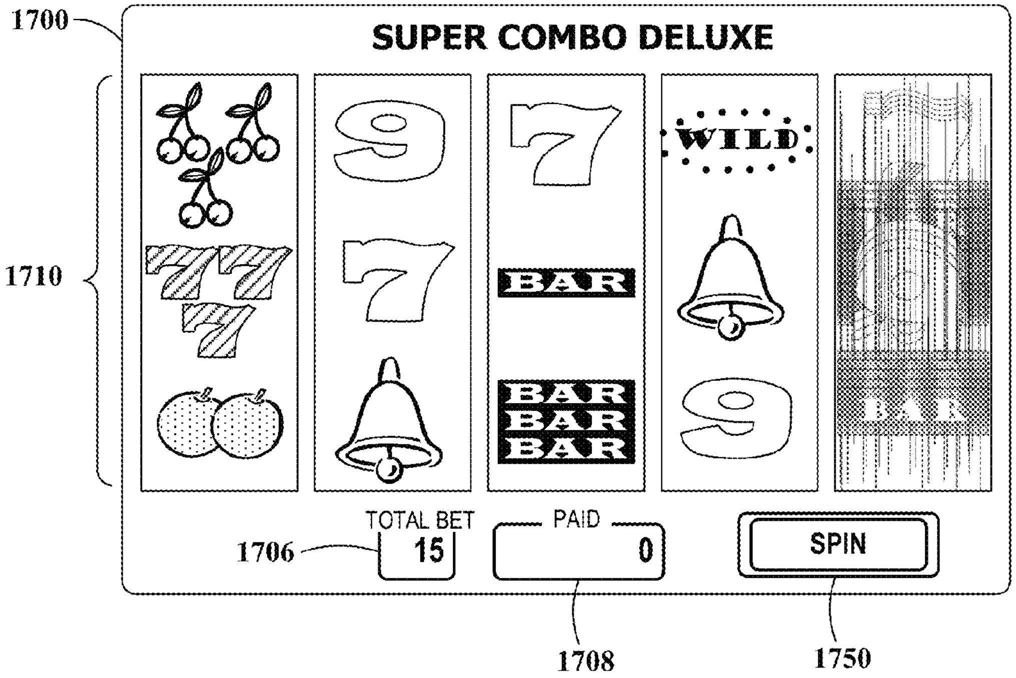

Each reel that has a vacant symbol location is now re-spun while the reels without a symbol position vacancy are held. As shown in FIG. 17C, this means that Reels 2, 4, and 5 are re-spun while Reels 1 and 3 are held. In FIG. 17D, the re-spun reels have come to a stop. The predefined condition in this embodiment, however, specifies that additional symbols achieved from re-spins are combined with similar symbols appearing on Reel 1. Thus, as shown in FIG. 17E, the additional cherry symbol received on re-spun Reel 5 is moved and combined with the cherry symbols on Reel 1. Here, because Reel 5 now has a symbol position vacancy, Reel 5 is re-spun for a second time as shown in FIG. 17F.

Figure 17G:
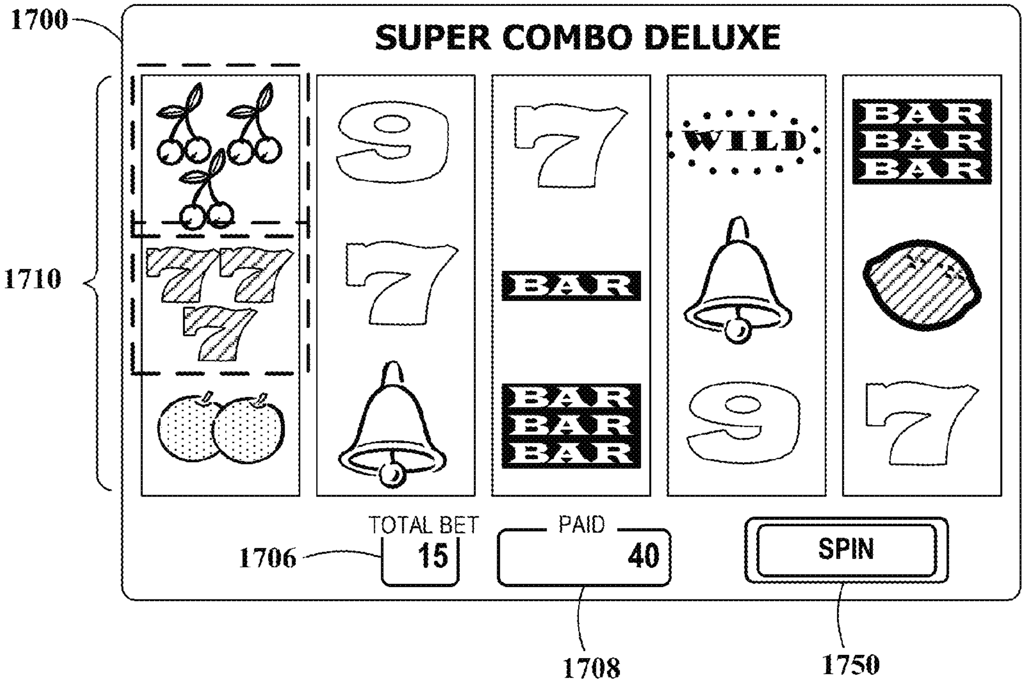

In FIG. 17G, Reel 5 has come to a stop and no additional symbols match the symbols on Reel 1. Here, the game ends and the main game play area 1710 is evaluated for awards. In this particular embodiment, only three, four, and five symbol combinations are associated with awards. Further, each multi-indicia symbol is evaluated such that is subsection is independently considered a separate symbol. Thus, as shown by the two dashed boxes, there are two three symbol pays (for the cherries and shaded-sevens), which results in the award of 40 credits. Note that in embodiments where multiple paylines pass through at least one symbol position on Reel 1, each of the multiple paylines may be evaluated separately. Hence, if the embodiment in FIG. 17G included five played paylines (three horizontal ones, a "V" shaped payline passing through the following positions R1-1, R2-2, R3-3, R4-2, and R5-1, where R3-3 stands for Reel 3, third or bottom symbol position, and an inverted "V" shaped payline passing though the following positions: R1-3, R2-2, R3-1, R4-2, and R5-3) and each 3-symbol combination resulted in a pay of 20 credits, the award associated with the final game outcome would be 60 credits (the three shaded-sevens would be paid once, and the three cherries would be paid twice since two paylines would pass through R1-1).

In FIGS. 18A-18G, another game play progression embodiment of a slot gaming device display is illustrated. Referring to FIGS. 18A-18G, a video slot display 1800 includes a main game play area 1810, which has five game reels, and a secondary area the includes various meters and buttons, such as a "Bet" meter 1806, a "Paid" meter 1808, and a "SPIN" button 1850. In this embodiment, the predefined conditions or criteria include rules that similar symbols to those appearing on Reel 1 are moved and combined with the symbols appearing on Reel 1 and that similar "Scatter" pay symbols are combined to one of the appearing scatter symbols on any of the reels. Which Scatter symbol receives the combination can be chosen at random or according to one or more rules. In this embodiment, reels with vacant symbol positions have the remaining reel symbols cascade down to fill the vacant symbol locations.

Figure 18A:
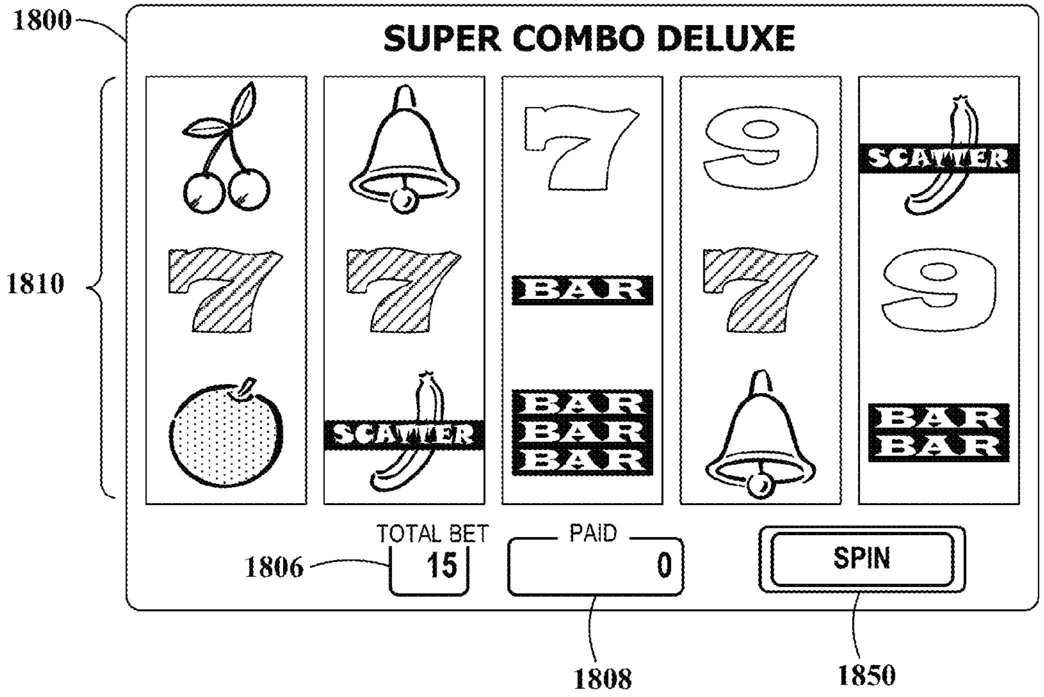
FIGS. 18A, 18B, 18C, 18D, 18E, 18F, and 18G are diagrams of a gaming display illustrating example game play according to embodiments of the invention.

After the reels have stop spinning from an initial game triggering spin in FIG. 18A, symbols that are similar to those appearing on Reel 1 are combined with the Reel 1 symbols to form multi-indicia symbols. Additionally, Scatter symbols that appear on the main game play area 1810 are combined to one of the Scatter symbol locations. Since Scatter symbols pay according to the number of Scatter symbols located on the main game play area 1810 without regard to paylines, they do not necessarily need to be combined to the left or right or to any specific reel. The past few illustrated embodiments have combined symbols involved in "Line" pays along paylines to the left, because often slot machines are evaluated from left to right to determine symbol combination awards on a payline. For example, three like symbols appearing on the center positions of Reels 2, 3, and 4 would not typically be associated with an award unless a similar symbol appeared along a common payline on Reel 1 (the leftmost reel). As there exist many different slot games and devices that have various other evaluation and awarding techniques, this concept can be applied to embodiments where all symbols can combine to the various positions on any reel.

Figure 18B:
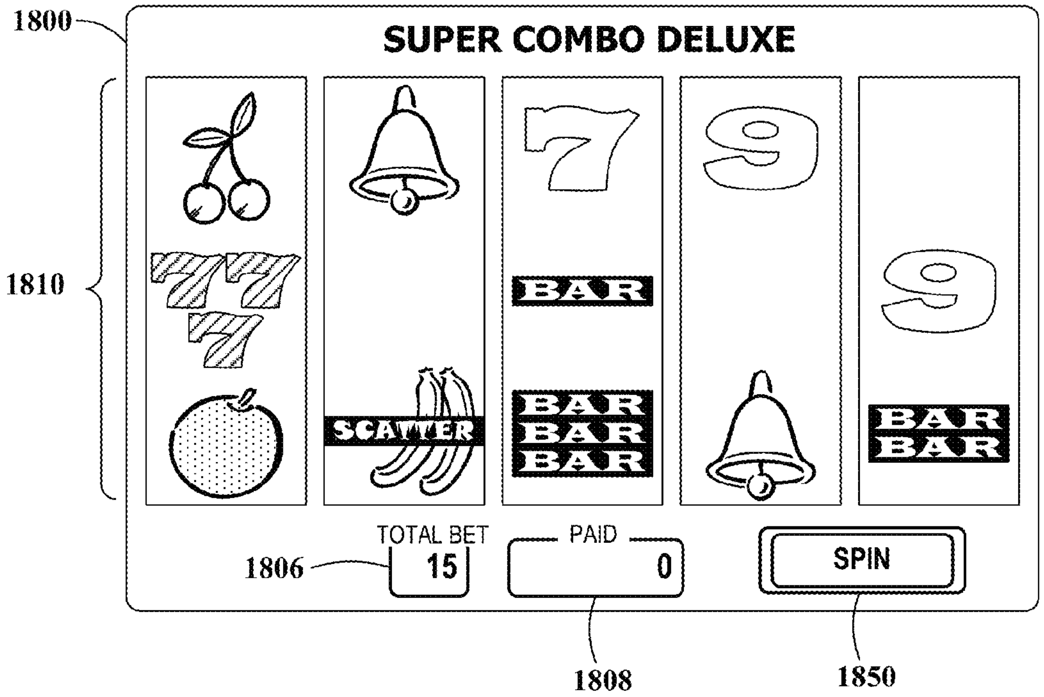
Figure 18C:
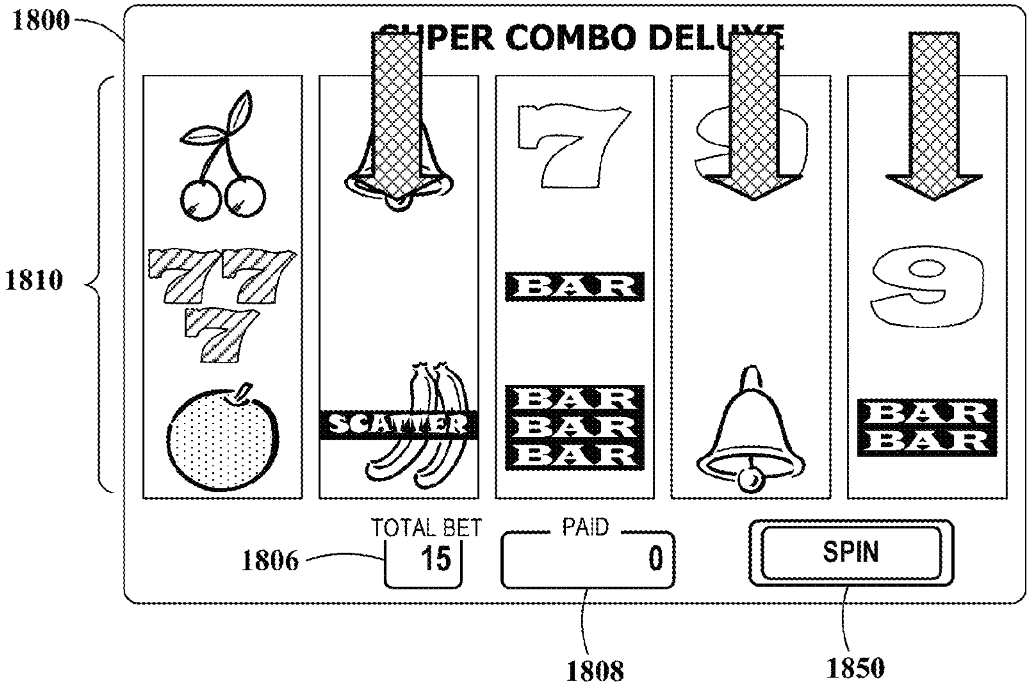
Figure 18D:
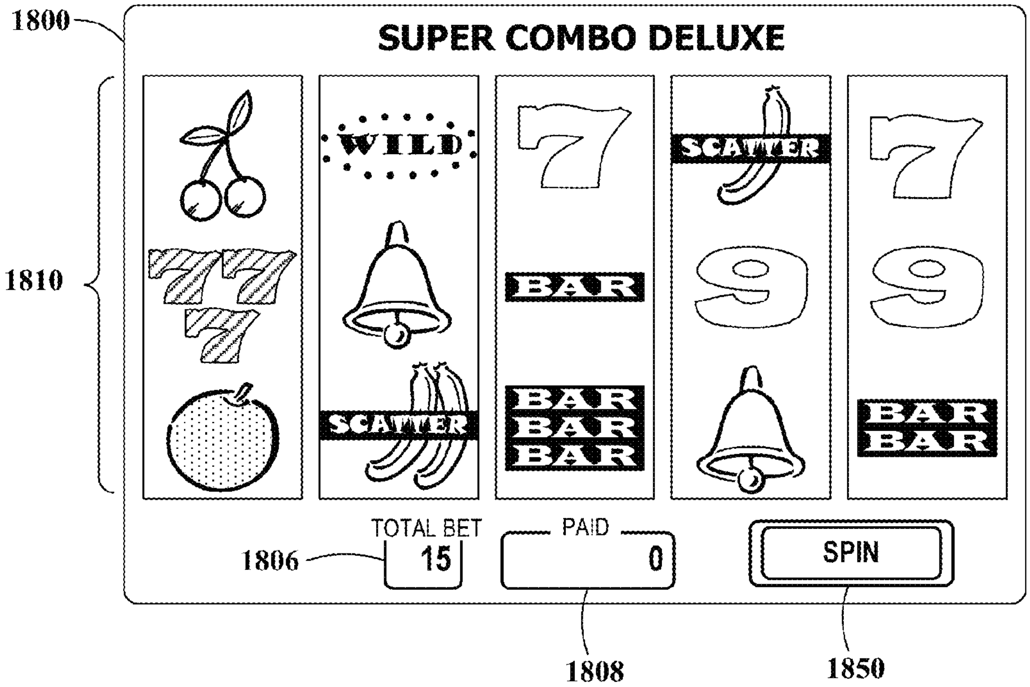
Figure 18E:
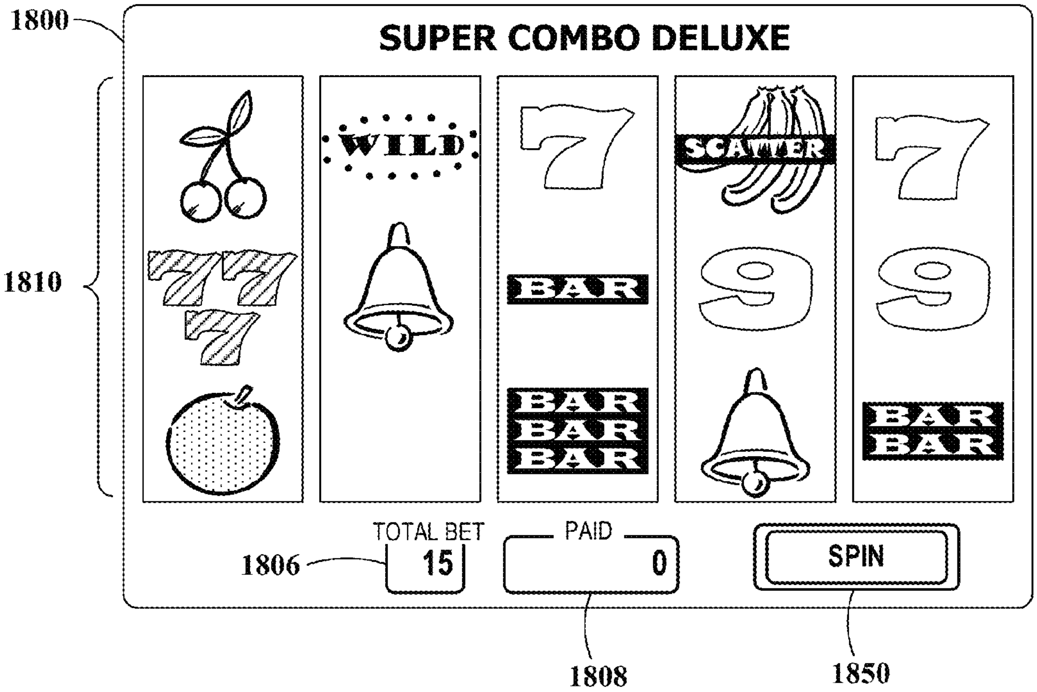
Figure 18F:
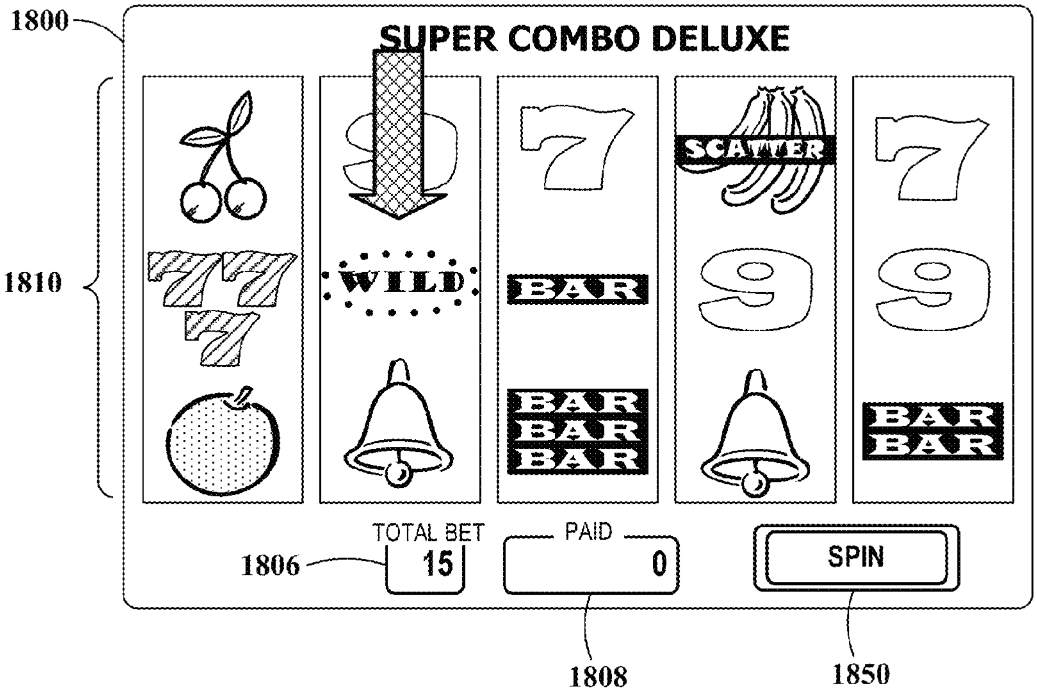
Figure 18G:
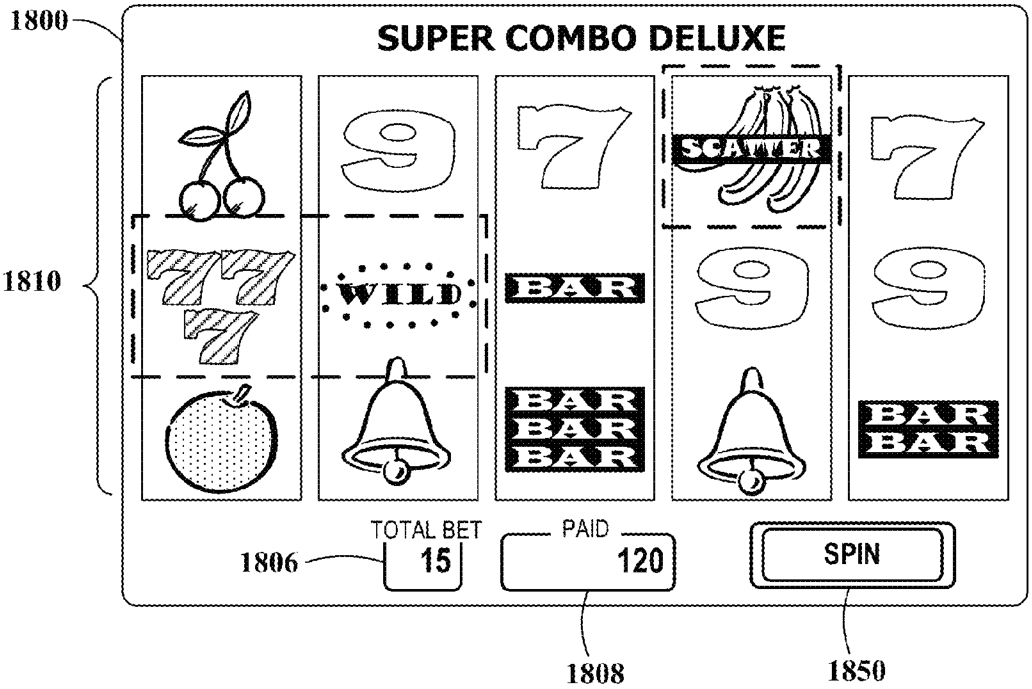

Returning now to the present embodiment, FIG. 18B illustrates that the two shaded-sevens on Reels 2 and 4 are moved and combined with the shaded-seven on Reel 1, and that the Scatter Banana symbol from Reel 5 is moved and combined with the Scatter Banana symbol on Reel 2. As shown in FIG. 18C, the reels that have vacant symbol positions have the symbols above the vacant symbol positions cascade or tumble down to fill the main game play area 1810 with symbols. The result of this cascading of symbols is shown in FIG. 18D. Here, another Scatter Banana symbol has appeared on Reel 4. As shown in FIG. 18E, the combined Scatter Banana symbol from Reel 2 is moved and combined with the Scatter symbol on Reel 4. This move may be selected at random or may be selected to move the Scatter symbols to the rightmost symbol location since the previous Scatter symbol move included moving symbols to the leftmost Scatter symbol position. In any case, the Scatter Banana symbol is now a three-banana multi-indicia symbol, as shown in FIG. 18E. In FIG. 18F, the symbols on Reel 2 cascade down to fill the symbol positions in Reel 2 on the main game play area 1810. Since no additional shaded-sevens, cherries, oranges, or bananas appear from the cascade, the resulting main game play area 1810 is evaluated for awards in FIG. 18G. Here, since the "Wild" symbol on Reel 2 has cascaded down to be on the center payline with the three-symbol shaded-seven multi-indicia symbol, one dashed-pay box shows the resulting four-symbol pay of shaded-sevens. In addition, a three-symbol Scatter pay is awarded from the multi-indicia Scatter Banana symbol as shown by the second dashed-pay box. The sum of these awards is shown in the "Paid" meter 1808, and the game round ends.

FIGS. 19A-19D illustrate another game play progression embodiment of a slot gaming device display. Referring to FIGS. 19A-19D, a video slot display 1900 includes a main game play area 1910, which has five game reels, and a secondary area the includes various meters and buttons, such as a "Bet" meter 1906, a "Paid" meter 1908, and a "SPIN" button 1950. Here, a predefined condition includes a rule that similar symbols in the same reel are combined together in the lowest occurring position of the set of similar symbols. In other embodiments, the symbols may combine to the highest occurring position, may combine to a randomly chosen one of the positions, or may combine to a position according to another rule. In yet other embodiments, the symbols may further combine with other similar symbols that occur on other reel strips, or the symbols may further combine with other similar symbols that occur on a horizontal line (or other payline), or according to other similar rules.

Figure 19A:
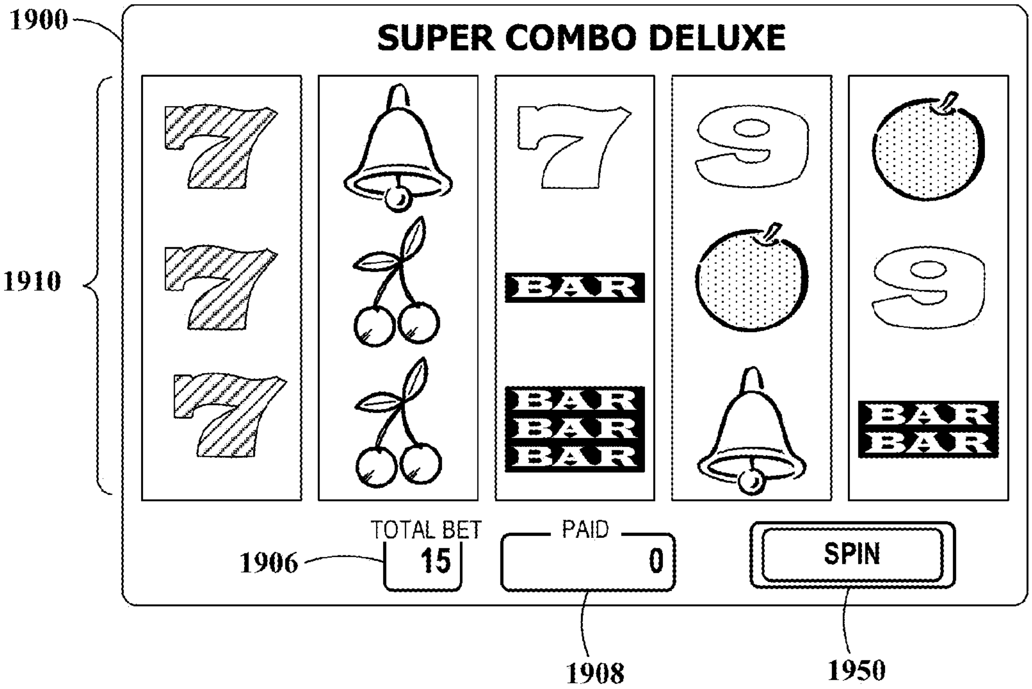
FIGS. 19A, 19B, 19C, and 19D are diagrams of a gaming display illustrating example game play according to embodiments of the invention.
Figure 19B:
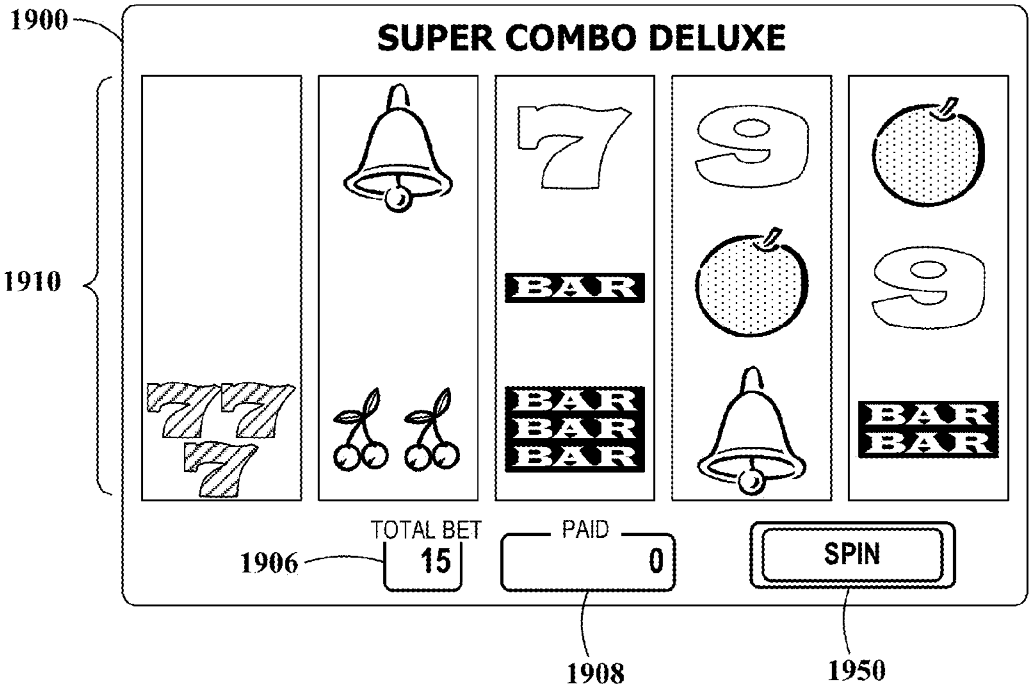
Figure 19C:
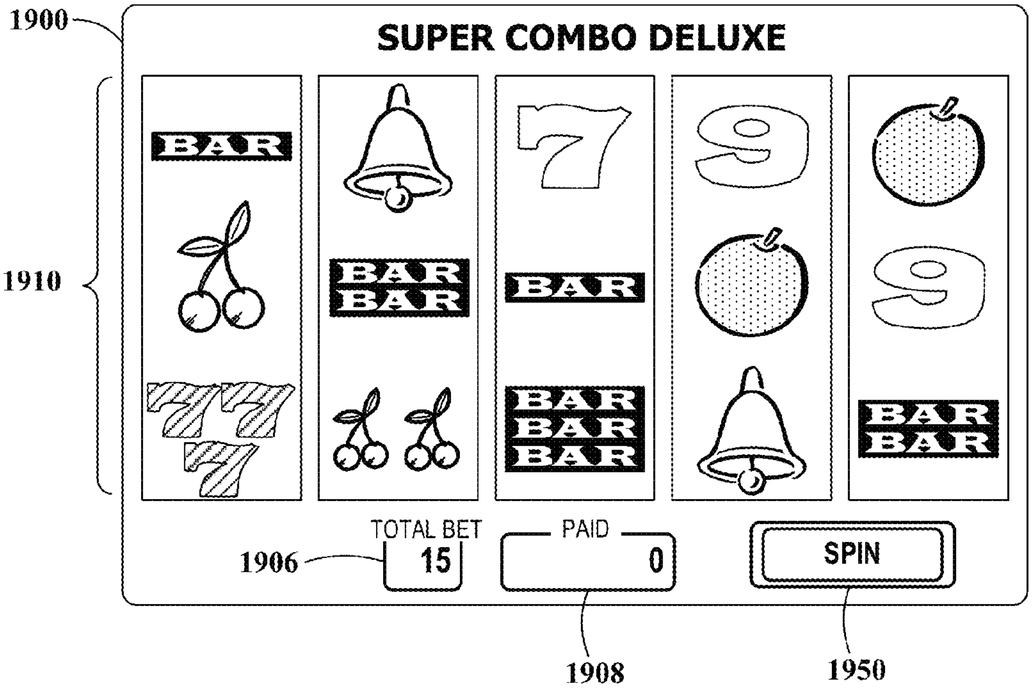
Figure 19D:
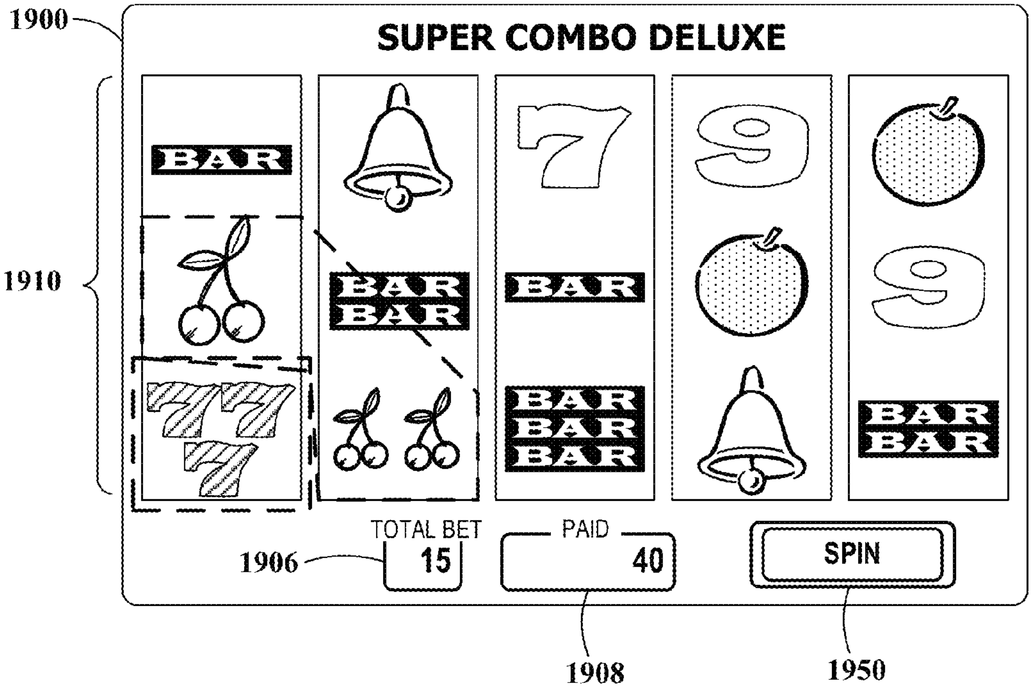

Returning now to the present embodiment, FIG. 19A illustrates the result of an initiated gaming event where the reels have been spun. As shown in FIG. 19B, symbols that are similar within the same reel (i.e., the shaded-seven symbols on Reel 1, and the cherry symbols on Reel 2) have been moved and combined with the lowest occurrence of those similar symbols. As shown in FIG. 19C, the reels that have vacant symbol positions have the symbols above the vacant symbol positions cascade or tumble down to fill the main game play area 1910 with symbols. The result of this cascading of symbols is shown in FIG. 19D.

As no other similar symbols appear from the cascaded symbols (such as for example, another shaded-seven symbol cascading down into view in the main game play area 1910 on Reel 1), the game ends and the main game play area 1910 is evaluated for awards. In this particular embodiment, only three, four, and five symbol combinations are associated with awards. Further, each multi-indicia symbol is evaluated such that is subsection is independently considered a separate symbol. Thus, as shown by the two dashed boxes, there are two three symbol pays (for the cherries and shaded-sevens), which results in the award of 40 credits. Note that in embodiments where multiple paylines pass through at least one symbol position on Reel 1, each of the multiple paylines may be evaluated separately. Hence, if the embodiment in FIG. 19D included multiple played paylines that passed through the bottom reel stop of the first reel (e.g., a horizontal one along the bottom position of each game reel, and an inverted "V" shaped payline passing though the following positions: R1-3, R2-2, R3-1, R4-2, and R5-3) and each 3-symbol combination resulted in a pay of 20 credits, the award associated with the final game outcome would be 60 credits (the three shaded-sevens would be paid twice since two paylines would pass through R1-3, and the three cherries would be paid once unless multiple paylines passed though R1-2 and R2-3).

The foregoing description of the exemplary embodiments has been presented for the purposes of illustration and description. It is not intended to be exhaustive or to limit the invention to the precise form disclosed. Many modifications and variations are possible in light of the above teaching. For example, the present invention is equally applicable in electronic or mechanical gaming machines, and is also applicable to live table versions of gaming activities that are capable of being played in a table version (e.g., machines involving poker or card games that could be played via table games).

Some embodiments of the invention have been described above, and in addition, some specific details are shown for purposes of illustrating the inventive principles. However, numerous other arrangements may be devised in accordance with the inventive principles of this patent disclosure. Further, well known processes have not been described in detail in order not to obscure the invention. Thus, while the invention is described in conjunction with the specific embodiments illustrated in the drawings, it is not limited to these embodiments or drawings. Rather, the invention is intended to cover alternatives, modifications, and equivalents that come within the scope and spirit of the inventive principles set out in the appended claims.

The invention claimed is:

1. A poker gaming device comprising, a body structure having a player input device;

a video display device housed in the body structure, the video display including a game portion having a grid of multiple card positions;

a memory device enclosed in the body structure, the memory device storing executable instructions and a plurality of virtual cards each having a rank value and a suit type, and configured to store a credit amount;

a wager input device housed in the body structure, the wager input device structured to receive physical items associated with a currency value; and a processor enclosed in the body structure, the processor arranged to execute the instructions stored in the memory to:

receive a signal from the wager input device indicating receipt of a physical item associated with a currency value;

increase the credit amount stored in the memory based on the currency value of the received physical item;

receive a wager on a poker game of chance, an amount of the wager deducted from the credit amount stored in the memory;

display a first number of the plurality of virtual cards in the card positions of the grid, the displayed first number of virtual cards forming a poker hand;

determine whether two or more of the displayed virtual cards meet a combination criterion;

combine the two or more determined cards when said cards meet the combination criterion, the cards being combined in a single card position in the grid, wherein the combination of two or more determined cards in the single card position is a multi-indicia card symbol showing each of the combined cards;

replace cards combined to a different card position on the grid with replacement cards from the plurality of virtual cards, where each grid position includes either a single virtual card or a multi-indicia card; and identify a plurality of resulting hands for the poker hand when one or more of the card positions of the grid are associated with a multiple-indicia card, each of the plurality of resulting hands including a different subset of a total of the cards by splitting indicia of the multiple-indicia card into individual cards and making combinations using the other cards in the card positions of the grid to generate the plurality of resulting hands;

evaluate each of the generated plurality of first resulting hands to determine if it is associated with any awards; and increase the credit amount stored in a memory by amounts of any awards determined from the evaluated plurality of first resulting hands.

2. The poker gaming device of claim 1, wherein determining whether two or more of the displayed virtual cards meet a combination criterion includes determining whether two or more of the displayed virtual cards are of the same rank value.

3. The poker gaming device of claim 1, wherein determining whether two or more of the displayed virtual cards meet a combination criterion includes determining whether two or more of the displayed virtual cards are of the same suit and have a sequential rank value.

4. The poker gaming device of claim 1, wherein the poker hand is a draw poker hand, and wherein the processor is further arranged to execute the instructions stored in the memory to:

facilitate user identification of which of the displayed virtual cards to hold; and replace virtual cards in the poker hand that are not held with draw cards from the plurality of virtual cards.

5. The poker gaming device of claim 4, wherein the processor executes the instructions to facilitate user identification of which of the displayed virtual cards to hold and replace virtual cards in the poker hand after the processor executes the instructions to determine whether two or more of the displayed virtual cards meet a combination criterion and combine the two or more determined cards.

6. The poker gaming device of claim 4, wherein the processor executes the instructions to facilitate user identification of which of the displayed virtual cards to hold and replace virtual cards in the poker hand before the processor executes the instructions to determine whether two or more of the displayed virtual cards meet a combination criterion and combine the two or more determined cards.

7. The poker gaming device of claim 4, wherein the processor executes the instructions to facilitate user identification of which of the displayed virtual cards to hold and replace virtual cards in the poker hand both before and after the processor executes the instructions to determine whether two or more of the displayed virtual cards meet a combination criterion and combine the two or more determined cards.

8. The poker gaming device of claim 1, wherein the processor is further arranged to execute the instructions stored in the memory to provide a payout for any of the plurality of resulting hands that comply with a payout rule.

9. The poker gaming device of claim 8, wherein the processor is further arranged to execute the instructions stored in the memory to display each enumerated resulting hand on the video display device.

10. The poker gaming device of claim 1, wherein the processor is further arranged to execute the instructions stored in the memory to provide a payout for a best poker hand associated with a largest award of the plurality of resulting hands when the best poker hand complies with a payout rule.

11. The poker gaming device of claim 1, wherein the processor is further arranged to execute the instructions stored in the memory to repeat the execution steps of determining whether two or more of the displayed virtual cards meet a combination criterion, combining the two or more determined cards, and replacing cards combined to a different card position on the grid until no two displayed virtual cards in the grid meet the combination criterion.

12. A method of operating a poker gaming device, the poker gaming device including a body structure having a player input device, a video display device including a game portion having a grid of multiple card positions, a memory device configured to store a credit amount, a wager input device structured to receive physical items associated with a currency value, and a processor, the method comprising:

receiving a signal from the wager input device indicating receipt of a physical item associated with a currency value;

increasing the credit amount stored in the memory based on the currency value of the received physical item;

receiving a wager on a poker game of chance, an amount of the wager deducted from the credit amount stored in the memory;

displaying a first number of a plurality of first virtual cards in first card positions of a game grid, the displayed first number of virtual cards forming a first poker hand;

determining whether two or more of the first displayed virtual cards meet a combination criterion;

combining the two or more determined cards from the first displayed virtual cards when said cards meet the combination criterion, the cards being combined in a single card position in the first card positions of the game grid, wherein the combination of two or more determined cards in the single card position is a multi-indicia card symbol showing each of the combined cards;

replacing cards combined to a different card position in the first card positions of the game grid with replacement cards from the first plurality of virtual cards, where each of the first grid positions includes either a single virtual card or a multi-indicia card; and identifying a plurality of first resulting hands for the first poker hand when one or more of the first card positions of the grid are associated with a multiple-indicia card, each of the plurality of first resulting hands including a different subset of a total of the cards in the first poker hand by splitting indicia of the multiple-indicia card into individual cards and making combinations using the other cards in the first card positions of the grid to generate the plurality of first resulting hands;

evaluate each of the generated plurality of first resulting hands to determine if it is associated with any awards; and increase the credit amount stored in a memory by amounts of any awards determined from the evaluated plurality of first resulting hands.

13. The method of claim 12, wherein the first hand of the poker game is a draw poker game, and wherein the method further comprises:

facilitating user identification of which of the first plurality of cards in the first poker hand to hold;

replacing the displayed virtual cards in the first poker hand that are not held with first draw poker cards from the first plurality of virtual cards.

14. The method of claim 13, further comprising displaying a second number of a second plurality of virtual cards in second card positions of a game grid, the displayed second number of virtual cards forming a second poker hand in response to the received game initiation signal.

15. The method of claim 14, wherein cards held in the first poker hand are automatically displayed and held in the second poker hand at second cards positions in the game grid corresponding to first card positions associated with the held cards in the first poker hand.

16. The method of claim 15, further comprising replacing the virtual cards in the second poker hand that are not automatically held with second draw poker cards from the second plurality of virtual cards.

17. A poker gaming device comprising:

a video display device including a game portion having a grid of multiple card positions;

a memory device configured to store a plurality of virtual cards each having a rank value and a suit type, and to store a credit amount;

a wager input device structured to receive physical items associated with a currency value; and a processor operable to:

receive a signal from the wager input device indicating receipt of a physical item associated with a currency value;

increase the credit amount stored in the memory based on the currency value of the received physical item;

receive a wager on a poker game of chance, an amount of the wager deducted from the credit amount stored in the memory;

display a first number of the plurality of virtual cards in the card positions of the grid on the video display device, the displayed first number of virtual cards forming a poker hand;

determine whether a plurality of the displayed virtual cards meet a combination criterion;

combine the plurality of cards meeting the combination criterion when said plurality of cards meet the combination criterion, the plurality of cards being combined in a single card position in the grid, wherein the combination of two or more determined cards in the single card position is a multi-indicia card symbol showing each of the combined cards;

replace cards combined to a different card position on the grid with replacement cards from the plurality of virtual cards, where each grid position includes either a single virtual card or a multi-indicia card;

evaluate the poker hand to determine if it is associated with any awards; and increase the credit amount stored in memory by amounts of any awards determined from the evaluated poker hand.

18. The poker gaming device of claim 17, wherein the processor is further operable to identify a plurality of resulting hands for the poker hand when one or more of the card positions of the grid are associated with a multiple-indicia card, each of the plurality of resulting hands including a different subset of a total of the cards by splitting indicia of the multiple-indicia card into individual cards and making combinations using the other cards in the card positions of the grid to generate the plurality of resulting hands.

19. The poker gaming device of claim 18, wherein evaluating the poker hand to determine if it is associated with any awards includes evaluating each of the plurality of identified resulting hands of the poker hand for awards.

20. The poker gaming device of claim 18, wherein evaluating the poker hand to determine if it is associated with any awards includes:

determining an optimum poker hand from the plurality of identified resulting hands of the poker hand; and evaluating the optimum poker hand for awards.

* * * * *